United States Patent
Suzuki

(10) Patent No.: US 11,465,321 B2
(45) Date of Patent: Oct. 11, 2022

(54) MOLD DEVICE, INJECTION MOLDING SYSTEM AND METHOD FOR MANUFACTURING MOLDED ARTICLE

(71) Applicant: Yasuhiro Suzuki, Suzuka (JP)

(72) Inventor: Yasuhiro Suzuki, Suzuka (JP)

(*) Notice: Subject to any disclaimer, the term of this patent is extended or adjusted under 35 U.S.C. 154(b) by 1373 days.

(21) Appl. No.: 15/522,772

(22) PCT Filed: Jul. 2, 2015

(86) PCT No.: PCT/JP2015/069216
§ 371 (c)(1),
(2) Date: Apr. 28, 2017

(87) PCT Pub. No.: WO2016/072112
PCT Pub. Date: May 12, 2016

(65) Prior Publication Data
US 2017/0312965 A1    Nov. 2, 2017

(30) Foreign Application Priority Data

Nov. 4, 2014 (JP) .............................. JP2014-224717

(51) Int. Cl.
| B29C 45/40 | (2006.01) |
| B29C 45/17 | (2006.01) |
| B29C 45/57 | (2006.01) |
| B29C 45/00 | (2006.01) |
| B29C 45/26 | (2006.01) |
| B29C 45/34 | (2006.01) |

(52) U.S. Cl.
CPC .......... *B29C 45/401* (2013.01); *B29C 45/174* (2013.01); *B29C 45/34* (2013.01);
(Continued)

(58) Field of Classification Search
CPC .......... B29C 45/174; B29C 2045/1741; B29C 2045/4015; B29C 45/401; B29C 45/2608;
(Continued)

(56) References Cited

U.S. PATENT DOCUMENTS

| 4,479,914 A | 10/1984 | Baumrucker |
| 4,508,356 A | 4/1985 | Janian |

(Continued)

FOREIGN PATENT DOCUMENTS

| JP | S60-85665 U | 6/1985 |
| JP | H10-119077 A | 5/1998 |

(Continued)

OTHER PUBLICATIONS

Translation of WO 2005/018902 (Year: 2005).*

(Continued)

*Primary Examiner* — Niki Bakhtiari
*Assistant Examiner* — John J DeRusso
(74) *Attorney, Agent, or Firm* — Yokoi & Co., U.S.A.; Toshiyuki Yokoi

(57) ABSTRACT

A mold device where a pressurized fluid is injected into a clearance between a resin injected into a cavity and a cavity wall surface, the mold device including: a shaft body provided on at least one of a first mold and a second mold, the first mold and the second mold forming a molding space, the shaft body ejecting a molded article molded from the resin injected into the molding space; a ring-shaped elastic member for supporting and sealing the shaft body, an opening of a groove formed in the ring-shaped elastic member along a circumferential direction of the ring-shaped elastic member being oriented toward the molding space, a load being applied on the ring-shaped elastic member to improve adhesion to the shaft body; and an injection portion provided on at least one of the first mold and the second mold for injecting the pressurized fluid into the molding space.

8 Claims, 43 Drawing Sheets

(52) U.S. Cl.
CPC .......... *B29C 45/40* (2013.01); *B29C 45/0025* (2013.01); *B29C 45/1734* (2013.01); *B29C 45/2673* (2013.01); *B29C 45/57* (2013.01); *B29C 2045/1741* (2013.01); *B29C 2045/4015* (2013.01); *B29C 2045/4052* (2013.01)

(58) Field of Classification Search
CPC ............ B29C 2045/4052; F16J 15/3212; F16J 15/3236
See application file for complete search history.

(56) References Cited

U.S. PATENT DOCUMENTS 6,322,735 B1 * 11/2001 Yamaki .................. B29C 45/00
264/328.1

2007/0182066 A1 * 8/2007 Uchida ................. B29C 45/174
425/546

FOREIGN PATENT DOCUMENTS

| | | |
|---|---|---|
| JP | H11-101348 A | 4/1999 |
| JP | H11-216746 A | 8/1999 |
| JP | H11-216748 A | 8/1999 |
| JP | 2009-083216 A | 4/2009 |
| JP | 2011-255541 A | 12/2011 |
| WO | WO-2005018902 A1 * 3/2005 ........... B29C 45/372 |

OTHER PUBLICATIONS

International Search Report for PCT/JP2015/069216 dated Oct. 6, 2015.
PCT written opinion dated Oct. 6, 2015.
Extended European Search Report dated Oct. 1, 2018.

* cited by examiner

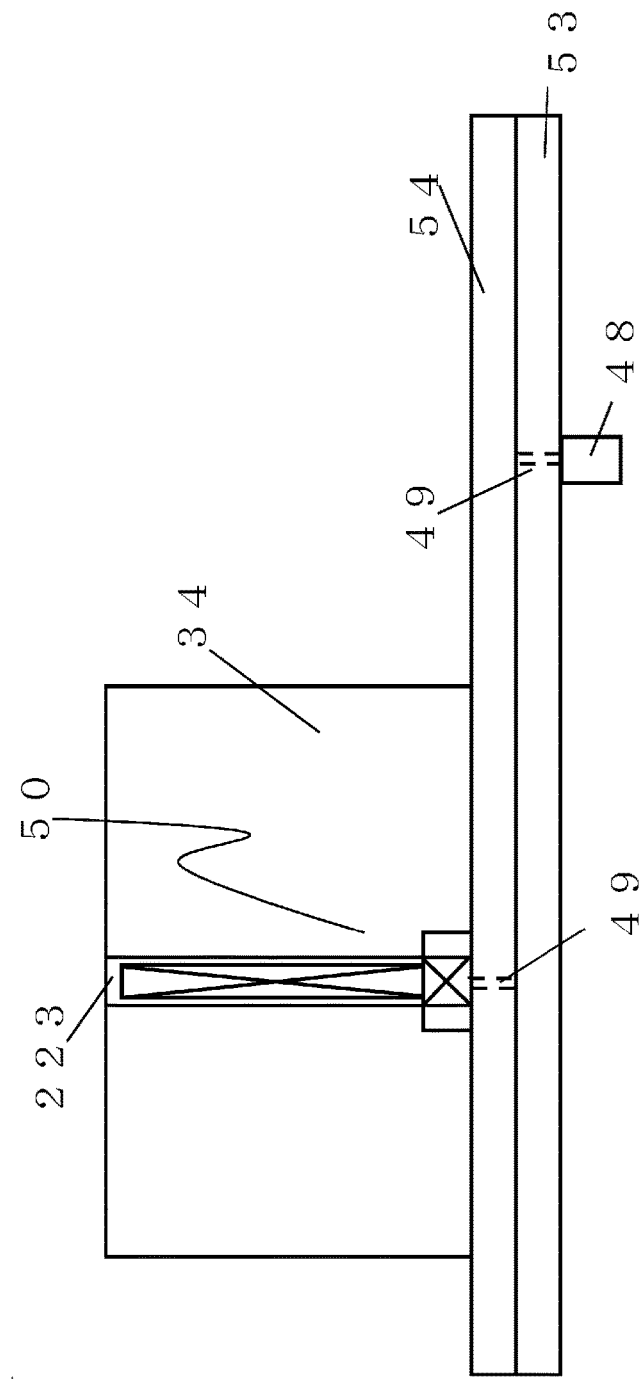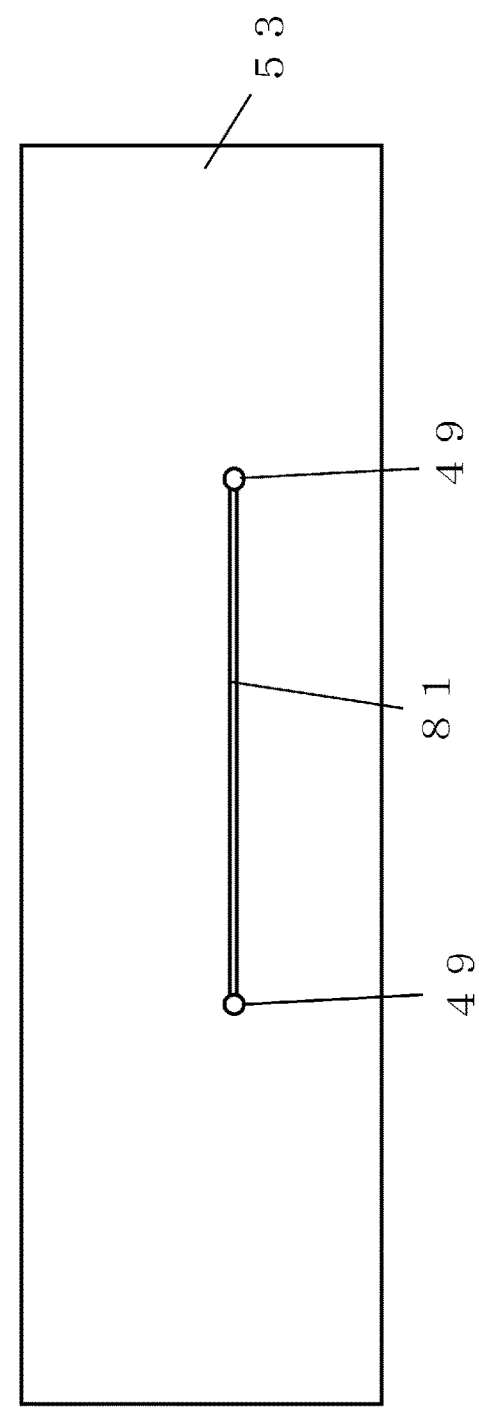
Fig. 49A
Fig. 49B

MOLD DEVICE, INJECTION MOLDING SYSTEM AND METHOD FOR MANUFACTURING MOLDED ARTICLE

TECHNICAL FIELD

The present invention relates to the mold device, the injection molding system and the method for manufacturing molded article.

BACKGROUND ART

The patent document 1 relates to the mold structure for manufacturing the palette of plastic material with skids composed of a non-foamed surface layer and a formed inner part, by injecting a molten resin into a cavity formed by a hermetically-closed space of ejector box as well as by a movable mold and a stationary mold, after the said cavity has been filled with a compressed gas. The patent document 1 describes an art whereby the material hardness of a movable mold and a stationary mold is enhanced around the zone of confluence of molten resin in comparison with other zones.

PRIOR ART DOCUMENTS

Patent Documents

[Patent document 1] Japanese published unexamined application official bulletin 2009-083216

DISCLOSURE OF THE INVENTION

Problems to be Solved by the Invention

The ejector box is provided for securing the hermetically-closed condition of the ejector box. Here, the ejector mechanism comprises the ejector pins to push out the article molded in the cavity and the ejector plate for mounting the ejector pins.

The ejector pins are inserted into the holes leading to the cavity formed in the mold on the movable side or in the mold on the stationary side and make a reciprocating motion in conjunction with the reciprocating motion of the ejector plate. Since there are clearances between the said holes and ejector pins, the pressurized fluid in the cavity flows out (leaks) when the pressurized fluid is injected into the cavity. The ejector box is provided for the purpose of preventing the pressurized fluid flowing out through the said clearances from flowing out further to the outside.

However, because of the large volume of the ejector box, in order to prevent the escape of the pressurized fluid out of the mold, it is needed to inject from outside into the ejector box the pressurized fluid with its pressure as high as that of the fluid in the cavity as well as with its volume as large as that of the ejector box.

The present invention addresses the problem of providing a mold, an injection molding system, and a molding manufacturing method that limit the outflow of a pressurized fluid injected into a cavity.

Means for Solving Problem

The mold device according to claim 1 comprises: a shaft body that is provided on at least one of a first mold and a second mold, the first mold and the second mold forming a molding space, the shaft body extruding a molded article that is molded from a resin injected into the molding space; a ring-shaped elastic member for supporting the shaft body, an opening of a groove formed along a circumferential direction of the ring-shaped elastic member being oriented toward the molding space; and an injection portion that is provided on at least one of the first mold and the second mold for injecting a pressurized fluid into the molding space.

The mold device according to claim 2 is a mold device according to claim 1 further comprising: a discharge portion for discharging the air in the molding space while the resin is being injected.

The mold device according to claim 3 is a mold device according to claim 2 wherein the ring-shaped elastic member for supporting the shaft body is formed by: a first ring-shaped elastic member having a groove, an opening of the groove formed along the circumferential direction of the first ring-shaped elastic member being oriented toward the molding space; and a second ring-shaped elastic member, an opening of a groove formed along the circumferential direction of the second ring-shaped elastic member being oriented opposite to the molding space.

The mold device according to claim 4 is a mold device according to claim 2 wherein the ring-shaped elastic member for supporting the shaft body further has a second groove, an opening of the second groove being oriented opposite to the molding space.

The injection molding system according to claim 5 comprises: a mold device according to any one of claims 1 to 4; and an injection device for injecting the resin into the mold device.

The method for manufacturing molded article according to claim 6 comprises: a first step of injecting the resin into the molding space of the mold device according to claim 1; a second step of injecting the pressurized fluid between the resin injected into the molding space and the first mold forming the molding space or between the resin injected into the molding space and the second mold forming the molding space from the injection portion; and a third step of opening the first mold and the second mold and extruding the molded article by the shaft body, the molded article being formed from the resin injected into the molding space.

The method for manufacturing molded article according to claim 7 comprises: a first step of injecting the resin into the molding space of the mold device according to any one of claims 2 to 4 while drawing off the air in the molding space through the discharge portion; a second step of injecting the pressurized fluid between the resin injected into the molding space and the first mold forming the molding space or between the resin injected into the molding space and the second mold forming the molding space from the injection portion; and a third step of opening the first mold and the second mold and extruding the molded article by the shaft body, the molded article being formed from the resin injected into the molding space.

Effects of the Invention

The mold device according to claim 1 is able to constrain the escape of the pressurized fluid in the molding space in comparison with a mold device that does not use a ring-shaped elastic member having an opening of a groove formed along a circumferential direction being oriented toward the molding space.

The mold device according to claim 2 is able to constrain the discoloration of a molded article molded in the molding space in comparison with a mold device that does not comprise a discharge portion.

In comparison with a mold device that does not use the first ring-shaped elastic member and the second ring-shaped elastic member, the mold device according to claim 3 is able to constrain the leakage of the pressurized fluid in the molding space and able to discharge efficiently the pressurized fluid in the molding space.

The mold device according to claim 4 is able to reduce the cost of a mold device because its ring-shaped elastic member is provided with two grooves (the first groove and the second groove) that enable to convert two ring-shaped elastic members into one unit.

The injection molding system according to claim 5 is able to manufacture molded article by reducing the consumption of pressurized fluid, in comparison with a mold device that is not provided with the ring-shaped elastic member in the mold device according to any one of claims 1 to 4.

Because the method for manufacturing molded article according to claim 6 is able to reduce the consumption of pressurized fluid in comparison with a case where a mold device without ring-shaped elastic member is used, it is able to make molded article at a lower cost.

The method for manufacturing molded article according to claim 7 is able to reduce the consumption of pressurized fluid as well as restrain the discoloration of molded article, in comparison with a case where a mold device without ring-shaped elastic member is used.

BRIEF DESCRIPTION OF THE DRAWINGS

FIGS. 49A and 48B are schematic diagrams of a circuit of pressurized fluid in a seal-plate with a nested element machined directly with the form of outer tube 132 into which an inner core is inserted.

MODES FOR CARRYING OUT THE INVENTION

Figure 1:
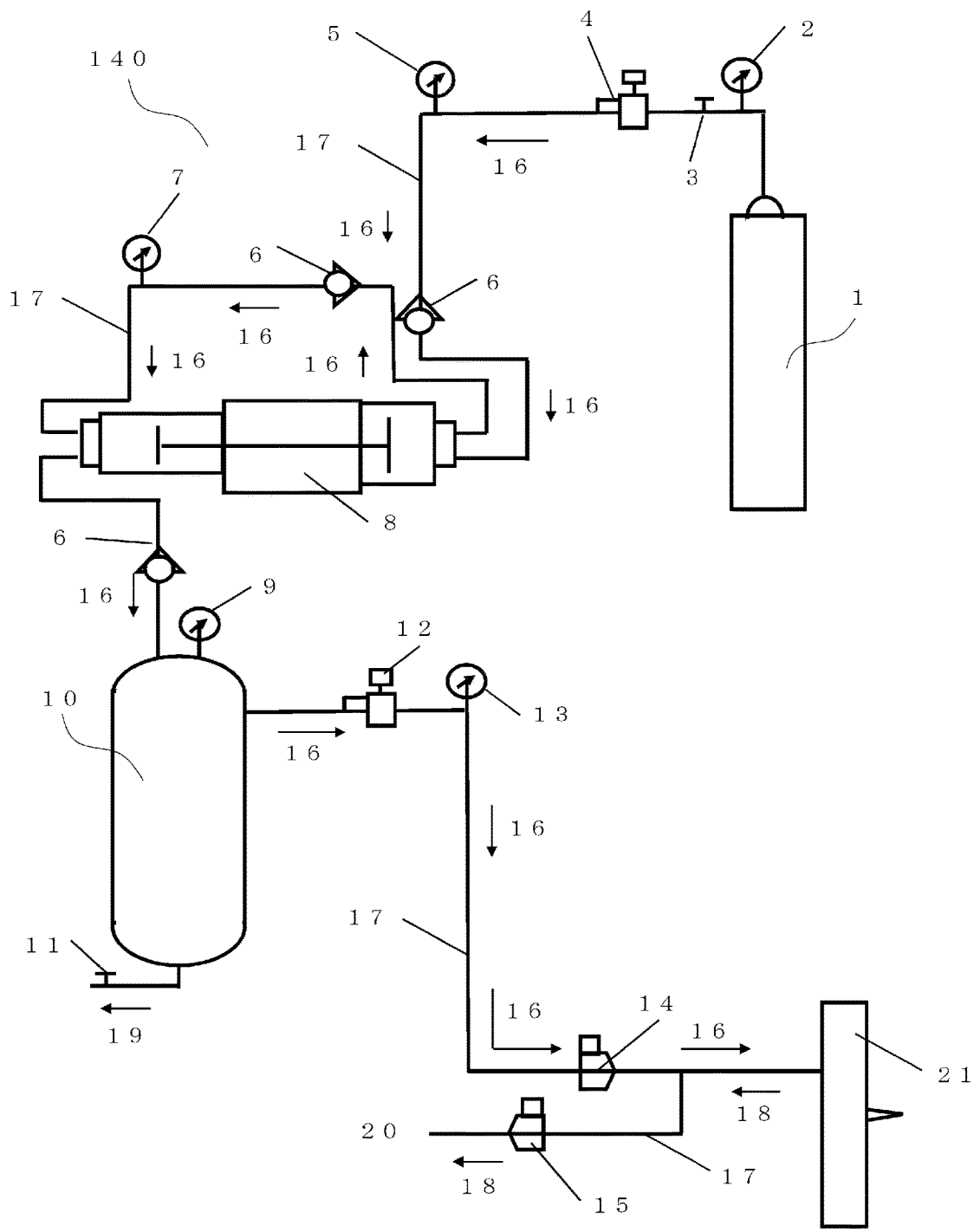
FIG. 1 is a circuit diagram of pressurized air (fluid pressurization) of a device for preparing pressurized fluid.

The present invention relates to injection molding of resin (as an example, thermoplastic resin). More specifically, the present invention relates to a mold device, an injection molding system and a method for manufacturing molded articles, by applying pressurized fluid to the resin filled in the cavity to pressurize it. The resin can also be a thermoplastic resin, a rubber or a thermoplastic elastomer.

First, the terms employed in the present invention are to be defined.

(Pressurized Air Injection Molding)

"Pressurized air injection molding" signifies a process of injection molding wherein a resin is filled (injected) into the cavity, and during the injection, immediately after the injection or after a lapse of predetermined length of time following the injection, a pressurized fluid is injected into the clearance between the resin injected into the cavity and the cavity wall surface so that the pressure of the pressurized fluid is exerted on the resin in the cavity. It is also called simply "air pressure molding".

By applying the pressurized air injection molding, when only the fluid pressurization is applied to the resin filled into the cavity with a short-shot by injection molding unit without using resin pressure keeping by using the screw of injection molding unit, it becomes possible to reduce the mold clamping (closing) force between the mold on the movable side and that on the stationary side. In fact, since the pressurized air injection molding enables a small injection molding unit to manufacture a large-sized molded product, the technique is able to reduce the manufacturing cost of molded articles.

Furthermore, since the pressurized air injection molding does not use resin pressure keeping, the occurrences of burrs at the parting, particularly burrs around the gate are few. In addition, since in the pressurized air injection molding the resin is pushed (pressed) against the cavity wall surface by the thrust of pressurized fluid, the transcription performance conforming to cavity improves and the occurrence of sink marks is reduced.

(Molding Space)

"Molding space" signifies the space to fill with resin in a mold and is synonymous with "cavity". "Inside of a cavity" signifies the internal part, space or volume of a cavity.

(Injection)

"Injection" signifies an action of filling a cavity with a resin or introducing a resin into a cavity to a full extent, or the step (process) of such an operation.

(Filling)

"Filling" signifies an action of introducing a resin into a cavity in the manufacturing process of injection molding.

A filling of a resin of volume (capacity) smaller than the volume of the cavity is called "short-shot" or "short-molding".

A filling of a resin of volume equivalent to the volume of the cavity is called "full-shot" or "full-pack".

A filling of a resin of volume larger than the volume of the cavity is called "over-shot" or "over-pack".

Incidentally, in the case where resin pressure keeping is used to reduce sink marks and improve transcription performance, mentions such as "resin pressure keeping", "use of resin pressure keeping" etc. should be indicated in order to distinguish the process from "fluid pressurization" and "fluid pressure-keeping".

(Volume)

"Volume" signifies cubic volume (vol), weight (wt) or mass (mass) that is determined by means of a measuring device including a syringe, a balance, etc. Since the acceleration of gravity on the earth is of an approximately constant value of 9.8 Newton (N), weight and mass are assumed to be synonymous.

(Parting) "Parting" signifies the part joining the movable side mold and the stationary side mold. A molding space is formed between the movable side mold and the stationary side mold that are joined at the parting, and the molding space is filled with a resin.

Here the mold on the stationary side is an example of a first mold. The mold on the movable side is an example of a second mold. Incidentally, in the present invention the mold on the stationary side may be called stationary side mold or stationary mold. Moreover, in the present invention the mold on the movable side may be called movable side mold or movable mold.

Meanwhile, the part at which the resin filled in the cavity has contact with the stationary side mold (surface defining the mold space) is called "parting on the stationary side mold" or "parting on the stationary side".

The part at which the resin filled in the cavity has contact with the movable side mold (surface defining the mold space) is called "parting on the movable side mold" or "parting on the movable side".

The part at which the slide core provided on the stationary side mold has contact with the resin filled in stationary side mold is called "parting of slide core on the stationary side".

The part at which the slide core provided on the movable side mold has contact with the resin filled in the movable side mold is called "parting of slide core on the movable side".

Figure 2:
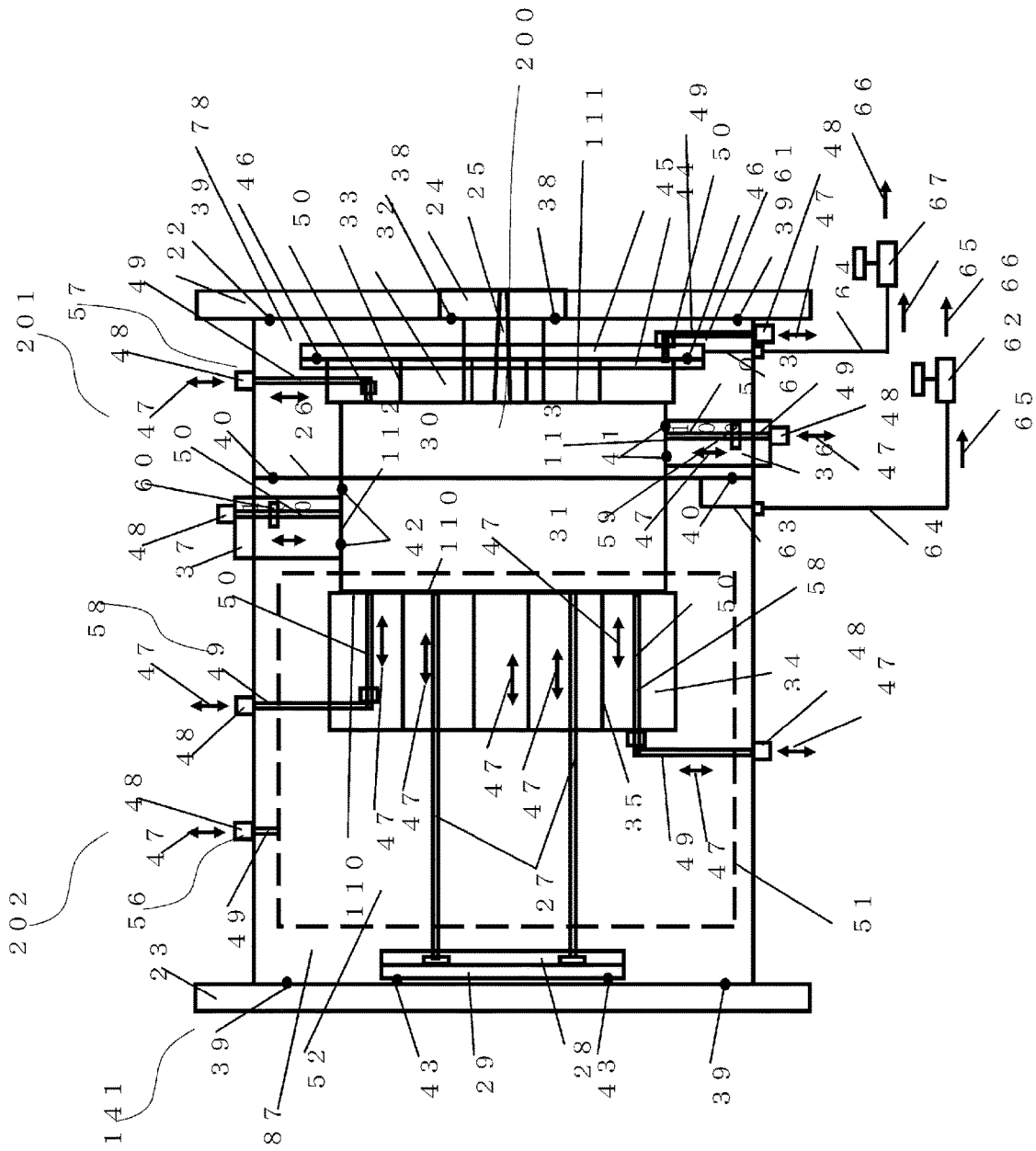
FIG. 2 is a schematic diagram of a sealed mold provided with an ejector box.
Figure 3:
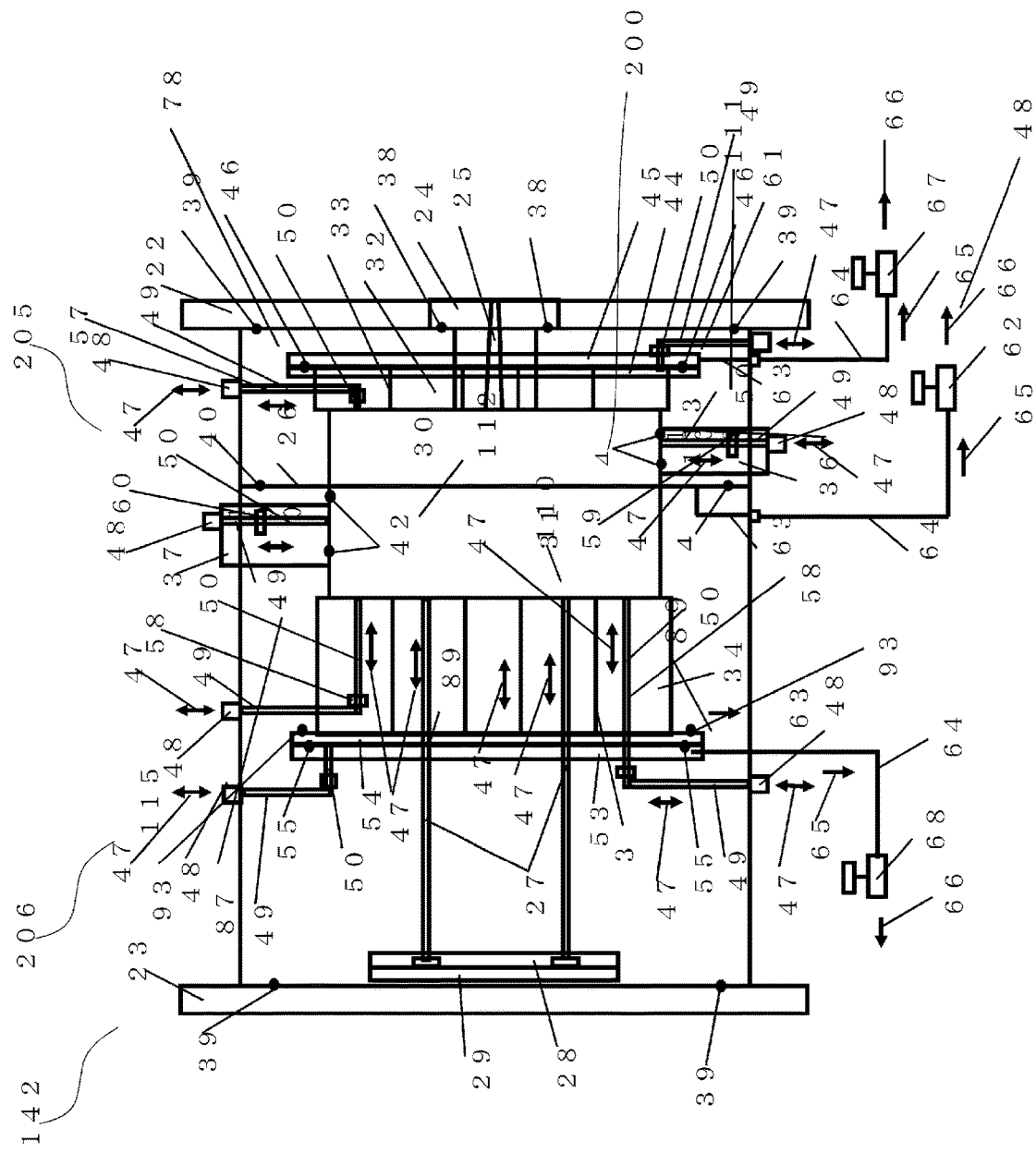
FIG. 3 is a schematic diagram of a sealed mold devoid of an ejector box.

The part that is subjected to the pressurized fluid in a mold device is, as shown in FIG. 2 and FIG. 3, pressurization part 111 on the stationary side mold, pressurization part 113 of the slide-core on the stationary side mold, pressurization part 110 on the movable side mold, or pressurization part 112 of the slide-core on the movable side mold.

(Pressurized Fluid)

"Pressurized fluid" signifies a gas compressed at a pressure higher than 1 atmospheric pressure [760 mm (millimeter) Hg] or a liquid. A supercritical fluid is included in gas. In the present invention, a carbonated water dissolving a gas, micro-bubble water containing a gas and the like are treated as liquid. Moreover, in the present invention, "fluid" signifies a gas or a liquid.

(Gas)

Like a liquid, the "gas" is a fluid, wherein the thermal motion of molecules exceeds the inter-molecular force and hence molecules are able to move more freely than in the liquid state. In a gas, the variation of volume as a function of temperature and pressure is great. Furthermore, a gas does not have fixed dimensions of volume, and if the gas is put in a container, the gas fills the container, and the gas is highly mobile and by nature tends to expand always. The density of a gas is smaller than a liquid or a solid and the gas can be compressed with ease. The volume of the gas is proportional to temperature and inversely proportional to pressure.

(Vapor)

"Vapor" signifies an entity that is in the state of gas that has been created by vaporization of a liquid substance or by sublimation of a solid substance. In particular, a substance with a temperature below the critical temperature is called gas phase.

(Vaporization) "Vaporization" signifies a phenomenon wherein a substance changes from a solid or liquid state to a gas state. Vaporization is either evaporation or boil.

(Liquid)

"Liquid" has a state wherein molecules exert their own attraction force to each other, is mobile, and changes its shape in conformity with that of a container. While the liquid presents the properties as a fluid same as the gas, the Pascal's law applies to the liquid because its compressibility is low as compared with the gas. A liquid maintains an almost constant density and, unlike a gas, does not expand to fill the entire volume of a container. The liquid has particular properties such as the ability to form its own surface, and as a special property presents the surface tension. Intuitively speaking, if a substance has a fixed geometry, it is a "solid", if it has no fixed geometry but a fixed volume, it is a "liquid", and if it has neither a fixed geometry nor a fixed volume, it is a "gas".

(Fluid Pressurization)

"Fluid pressurization" signifies an operation in which a pressurized fluid is injected into the clearance between a resin in the cavity and the cavity surface to exert the pressure of the pressurized fluid on the resin and apply (transmit) pressure on the resin surface.

In the present invention, "fluid pressurization" may be alternatively called "pressurization by fluidic pressure", "pressure-keeping by fluid" or "fluid pressure-keeping". In the present invention, the operation of applying a pressure from outside to a fluid is called "compression".

"Resin pressure keeping" signifies, for example, an operation in which a pressure is applied by the screw of the injection molding unit to a molten resin filled in the cavity, to increase the density of the molten resin, to improve the transcription performance conforming to the mold and to reduce the occurrences of sink marks in the appearance.

(Combined Usage)

"Combined usage" signifies that a factor is not used alone but used together or in combination with another one.

Then, the mold device is described.

(Mold Device)

When the pressurized fluid is injected into the clearance (the clearance between a molten resin and a mold) between the resin injected in the cavity and the surface of the first mold or the second mold (an example of the surface defining a molding space), and the resin in the cavity is pressurized by the pressurized fluid, the pressurized fluid escapes through the clearances around ejector pins, and hence the pressurization effect by the pressurized fluid decreases. Here, an ejector pin is an example of shaft body.

As a means to solve the problem, a technique is known where seals (sealing components) such as O-rings, rubber-sheet and the like are provided to prevent the pressurized fluid from leaking to outside.

Besides, a rubber sheet makes a surface-to-surface contact and consequently its sealing effect is superior to that of an O-ring which makes a line-to-surface contact. A mold device provided with sealing properties is called a sealed mold. A mold device without sealing properties has a defect that a fraction of pressurized fluid leaks to outside.

Figure 32:
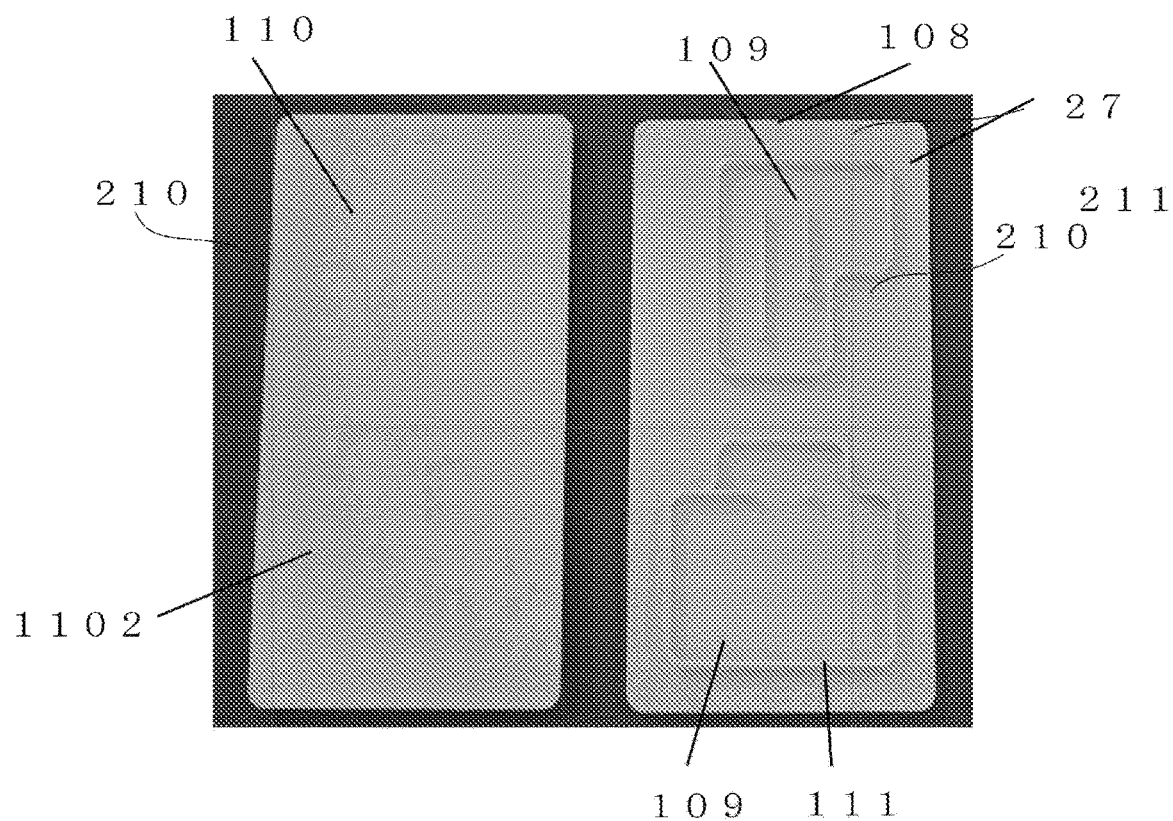
FIG. 32 is a test piece used in an embodiment wherein the part on the movable side is partially pressurized by fluidic pressure.

With respect to features of a molded article, as seen on the molded article 210 in FIG. 32, it is also possible to provide a rib 211 to prevent the leakage to outside of a gas as an example of pressurized fluid made to act in the clearance between the resin in the mold and the cavity wall. In the present invention, the rib 211 is called "gas rib" or "pressurization rib" and may also be referred to as "rib for preventing the leakage of pressurized fluid".

In the pressurized air injection molding, the means to inject a pressurized fluid into the cavity by providing a gas rib on the molded article is employed in particular in the partial fluid pressurization. In the present invention, the process undertaken by using partially the fluid pressurization is called "partial pressurization". The "partial pressurization" may be applied by providing similar gas ribs in areas close to the end of an entire molded article, in order to prevent the leakage of pressurized fluid to outside.

Figure 35:
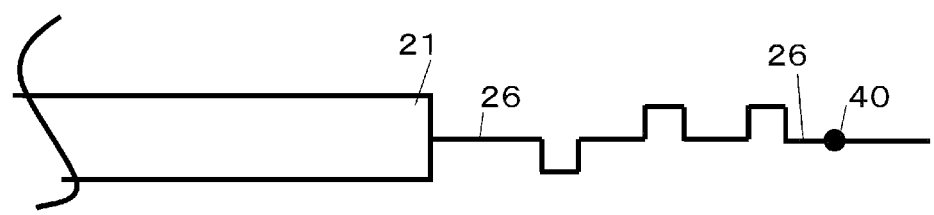
FIG. 35 is a cross-sectional diagram representing the structure of parting of a mold.

Since a certain degree of effect can be recognized even when the fluid pressurization alone is applied to a resin in the cavity, it is not necessarily required to use seals in the parting such as seal 40, seal 41, seal 42 in FIG. 2, for example, or to use gas ribs.

Where necessary, a variant structure of parting is utilized as shown in FIG. 35. Moreover, by increasing the surface pressure of the portion of parting close to the cavity, the flowing of pressurized fluid around into the non-pressurized opposite side is prevented.

(Device for Preparing Pressurized Fluid)

FIG. 1 is a circuit diagram of pressurized air (air pressure) of a device 140 for preparing pressurized fluid.

If the interface and the like with other types of units including an injection molding unit (an example of molding devices) are modified, the device 140 for preparing pressurized fluid can be converted also for the application in gas-assist molding device, inner gas counter pressure (IGCP) device, MuCell, AMOTEC device, etc. In the following sections, the method for carrying out the pressurized air injection molding by using the device 140 for preparing pressurized fluid shall be described.

The nitrogen gas cylinder 1 is filled with nitrogen gas injected at a pressure of 15 MPa (mega-pascal). The nitrogen gas filled in the nitrogen gas cylinder 1 is depressurized once to a pressure of 1 MPa to 3 MPa by means of a regulator (pressure control valve) 4 and compressed to a pressure of 30 MPa to 50 MPa by using a gas-booster 8, for example. The compressed high-pressure nitrogen gas (an example of pressurized fluid) is stored in a receiver tank 10 under pressure.

In the process of pressurized air injection molding, when a resin in the cavity 21 is pressurized by fluidic pressure by using the high-pressure nitrogen gas, the gas can be depressurized by means of the regulator (pressure control valve) 12 for setting (adjusting) the gas pressure to an optimum level. Incidentally, the nitrogen gas can be also one which has been obtained by separation from the air by using PSA or a separation membrane. Here the PSA stands for the pressure swing adsorption system, a system for separating nitrogen gas from the air by adsorption on activated carbon. The gas booster 8 can also be replaced by a high pressure compressor.

The device 140 for preparing pressurized fluid is equipped with: manometer 2 indicating the pressure in the nitrogen gas cylinder 1; manual valve 3 to be closed when the nitrogen gas cylinder 1 is replaced; manometer 5 to verify the pressure set by the regulator 4; check valve 6 to prevent the backward flow of nitrogen gas; manometer 7 to verify the pressure of the intermediate stage of gas booster 8 during compression; manometer 9 to verify the pressure in the receiver tank 10; manual valve (drain valve) 11 to evacuate the high-pressure nitrogen gas in the receiver tank 10; manometer 13 to verify the pressure of pressurized fluid; and piping 17. Incidentally, the code (arrowhead) 16 indicates the flow direction of pressurized fluid and the code 18 (arrowhead) indicates that of exhaust (blowout) of pressurized fluid. Moreover, the code 20 relates to the pressurized fluid expelled into the atmosphere. While they are omitted from the illustration, safety valves are provided in necessary locations such as receiver tank 10, for example.

(Device Provided with Multiple Pressurization Circuits)

Figure 46:
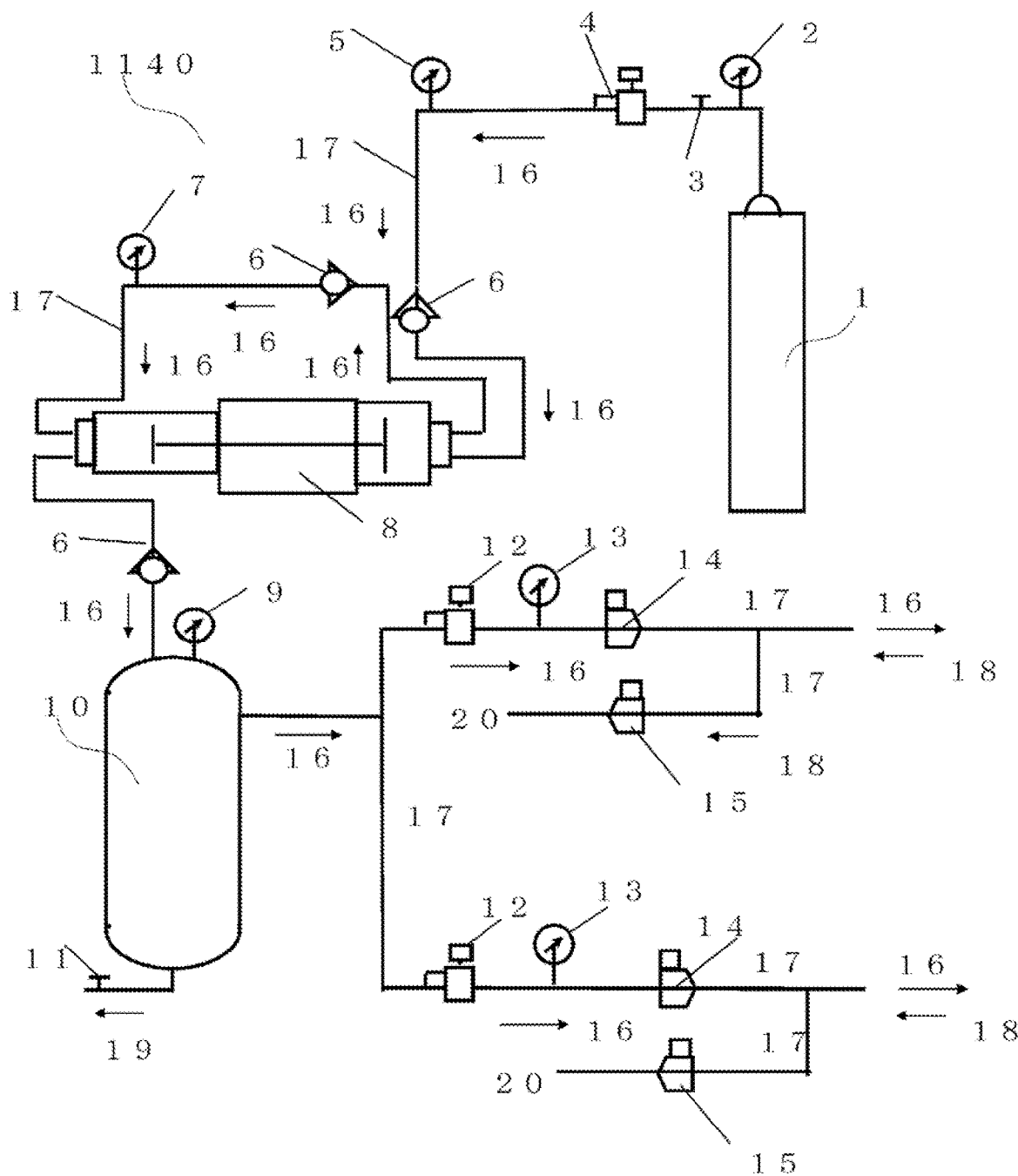
FIG. 46 is a circuit diagram of pressurized air of a device for preparing pressurized fluid provided with multiple pressurizing circuits.

The device 140 for preparing pressurized fluid shown in FIG. 1 comprises a unit of regulator 12 and a system of pressurization circuit. Consequently, the device 140 for preparing pressurized fluid is able to set up a set of operating conditions including the pressure of pressurization and the time of pressurization. Whereas, the device for preparing pressurized fluid 1140 presented in FIG. 46 is provided with two systems of circuit for filling the mold 21 in the downstream of the regulator 12 shown in FIG. 1. Consequently, the device for preparing pressurized fluid 1140 is able to set up separately multiple sets of conditions of pressurization pressure, pressurization time, etc., and regarding the conditions of injection pressure, it is able to set them at a higher value for an early phase of operation and at a lower value for a later phase of it or vice versa. The device for preparing pressurized fluid 1140 is able set up individually at an optimum level for pressurization conditions for each one of molded articles in the operation for obtaining a paired article, two articles at a time, or multiple articles at a time. In this way, the provision of multiple pressurization circuits enables to set up delicate conditions of fluid pressurization.

(Interface)

Now, the interface between a device 140 for preparing pressurized fluid and an injection molding unit (communication between the actions of two systems) is described. Since a high pressure fluid is used in the pressurized air injection molding, from the viewpoint and in consideration of security, it is needed to operate both the device 140 for preparing pressurized fluid and the injection molding unit while they mutually transmit as well as receive relevant signals.

In respect to the timings (times, points of time) of fluid pressurization in the injection molding, the following modes can be described, for example:

Fluid pressurization is carried out during the injection of resin into the cavity (Mode 1);

Fluid pressurization is carried out immediately after the injection of resin (Mode 2);

Fluid pressurization is carried out after lapse of a certain period of time following the resin injection (Mode 3);

In order to lower the resin pressure filled in the cavity, the screw of the injection molding unit is retracted to a predetermined position immediately after the resin injection to make a suck-back, and the fluid pressurization is carried out immediately after the suck-back is started (Mode 4);

Fluid pressurization is carried out during the process of suck-back (after lapse of a certain period of time, or the screw has passed a predetermined position) (Mode 5).

Fluid pressurization is carried out immediately after the process of suck-back has been completed (Mode 6).

Fluid pressurization is carried out after lapse of a certain period of time following the completion of the suck-back (Mode 7).

(Combined Usage with Resin Pressure Keeping)

The pressurized air injection molding is able to further improve the transcription performance conforming to mold by combined usage of one of the 7 said Modes of fluid pressurization 1 to 7 with the resin pressure keeping.

For example, in Mode 1, the molding process can be carried out first by injecting resin into the cavity while the resin is pressurized by pressurized fluid and then by applying the resin pressure keeping.

Moreover, in Modes applying the suck-back process, the suck-back operation can be carried out after first injecting resin into the cavity, and then applying the resin pressure keeping.

Furthermore, the fluid pressurization can be carried out after a resin has been injected into the cavity with a full-pack and at timings in association with the subsequent application of resin pressure keeping, i.e., simultaneously with resin pressure keeping, in mid-course of resin pressure keeping, immediately after the end of resin pressure keeping, or after lapse of a certain period of time following the end of resin pressure keeping.

(Process of Fluid Pressurization)

Process of fluid pressurization shall be described.

In the aforementioned Modes 1 to 7, the pressurized fluid is injected into the cavity to pressurize the resin there by fluid, the fluid being injected at one point or multiple points on at least one of the parting on the movable side and the parting on the slide core on the movable side, or on at least one of the parting on the stationary side and the parting on the slide core on the stationary side.

The modes of fluid pressurization in the pressurized air injection molding include direct pressurization and indirect pressurization.

The "direct pressurization" is a method by which the pressurized fluid is injected into the clearances between a resin in the cavity and the surface of cavity (parting on the stationary side or parting on the movable side). In the direct pressurization, the pressurized fluid is made to act directly on the surface of resin in the cavity through fill port provided in the apical end of pressurization pin and to presses the resin in the cavity onto the cavity surface.

The "indirect pressurization" is a method by which the pressurization pin for pressurized fluid is provided in a location other than the cavity, and through the flow channel of pressurized fluid, the pressurization takes place on a part or the entire body of resin that comes into contact with at least one of the parting on the movable side and the parting on the slide core on the movable side, or with at least one of the parting on the stationary side and the parting on the slide core on the stationary side.

The pressurized fluid can be introduced from the bottom of a nested element and made to act on the resin in the cavity through an ejector pin or clearances between nested elements.

Figure 18:
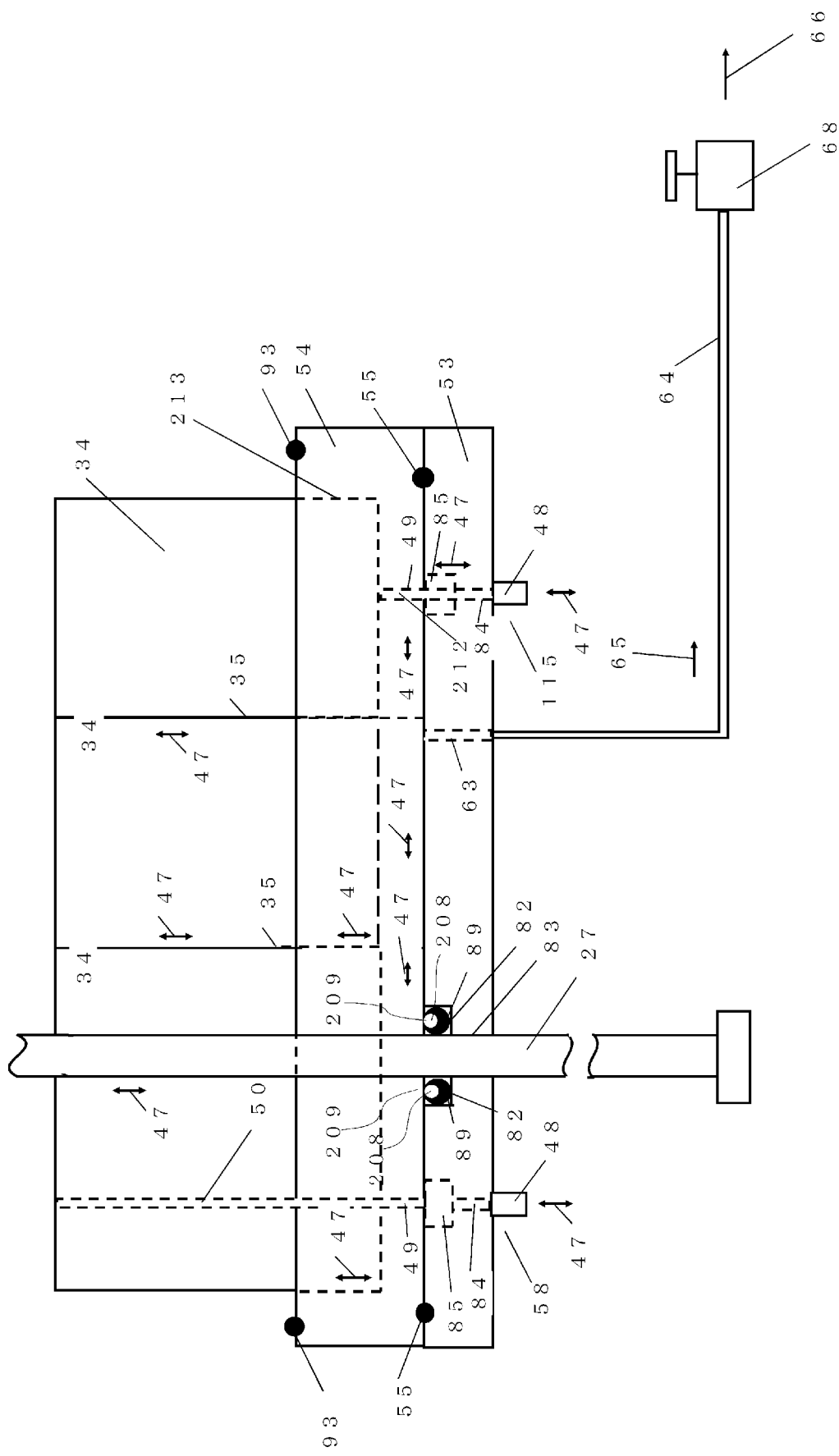
FIG. 18 is a schematic diagram presenting a means for sealing each of ejector pins in FIG. 3 by using a seal-ring.
Figure 19:
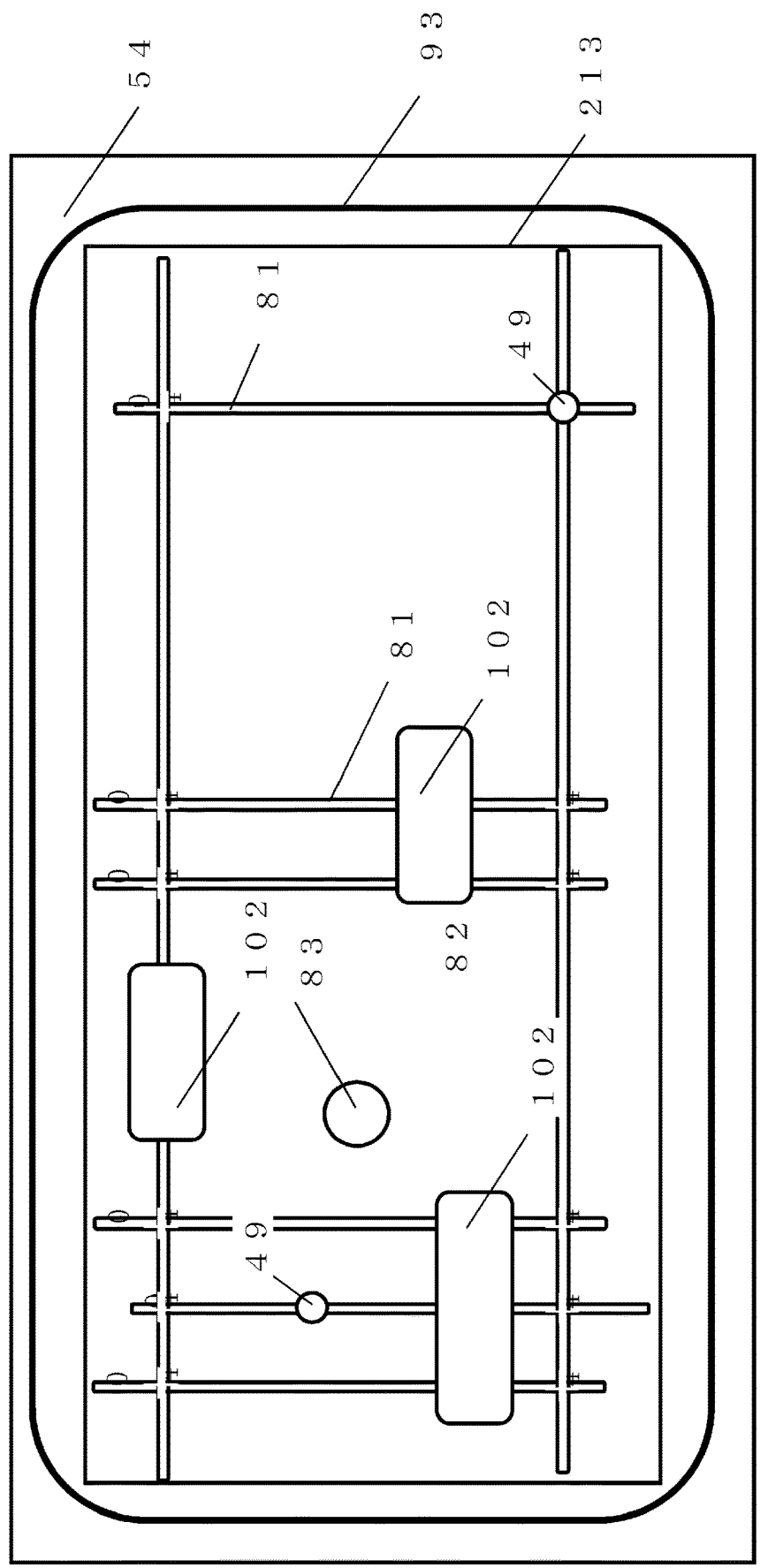
FIG. 19 is a schematic diagram representing the structure of plate 54 for fixing and sealing a part like a nested element.

In the indirect pressurization, as all the elements including a nested element and ejector pins are enclosed by seal 55 in FIG. 18 and seal 93 in FIG. 19, the entire system comprising the nested element, ejector pins, etc. is supposed to be pressurized. In the case where a mold has certain portions of which the pressurization by pressurized fluid is not desirable, it is divided into blocks each of which is sealed separately by using individual sealing elements like seal 55 and seal 93.

In the aforementioned Modes 1 to 7, the time from the injection molding till the start of fluid pressurization may be made to last a little bit long. The lapse of time is called "delayed time". In this case, both valve 14 and valve 15 are closed.

When the delayed time is prolonged, the solidification of molten resin injected into the cavity advances, and consequently the action and the effect of fluid pressurization is reduced. Where the thickness of molded article is thick, the pressurized fluid enters into the molded article and creates void, but by prolonging the delayed time, the surface layer where the cooling and solidification advances (called "skin layer" in the present invention) is formed, and therefore the fluid pressurization is possible even in the case of a thick molded article.

(Pressurization Time)

"Pressurization time" signifies the length of time during which a molten resin in the cavity is pressurized by fluidic pressure after the valve 14 is opened following the lapse of a delayed time. Valve 15 is closed.

The prolongation of pressurization time improves the transcription performance.

(Retention Time)

"Retention time" signifies the length of time from the end of pressurization until the time of atmospheric discharge (blowout). During this period, both valve 14 and valve 15 are closed.

The retention time has the effect to reduce the strain within a molded article.

(Atmospheric Discharge Time)

"Atmospheric discharge time" signifies the point of time at which the fluid having pressurized the resin in the cavity is discharged to outside.

Both valve 14 and valve 15 are opened or closed by the timer which can set up delayed time, pressurization time, retention time and atmospheric discharge time for any chosen timings.

(Pressurization Pressure)

"Pressurization pressure" signifies the pressure of pressurized fluid at which a molten resin injected in the cavity is pressurized. The regulation of pressurization pressure is carried out by the regulator 12. A lower pressurization pressure results in a lower transcription performance but in a lower strain as well.

The number of pressurization pin can be single but can also be multiple. Moreover the number of fill port provided at the tip of pressurization pin can also be single or multiple. When the number of pressurization pin is multiple and the pressurized fluid is injected through respective fill ports, the injection pressure of pressurized fluid at different fill ports can be uniform or differ from one to another. The injection timings for respective fill ports can also be set up individually. Here, the "fill port" signifies the apical end of pressurization pin 50.

In the case where the resin injection into the cavity 21 is started and the device 140 for preparing pressurized fluid receives from the injection molding unit a signal for starting fluid pressurization against the resin in the cavity 21, the operation of fluid pressurization of the resin in the cavity 21 is started by opening the filling valve 14 in FIG. 1 and by injecting the pressurized fluid into the parting on the movable side and the like.

For example, the device 140 for preparing pressurized fluid closes the filling valve 14 at the stoppage (after expiration of a preset waiting time) of a timer (not illustrated) and then opens the atmospheric discharge valve 15. By these steps, the pressurized fluid in the cavity 21 is discharged [exhausted (blown out)] into the atmosphere.

The device 140 for preparing pressurized fluid does not necessarily have to open the atmospheric discharge valve 15 immediately after closing the filling valve 14 but it can also keep on containing after that for a while the pressurized fluid in the cavity 21 and then open the atmospheric discharge valve 15 to exhaust the pressurized fluid in the cavity 21. In the present invention, this maneuver is called "retention of pressurized fluid" and the duration of time while retaining the pressurized fluid is called "retention time".

The program (sequencer) stored in the control section (not illustrated) in the device 140 for preparing pressurized fluid is reset (completes the operation) after receiving a signal, for example the signal of the end of mold opening, from the injection molding unit.

(Pressure Control and Volume Control)

The device 140 for preparing pressurized fluid can also pressurize the resin in the cavity by using the pressurized fluid in the receiver tank 10 by opening the filling valve 14 after storing under pressure (after reserving) the pressurized fluid in the receiver tank 10 irrespective whether the pressure control valve 12 is present or not. This mode of operation is called "pressure control (pressurization by controlled pressure)" of pressurized fluid.

In the device 140 for preparing pressurized fluid, the gas-booster 8 can be replaced with a plunger and the receiver tank 10 can be dispensed with. In such a case, the plunger serves also as a receiver tank 10, measures out an aliquot of fluid necessary every time (for each shot, for molding every article), and pressurizes the fluid. This mode of operation is called "volume control (pressurization by controlled volume)" of pressurized fluid. Here, a plunger signifies a device that consists of a piston and a cylinder as main constituents, where the piston makes a reciprocating motion with respect to the cylinder. In other words, in a plunger, a piston is moved in a direction to let in a desired volume of fluid into a cylinder, and then moved in the direction opposite to the first direction to pressurize the inside of the cylinder as well as to inject the fluid into the cavity.

In FIG. 1, the code (arrowhead) 19 indicates the flow direction of pressurized fluid in the case where the pressurized fluid in the receiver tank 10 is discharged out to the atmosphere by opening the manual valve 11.

Among those fluids used in fluid pressurization, the gas is air, nitrogen, carbon dioxide (carbon dioxide gas), hydrogen, rare gas like helium and argon, superheated steam, oxygen, alcohol vapor, ether vapor, natural gas, and the like, or mixture of these gas. Normally, as a fluid, a gas containing nitrogen or air as a main component is used, in consideration of cost and facility for utilization including the safety.

Among those fluids used in fluid pressurization, as a liquid, water is normally used while ether, alcohol or liquefied carbon dioxide can also be used. In the case where a liquid of a low temperature is used for fluid pressurization, if the resin injected into the cavity is a thermoplastic resin or a thermoplastic elastomer, the cooling and solidification of a molten resin can be accelerated, and consequently the molding cycle can be expedited and the productivity can improve.

In a contrasting situation where a liquid of a high temperature is used for fluid pressurization, while the cooling and solidification is slowed down, the transcription performance conforming to the cavity surface is improved and molded articles with a clean appearance can be obtained. In the case where water is used for fluid pressurization, as the boiling point of water under normal pressure and at normal temperature is 100° C., water is used at a temperature below 100° C. In the case where glycerin is used for fluid pressurization, as the boiling point of glycerin is 290° C., it can be used at a higher temperature in comparison with the case of use of water. In the case where a fluid of high temperature is used in fluid pressurization, the setting of the mold temperature at a higher value enables to obtain a more effective result.

In the case where an evaporable liquid, for example, liquefied carbon dioxide, ether, alcohol and the like, the liquid vaporizes due to the heat of a molten resin (particularly thermoplastic resin and thermoplastic elastomer). In other words, since the liquid takes out heat of the molten gas by vaporization heat, the cooling and solidification of molten resin is accelerated and hence the molding cycle can be expedited.

This means utilizing the vaporization heat is not limited to fluid pressurization in the pressurized air injection molding, but it can also be applied to the blow molding and in the latter the cycle acceleration can be expected owing to vaporizing heat. A liquid injected into the cavity such as alcohol, ether or the like, is discharged out to atmosphere or retrieved after the end of every cycle. As for the retrieval means, for example, after the end of fluid pressurization, the gas or liquid in the mold and the piping is retrieved by means such as aspiration, cooled and compressed as needed and converted into a liquid.

(Fluid Pressurization)

In the case where, in order to carry out the fluid pressurization from the movable side mold of an injection molding mold of a conventional structure, the pressurization pins are provided on the movable side mold, and a pressurized fluid is injected to pressurize directly the resin in the cavity, a portion of the pressurized fluid escapes to the outside of injection molding mold through clearances around the ejector pins. As a means to solve this problem, a sealed mold 141 in FIG. 2 or a sealed mold 142 in FIG. 3 is used.

(Mold Structure: Ejector Box Type)

As shown in FIG. 2, a sealed mold 141 presents a box structure enclosing an ejector mechanism. Here the ejector mechanism signifies ejector pins 27 and an ejector plate. The ejector plate comprises the upper ejector plate 28 and the lower ejector plate 29. As shown in FIG. 2, the ejector plate fixes the ejector pins 27 by holding the flanged part provided at the base end section of ejector pin 27 between the upper ejector plate 28 and the lower ejector plate 29, the ejector pins 27 passing through holes perforated on the ejector plate 28.

Incidentally, although the illustration is omitted, in the mounting plate 23 on the movable side, perforated holes are provided in a part of area facing the lower ejector plate 29. These perforated holes are those through which the ejector rods (not shown) linked to the clamping cylinder and platen of the injection molding unit are inserted. The ejector rods make a reciprocating movement driven by the reciprocating movement of an actuator, for example, a hydraulic cylinder or an electric motor. The ejector pins make a reciprocating movement in conjunction with the reciprocating movement of the actuator and the ejector plate.

With the sealed mold 141, the pressurized fluid is injected not only into the cavity 200 composed of the cavity 30 on the stationary side and the cavity 31 on the movable side but also into the space 52 formed by the ejector box 51. In this case, as the sealed mold 141 is able to make the pressurized fluid act on the surface of resin in the cavity 200 through the clearances around ejector pins 27 as an example of shaft body, the effect of fluid pressurization can be fully achieved. Here, the clearances around ejector pins 27 signify those between the ejector pins 27 and the perforated holes formed in the nested element 34 constituting a part of the movable side mold 202.

Incidentally, the ejector box 51 signifies a structure (box structure) that encloses and hermetically seals off the ejector mechanism within an enclosed space and is represented in FIG. 2 with dashed lines.

The sealed mold 141 is provided with a stationary side mold 201 and a movable side mold 202. Here, the sealed mold 141 is an example of mold device. The stationary side mold 201 is an example of the first mold. The movable side mold 202 is an example of the second mold.

The movable side mold 202 can be made to contact or separate from the stationary side mold 201 with the parting 26 serving as a boundary plane.

The stationary side mold 201 comprises: a mounting plate 22 on the stationary side to mount the stationary side mold 201 on the injection molding unit (not illustrated); and the stationary side mold plate 78 mounted on the mounting plate 22 on the stationary side. The mounting plate 22 on the stationary side is touched by the nozzle of the injection machine, and fitted with a spool bush 24 provided with a perforated hole to conduct a molten resin. The mold plate 78 is provided with: the cavity 30 on the stationary side; a spool 25 to conduct the molten resin flowing from the spool bush 24 to the cavity 30 on the stationary side; a nested element 32 on the stationary side; and a slide core 36.

The movable side mold 202 comprises: mounting plate 23 on the movable side to mount the movable side mold 202 on the injection molding unit (not illustrated); and movable side mold plate 87 mounted on the mounting plate 23 on the movable side. The mold plate 87 is provided with: ejector pins 27 to expel a molded article from the cavity; upper ejector plate 28 and lower ejector plate 29 which fix the ejector pins as well as make them make a reciprocating movement; cavity 31 on the movable side; nested element 34 on the movable side; slide core 37; connecting port 48 to introduce the pressurized fluid prepared by the device 140 for preparing pressurized fluid into the space 52 within the ejector box 51; and passageway 49 of pressurized fluid.

Moreover, the sealed mold 141 is provided with various types of seals in order to prevent the pressurized fluid from leaking to the outside of the sealed mold 141. More specifically, the sealed mold 141 is provided with: seal 38 provided for preventing the leakage of pressurized fluid from the spool bush 24; seal 39 between the mounting plate 22 on the stationary side and the mold plate 78 on the stationary side; seal 39 between the mounting plate 23 on the movable side and the mold plate 87 on the movable side; seal 40 installed on the parting; seal 41 on the surface of slide core provided on the stationary side; seal 42 on the surface of slide core provided on the movable side; seal 43 provided on the lower ejector plate 29; lower seal plate 44 of the bottom of the nested element on the stationary side; upper seal plate 45 of the bottom of the nested element on the stationary side; and seal 46 provided between the seal plate 44 and the seal plate 45.

Incidentally, the code (arrowhead) 47 indicates the flow direction of pressurized fluid. However, the code 47 on the stationary side mold 201 is omitted from illustration here because it is similar to that on the movable side mold 202. Furthermore, the code 33 indicates the clearance in the joining part of the nested element on the stationary side, and the code 35 indicates the clearance in the joining part of the nested element on the movable side. Regarding the pressurization pin 50, FIGS. 4 to 17 describe the detailed structure of it and the structure of its incorporation into the mold.

The sealed mold is further provided with: injection means 56 for injecting the pressurized fluid into the space 52 formed by the ejector box 5; injection means 57 for injecting the pressurized fluid directly into the resin in the cavity 200 so as to pressurize directly the resin in the cavity 200 by fluidic pressure from the stationary side; injection means 58 (injection means 58 at upper side of the drawing in FIG. 2) for injecting the pressurized fluid directly into the resin in the cavity 200 so as to pressurize directly the resin in the cavity 200 by fluidic pressure from the movable side; injection means 59 for injecting the pressurized fluid directly into the resin in the cavity 200 from the slide core 36 on the stationary side so as to pressurize the resin in the cavity 200 by fluidic pressure; and injection means 60 for injecting the pressurized fluid directly into the resin in the cavity 200 from the slide core 37 on the movable side so as to pressurize the resin in the cavity 200 by fluidic pressure.

In the case where the structure used in the lower seal plate 44 and the upper seal plate 45 is provided at the bottom of the slide core 36 on the stationary side and the slide core 37 on the movable side, it is possible to pressurize indirectly the resin in the cavity 200 by fluidic pressure.

With the injection means 61, the resin in the cavity 200 is pressurized by fluidic pressure from the stationary side through clearances of the nested element 32 by injecting a pressurized fluid into the clearance between lower seal plate 44 and upper seal plate 45.

Figure 47:
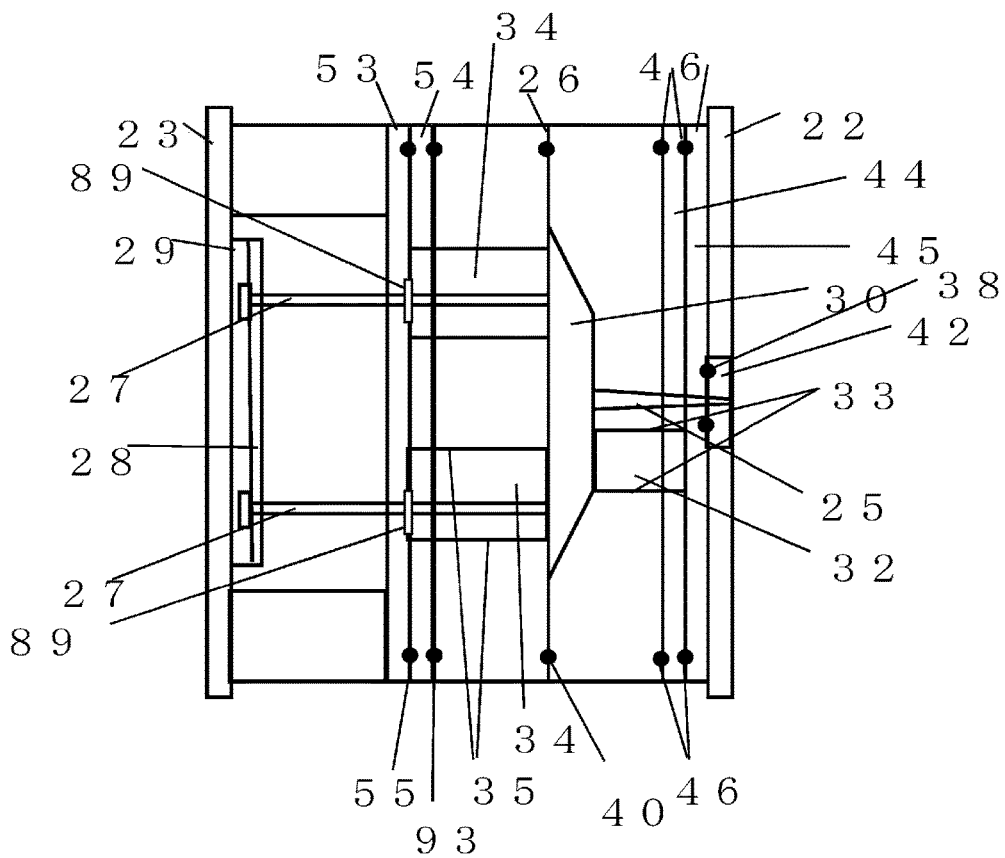
FIG. 47 is a schematic diagram of a mold wherein the seal-plate is extended to the outside of mold.

FIG. 3 illustrates a structure where the plate 53 and the plate 54 are provided at the bottom part of the nested element. FIG. 47 differs from this, illustrating a structure where plate 53 and plate 54 are fixed by holding them between the ejector block and the movable side mold plate. The means like this can be exploited also in the slide core on the stationary side.

(Utilization of ejector pins as pressurization pins) Then the means of fluid pressurization by utilizing ejector pins shall be described.

The pressurization pins depicted in FIGS. 4-9 were derived primarily by supplementary machining of ejector sleeves, and hence by utilizing this shape of pressurization pin as that of ejector pin 27, the fluid pressurization from ejector pins is enabled.

In the sealed mold 142 shown in FIG. 3, when the fluid pressurization is carried out by injecting a pressurized fluid into the clearance between plate 53 and plate 54 of the mold 206, the pressurized fluid may escape not only through the clearances between ejector pins and the mold but also through clearances 35 in the nested element 34. In such a case, it is feared that the pressurized fluid escaping through clearances 35 in the nested element 34 pressurizes the molten resin filled in the mold cavity and disturbs (distorts) the shape of molded article formed by the said molten resin.

In the fluid pressurization using the fluid from ejector pins as shown in FIGS. 52-60, as the pressurized fluid comes out only from the apical end of ejector pin, the operation can limit the aforementioned disturbance of shape of molded article. Moreover, the fluid pressurization using only the fluid from ejector pins can cope with the need of molding article with a complex shape.

The means of fluid pressurization using only the fluid from ejector pins shall be described in concrete terms by referring to drawings.

Figure 4:
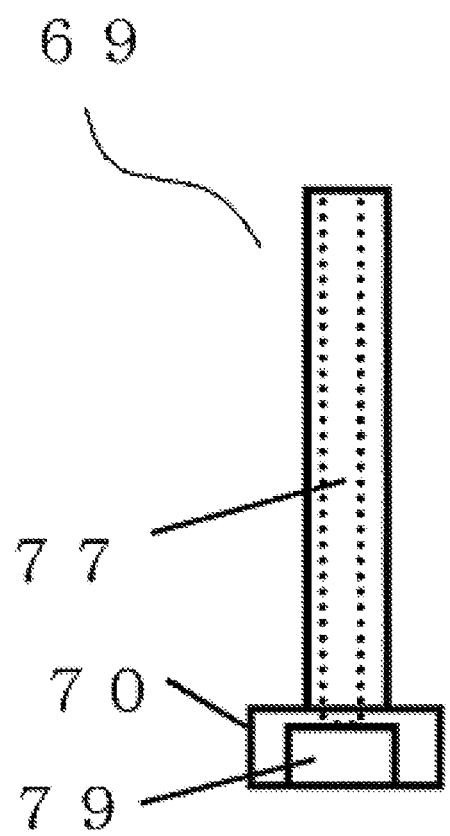
FIG. 4 is a schematic diagram of an outer tube 69 of a pressurizer pin 50.
Figure 52:
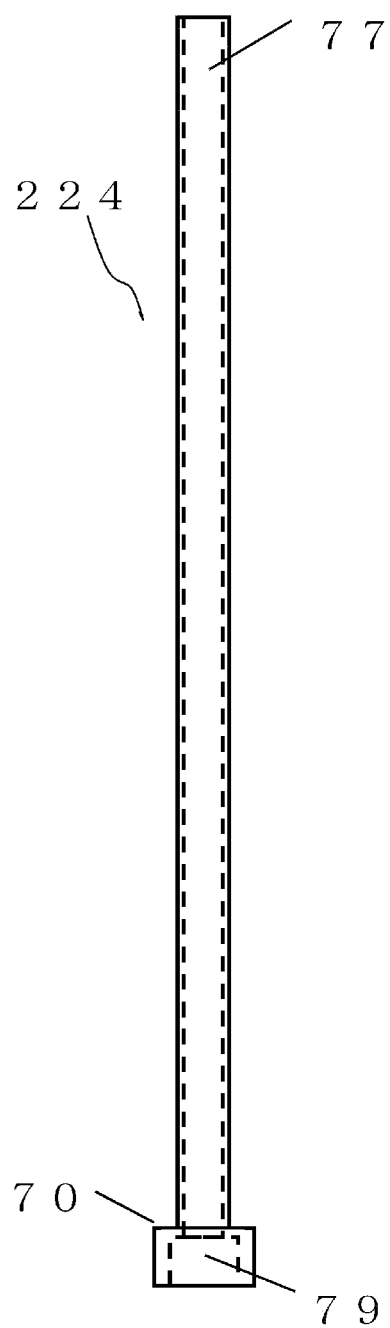
FIG. 52 is a schematic diagram of an outer tube 224 of ejector pin 226 when the fluid pressurization through ejector pin is carried out.

The outer tube 224 of ejector pin shown in FIG. 52, similarly as in FIG. 4, comprises: hollow shaft part in which a perforated hole 77 is formed to accommodate an inner core 225; and a flanged part 70 formed at one end of the said shaft part. In the flanged part 70, a depressed part 79 conducting to the perforated hole 77 is formed so that a flanged part 117 of inner core 225 can be inserted into it.

Figure 53:
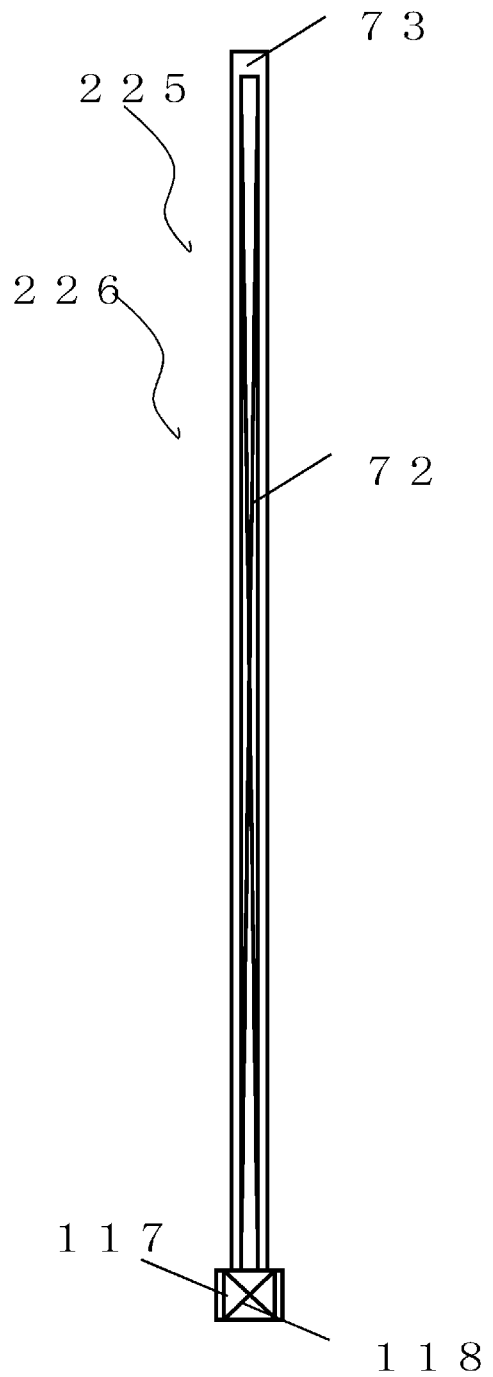
FIG. 53 is a schematic diagram of an inner core 225 of ejector pin 226 when the fluid pressurization through ejector pin is carried out.

FIG. 53 is a schematic diagram of the core part 226. The core part 226, similarly as in FIG. 5, comprises a shaft part and a flanged part 117 formed at one end of the said shaft part. In the shaft part, a D-cut (partially cut circle) section 72 is formed, and a D-cut section 118 is formed in the flanged part 117. The pressurized fluid passes through these D-cut sections 118 and 72. The apical end 73 is machined in a form similar to that of 74 or 75 of FIG. 9. Illustrations are omitted but the flanged parts are machined to create a groove shown in FIG. 7 or FIG. 8.

Figure 54:
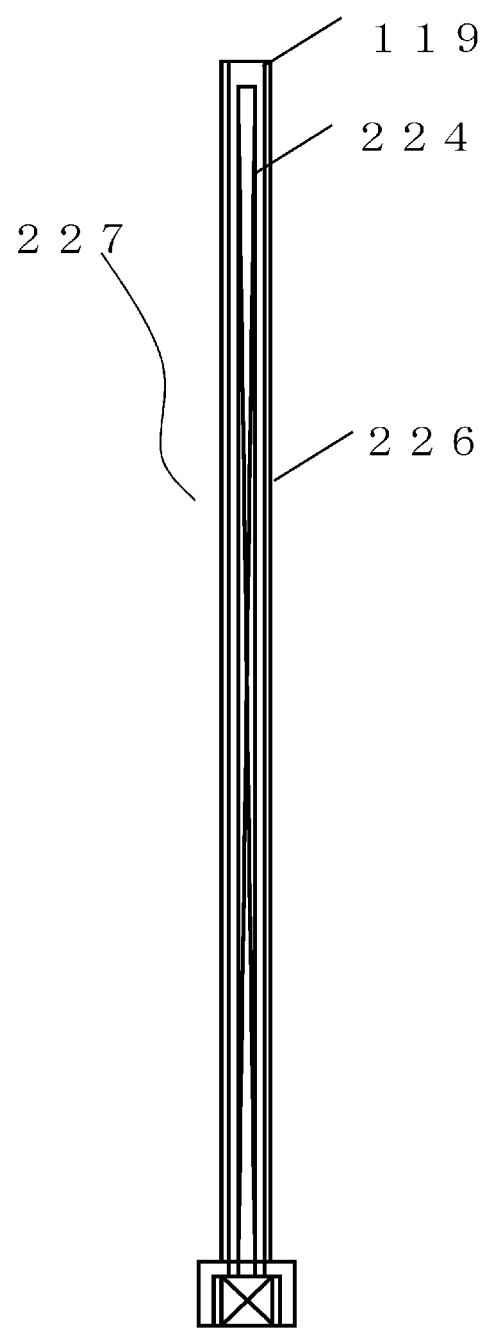
FIG. 54 is a schematic diagram of an ejector pin 226 when the fluid pressurization through ejector pin is carried out.

FIG. 54 illustrates the ejector pin 227 with a structure of pressurization pin having the outer tube 223 into which the core part 226 is inserted. The pressurized fluid introduced from the base end section of the pressurization pin 227 (depressed part 79 and clearances of D-cut section 72) passes through clearances between the perforated hole 77 and the D-cut sections 118 and comes out of the apical end 119.

Figure 55:
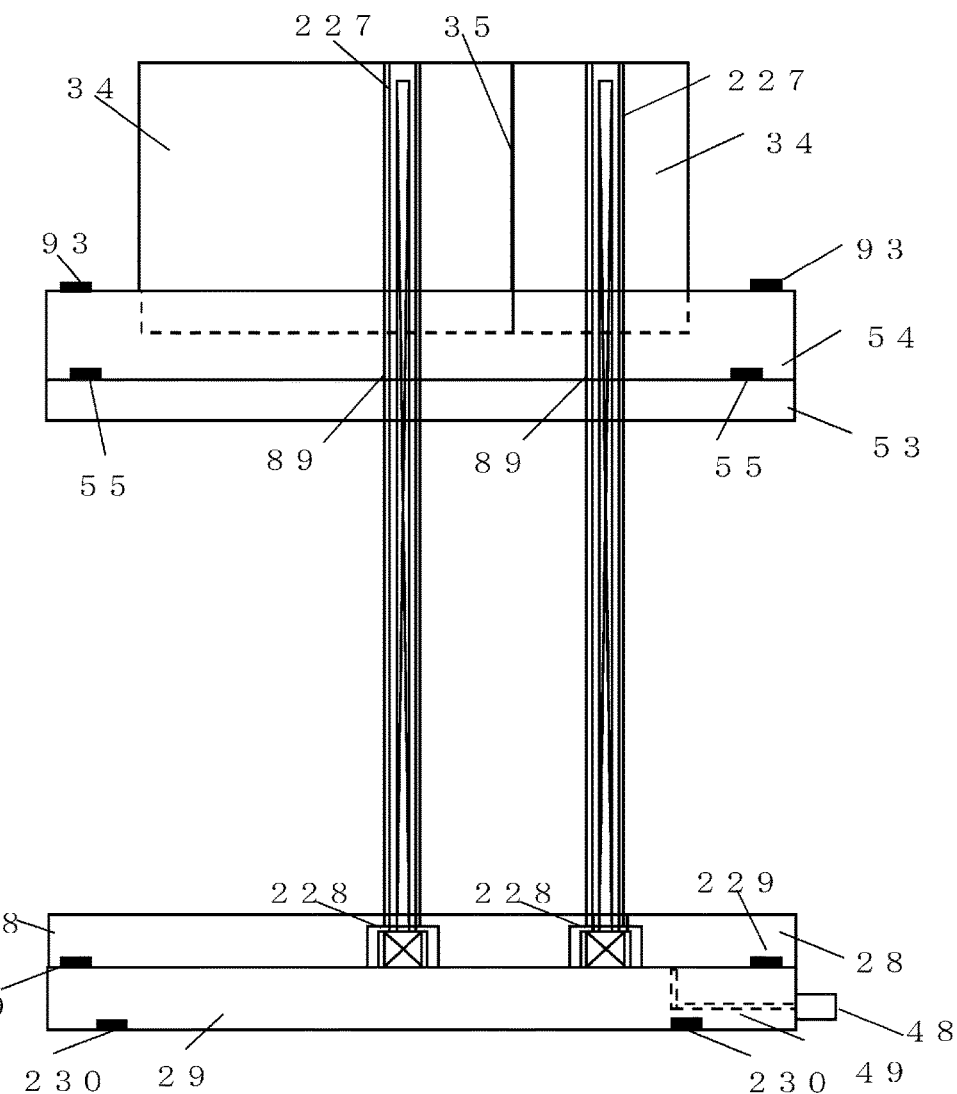
FIG. 55 is a schematic diagram representing the means of fluid pressurization through ejector pin.

FIG. 55 is a schematic diagram representing the mold structure incorporating the ejector pins 227 into the mold. The code 34 in FIG. 55 is a nested element and the code 35 is a clearance in the nested element. The structure for preventing leakage of pressurized fluid through clearances 35 in the nested element comprising seal 93, plate 53, plate 54, seal 55, and seal 89 on ejector pins 227 is the same as in FIG. 3.

In other words, the flanged part 70 of ejector pin 227 is held between plate 28 and plate 29. The seal 228 is provided between the upper surface of flanged part 70 and plate 28. Between plate 28 and plate 29, the seal 229 is provided to prevent leakage of pressurized fluid through the clearance between plate 28 and plate 29. Where necessary, the surface of contact between the bottom surface of plate 29 and the mounting plate 23 also is sealed by 230. The code 49 indicates the passageway of pressurized fluid, and the code 48 indicates the port for connection with the device 140 for preparing pressurized fluid shown in FIG. 1 or the device for preparing pressurized fluid 1140 shown in FIG. 46.

Figure 56:
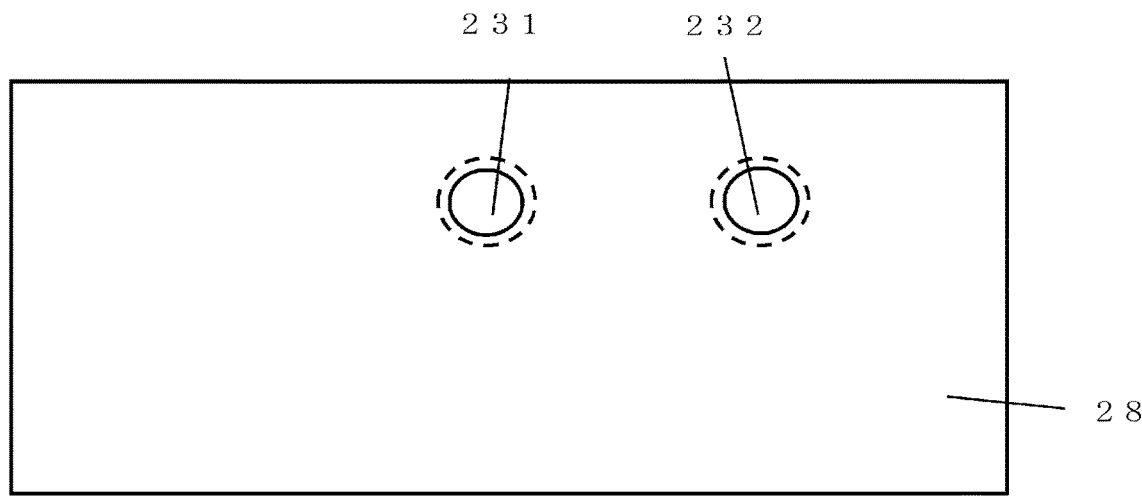
FIG. 56 is a schematic diagram of an ejector plate 28 representing the means of fluid pressurization through ejector pin.

The plate 28 indicated in FIG. 56 represents the plate 28 in FIG. 55 as viewed from above the page, describing the formation of depressed part 231 and depressed part 232 accommodating the flanged part 70 of ejector pin 227.

Figure 57:
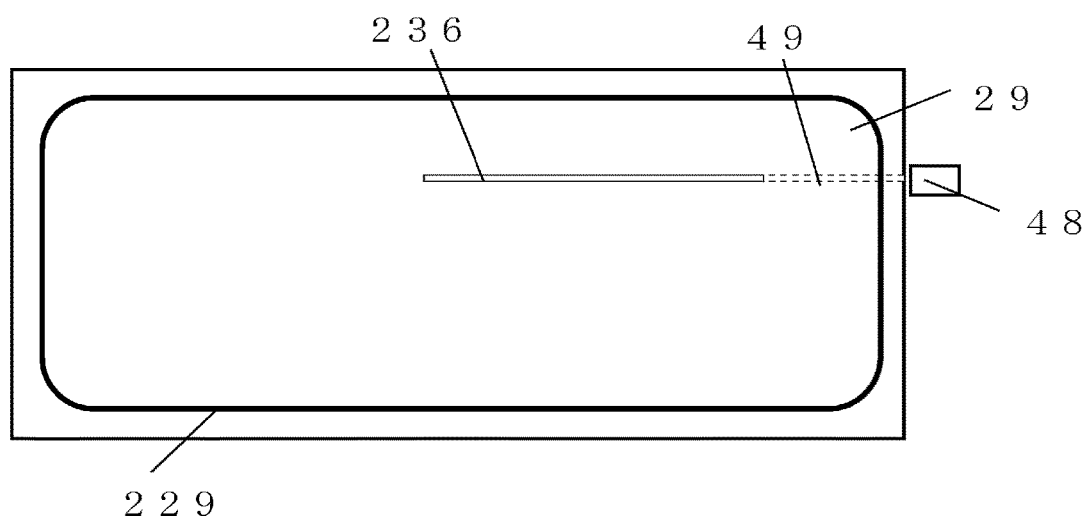
FIG. 57 is a schematic diagram of an ejector plate 29 representing the means of fluid pressurization through ejector pin.

The plate 29 indicated in FIG. 57 represents the plate 29 in FIG. 55 as viewed from above the page. In the plate 29, the groove 236 and the passageway (perforated hole) 49 for conducting the pressurized fluid are formed. The passageway 49 is configured so that one end leads to the groove 236 and the other end may be connected with the port of connection 48. Incidentally, the groove 236 makes up a passageway (air pressure circuit) for conducting the pressurized fluid when plate 28 and plate 29 are joined together. Furthermore, the groove 236 is formed at a location where it leads to (connects with) depressed part 231 and depressed part 232 when plate 28 and plate 29 are joined together.

Figure 58A:
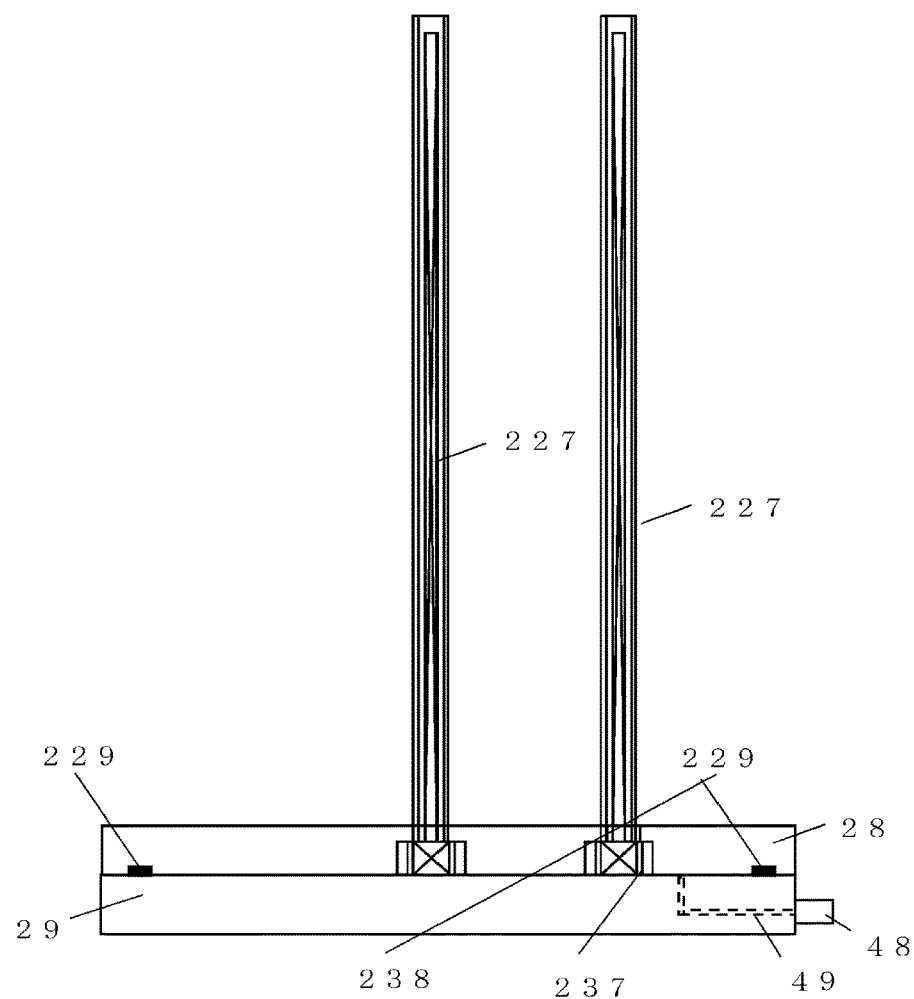
FIGS. 58A-58C are schematic diagrams representing a case where multiple circuits of pressurized fluid are provided on a single ejector plate in FIG. 55.

FIG. 58A represents another embodiment of mounting of ejector pin 227. In other words, those components including seal 93, plate 53, plate 54, seal 55, nested element 34 and the like are omitted from the illustration in FIG. 58A to make descriptions more comprehensible.

Figure 58B:
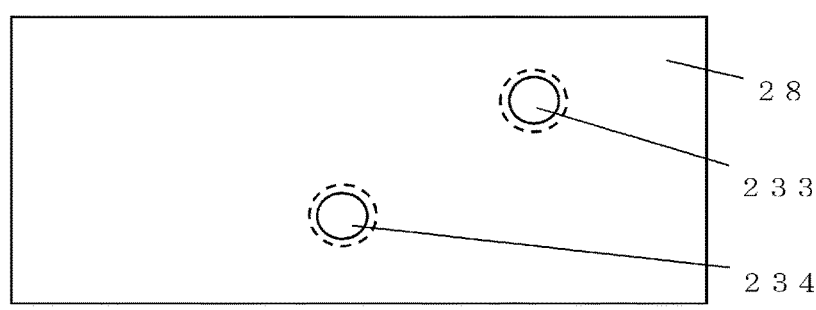

FIG. 58B illustrates the plate 28 in FIG. 58A as viewed from the upper side of page in FIG. 58A. Moreover, FIG. 58C represents the plate 29 in FIG. 58A as viewed from the upper side of page in FIG. 58A.

As shown in FIG. 58B, a perforated hole 233 and a perforated hole 234 are formed in the plate 28. Moreover, on the undersurface of plate 28, around perforated hole 233 and perforated hole 234 respectively, concave parts (countersinks) are formed at the location where the flanged part 70 of an ejector pin 227 is situated.

Figure 58C:
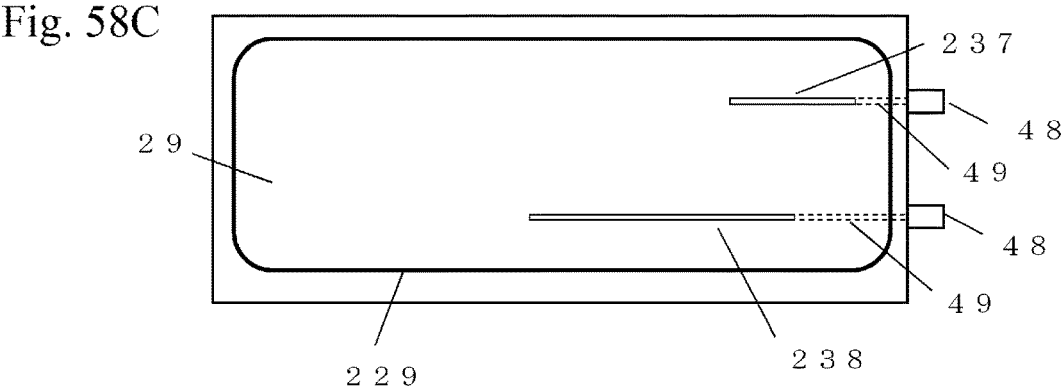

As shown in FIG. 58C, on the plate 29, groove 237, groove 238 and two passageways (perforated holes) 49 conducting pressurized fluid are formed. Each of passageways 49 is configured so that it leads to a groove (groove 237 or groove 238) at one end and can be connected to the connection port 48 at the other end. Incidentally, the groove 237 and groove 238 make up an air pressure circuit for conducting the pressurized fluid, by joining plate 28 and plate 29. Furthermore, groove 237 and groove 238 are formed at locations where they lead to (connect with) perforated hole 231 and perforated hole 232 when plate 28 and plate 29 are joined together. In other words, groove 237 and groove 238 are formed at locations where they lead to two concave parts into which the flanged part 70 of an ejector pin 227 is inserted when plate 28 and plate 29 are joined together.

The mold structure illustrated in FIG. 58A presents actions and effects that enable to manufacture molded articles under different conditions of fluid pressurization by connecting the fluid prepared by the device for preparing pressurized fluid 1140 shown in FIG. 46 to separate connecting ports 48.

Figure 59A:
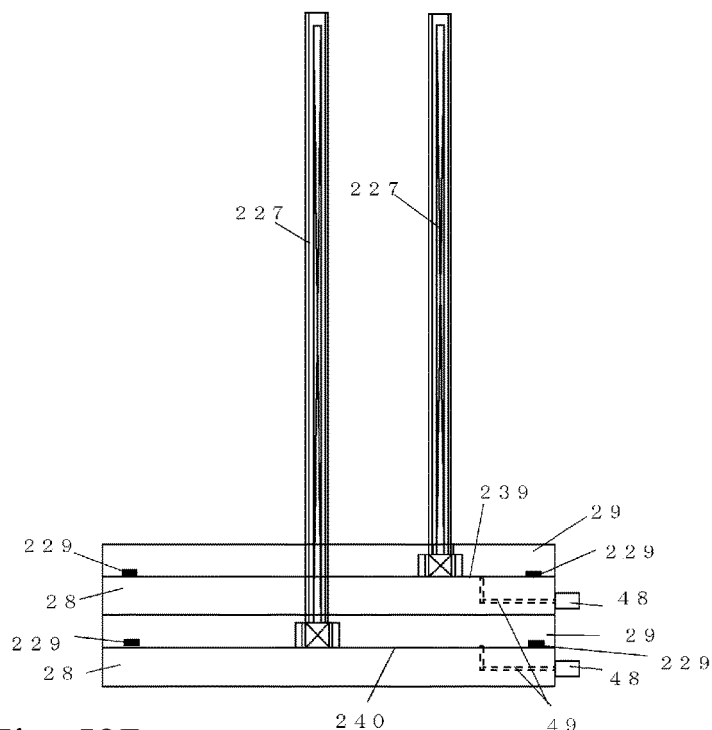
FIGS. 59A-59E are schematic diagrams representing a case where multiple ejector plates are used in FIG. 55, each of them being provided with a circuit of pressurized fluid.

FIG. 59A shows another embodiment of mounting of ejector pin 227 in the mold structure illustrated in FIG. 55.

In other words, those components including seal 93, plate 53, plate 54, seal 55, nested element 34 and the like are omitted from the illustration in FIG. 59A to make descriptions more comprehensible.

Figure 59B:
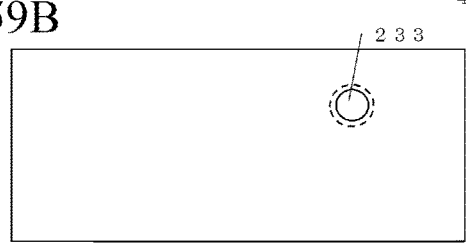
Figure 59C:
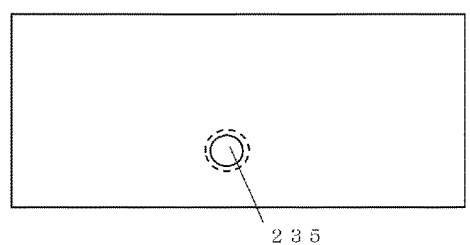
Figure 59D:
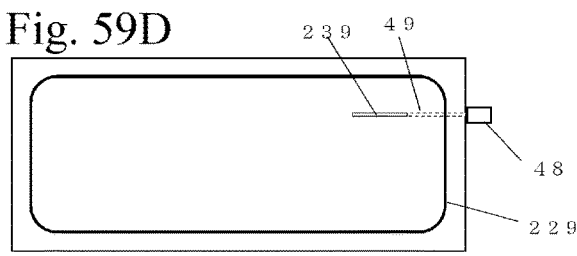
Figure 59E:
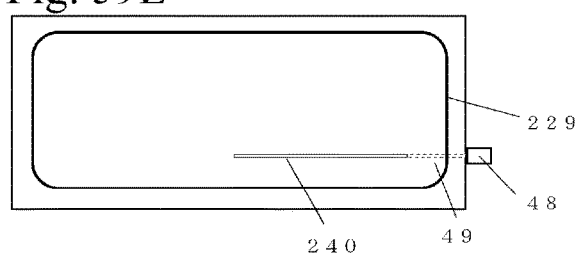

FIG. 59B represents the plate 29 at the upper side of page in FIG. 59A as viewed from the upper side of page in FIG. 59A. FIG. 59C represents the plate 29 at the lower side of page in FIG. 59A as viewed from the upper side of page in FIG. 59A. FIG. 59D represents the plate 28 at the upper side of page in FIG. 59A as viewed from the upper side of page in FIG. 59A. FIG. 59E represents the plate 28 at the lower side of page in FIG. 59A as viewed from the upper side of page in FIG. 58A.

Incidentally, in FIG. 59B and FIG. 59D, a perforated hole is formed at the same location as that of the perforated hole 235 shown in FIG. 59C, but its illustration is omitted.

The mounting structure of ejector pin 227 depicted in FIG. 59A is the one which uses a number of pairs of plates comprising plate 28 and plate 29 holding between them the flanged part 70 of ejector pin 227. In other words, the said mounting structure is the one where each pair of plates erects an ejector pin 227. In each pair of plates, a groove and a passageway for conducting pressurized fluid are formed. Consequently, the pressurized fluid prepared by the device for preparing pressurized fluid 1140 shown in FIG. 46 can be fed separately to each pair of plates, and the system thus is able to manufacture molded articles under separate conditions for fluid pressurization.

Figure 60:
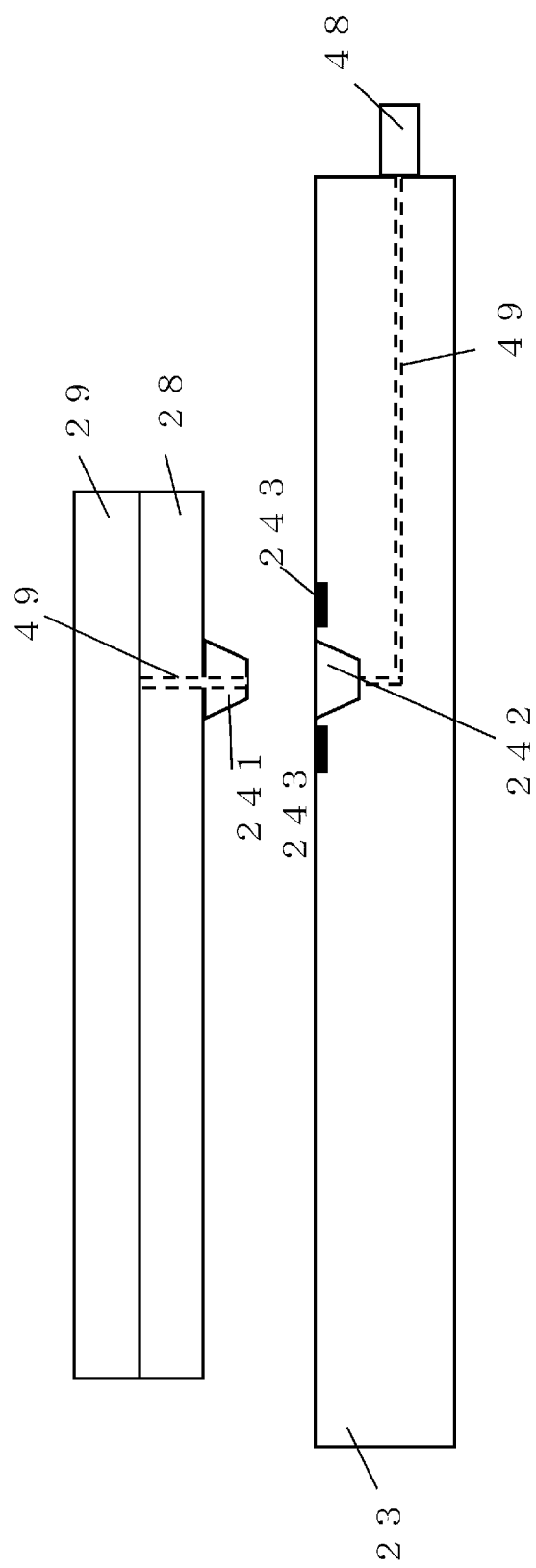
FIG. 60 is a schematic diagram representing the circuit through which the pressurized fluid is injected from the mounting plate on the movable side into the ejector plate.

FIG. 55 and others illustrate a means to conduct the pressurized fluid to ejector pin 227 by equipping the plate 29 with a connection port 48. FIG. 60 illustrates a means to supply the pressurized fluid from mounting plate 23 to plate 28 and plate 29. The mounting plate 23 is provided with a connection port 48 which is machined to provide a passageway 49 within it, the passageway leading to the bottom surface of a depression 242. The plate 28 is provided with a protrusion 241 fitting the depressed part 242, the protrusion 241 being machined to provide a passageway 49 in it, and although not illustrated, the passageway 49 leads to passageway 49, groove 236, groove 237, groove 238, groove 239 and groove 240 in the plate 28. When the mold is closed, the protrusion 241 fits into the depression 242 and a circuit of pressurized fluid is formed. Incidentally, the pressurized fluid cannot leak out to the outside, because the seal 243 is provided at any one point among upper part of protrusion 241, lower part of depressed part 242, or the matching surface between plate 28 and mounting plate 23. FIG. 60 illustrates the case where the seal is provided on the mounting plate 23.

Figure 23:
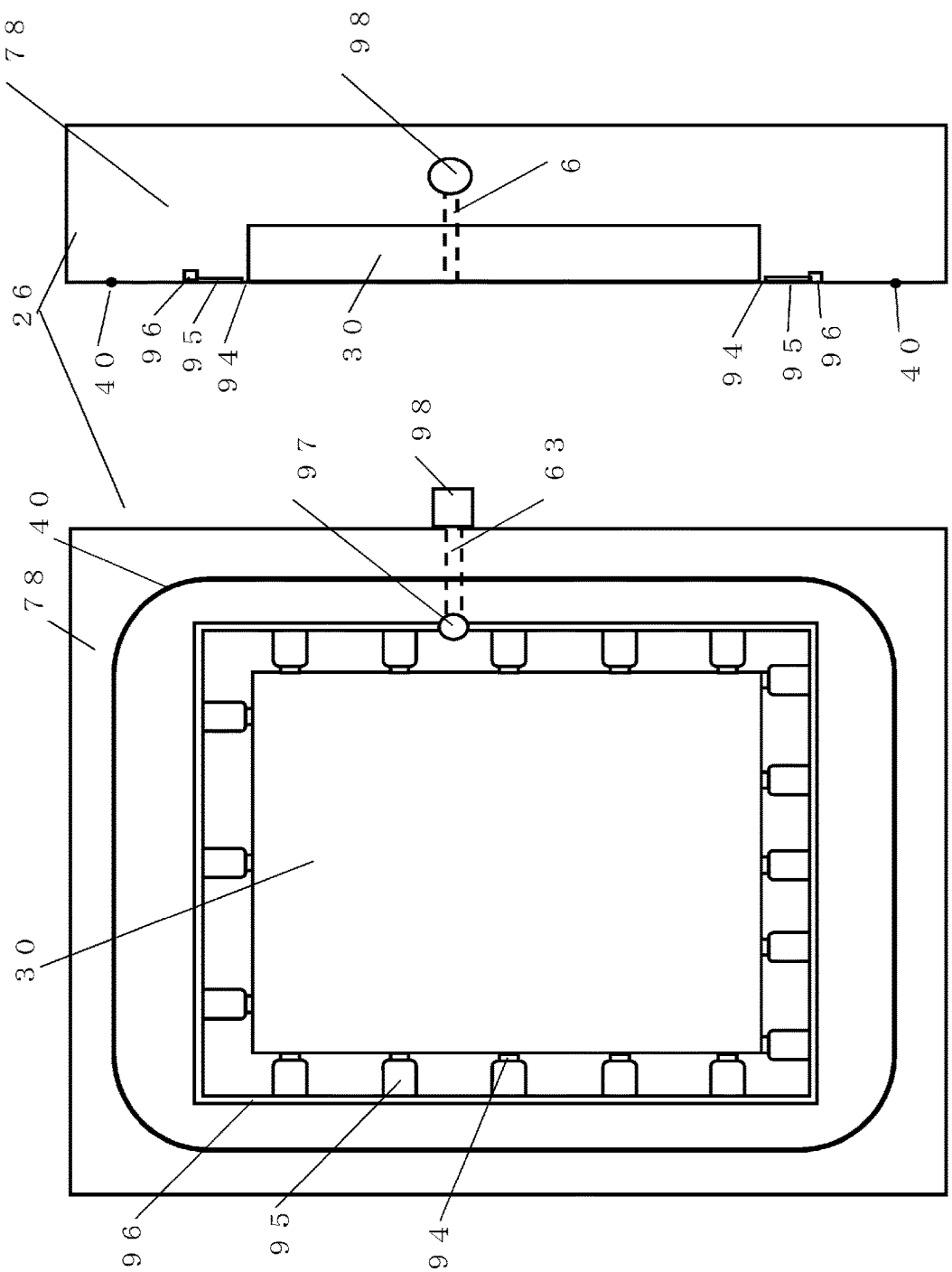
FIG. 23 is a schematic diagram representing a gas vent and the like at the parting of a mold.

The function of valve 62 is to prevent the occurrence of short-mold, discoloration or burn of molded articles by venting the air in the cavity 200 to the outside of the sealed mold 141 through the parting 26, while the resin is injected into the cavity 200. The valve 62 is kept open until the cavity 200 is filled with a resin (injection of resin is completed), and the air displaced by filling the cavity 200 with resin is expelled to the outside through this valve 62. FIG. 23 illustrates the detailed structure of the parting of mold configured as a means for venting the air.

The air in the cavity 200 is exhausted from a gas vent (not illustrated) or the like provided in the parting 26 through the passageway 63 provided for exhaust within the sealed mold 141. The code 64 is a pressure resistant hose with high-pressure specifications for connecting to the valve 62 provided for exhaust of the air in the cavity 200. The code (arrowhead) 65 indicates the flow of exhaust air in the cavity 200. The code 66 indicates the air in the cavity 200 that has been exhausted into the atmosphere.

As the air in the cavity 200 is pushed out of it to the lower seal plate 44 and the upper seal plate 45 on the stationary side, the valve 67 with the same function as that of the valve 62 is provided on these seal plates.

It is also possible to let the automatic on-off valve 15 in FIG. 1 have the functions of valve 62, valve 67 and valve 68. Valve 62, valve 67 and valve 68 are abolished, and the hose 64 is connected to the automatic on-off valve 15. The valve 15 is kept open to exhaust the displaced air in the cavity while the cavity is being filled with a resin. The valve 15 is closed on completion of the filling and the valve 14 is opened to pressurize the resin by fluidic pressure. By these measures, the fluid pressurization can be carried out without using such an element as the valve 62 within the mold. Although the above description has indicated that the functions of valve 62, valve 67, and valve 68 are substituted by that of a valve 15, the number of valves 15 employed needs not be one but it can be three corresponding to valve 62, valve 67, and valve 68, or it can be more than three.

Incidentally, other structural components provided on the sealed mold 141, for example, mold support plate, support pillar, return pin and return spring of ejector, guide pin and guide post, and the like are not illustrated in FIG. 2.

As a fluid used in the sealed mold 141, a gas is preferable rather than a liquid. The sealed mold 141 provided with the ejector box 51 does not need to have plate 53, plate 54 and seal 55 in FIG. 3 to be described later.

(Ejector box 51) The characteristic of the sealed mold 141 is that the cavity 200 is closed and makes up a "hermetically-enclosed space (sealed mold)" at the stage where stationary side mold 201 and movable side mold 202 are clamped, and the nozzle of the injection molding unit touches the spool bush 24. In order to enable the system to realize this state, seals 38-43 are employed.

(Direct Pressurization and Indirect Pressurization)

"Direct pressurization" is a method to pressurize by fluidic pressure the resin in the cavity 200 by making the pressurized fluid act directly on the resin in the cavity 200 by means of a pressurization pin 50. "Indirect pressurization" is a method to pressurize by fluidic pressure the resin in the cavity by introducing the pressurized fluid into a space other than the mold cavity 200 and by letting the fluid get to the resin in the cavity 200 through clearances 35 in the nested element 34, clearances along the ejector pin 27, clearances around the core pin and the like. As methods other than these, there are such means as the one in which the pressurized fluid is introduced to the bottom of a nested element 34 or the like component to move the nested element and pressurize it.

(Direct Pressurization)

The injection means 58 illustrated in FIG. 2 can be used in the case where the resin in the cavity 200 is pressurized directly. The pressurization means 58 is equipped with connection ports 48, passageways 49 for pressurized fluid, and pressurization pins 50. Connection ports 48 are linkage part for connecting one end of a pressure-resistant hose conducting pressurized fluid. The other end of the pressure-resistant hose is connected to the piping 17 of the device for preparing pressurized fluid shown in FIG. 1. Specifically, the other end of the pressure-resistant hose is connected to the terminal part of the piping 17 in FIG. 1.

The passageways 49 is a hole formed in the mold plate 78 on the stationary side mold 201 or in the mold plate 87 on the movable side mold 202, the hole serving for conducting to cavity 200 and space 52 the pressurized fluid flowing out of the pressure-resistant hose through the connection port 48. A pressurization pin has a fill port formed at the apical end and a perforated hole connecting the apical end to the base end section. Because the base end section of a pressurization pin is connected to the passageway 49, the pressurized fluid coming from the passageway 49 is conducted through the perforated hole in the pressurization pin and injected into the cavity 200.

Because the fill port formed at the apical end of pressurization pin comes in touch with the surface of resin filled in the cavity, the pressurized fluid coming out of the fill port enters into the clearances between the resin in the cavity 200 and the cavity wall. That is to say, in the case where the pressurized fluid is injected into the movable side cavity through the fill port provided on the movable side mold 202, the resin is pressurized by fluidic pressure in the direction from the movable side mold 202 toward the stationary side mold 201. In other words, the resin in the cavity 200 is pushed against the stationary side cavity 30 by the pressurized fluid.

Moreover, in an opposite way, in the case where the pressurized fluid is injected into the stationary side cavity through the fill port provided on the stationary side mold 201, the resin is pressurized by fluidic pressure so that it is pushed in the direction from the stationary side mold 201 toward the movable side mold 202. In other words, the resin in the cavity 200 is pushed against the movable side cavity 31 by the pressurized fluid.

Incidentally, in the case where the pressurized fluid is employed to pressurize the resin in the cavity 200 by fluidic pressure, the seal 40 is provided for the purpose of preventing the pressurized fluid from escaping to the outside from the parting 26 which constitutes a matching surface between movable side mold 202 and stationary side mold 201. As a material for seal 40, O-ring, plate-shaped rubber sheet (sealing component) and the like can be cited for example. The said sealing component is provided on the entire surface or a part of the parting 26.

The sealed mold 141 is sealed (encapsulated) by the seal 43 provided in the lower ejector plate 29, when the molds on the movable side and the stationary side are closed and the ejector pins 27 retract. For this reason, the sealed mold 141 is able to prevent the leakage of pressurized fluid through the clearances between the ejector rod (not illustrated) and the perforated hole (not illustrated) formed on the movable side mounting plate 23 into which an ejector rod is inserted. In other words, the sealed mold 141 is provided with a seal 39 between movable side mounting plate 23 and ejector box 51, and a seal (not shown) also between ejector box 51 and movable side mold plate 87. As a material for seal 43, O-ring, plate-shaped rubber sheet (sealing component) and the like can be cited for example.

Although the pressurized fluid acting on the surface of resin in the cavity 200, as aforementioned, enters into the space 52 of the ejector box 51 after passing through the clearances along the ejector pins 27 and the clearances in the nested element 34, there is no possibility that the fluid leaks to the outside of the sealed mold 141, since all the matching surfaces are sealed.

In the case where the pressurized fluid is made to pressurize by fluidic pressure the resin in the cavity 200 by injecting the fluid into the cavity 200 only from the injection means 58, the pressurized fluid enters, as aforementioned, into the space 52 in the ejector box 51. As a result, in the case where the sealed mold 141 is employed to carry out an pressurized air injection molding process, the action and the effect of fluid pressurization are at a low level unless the pressure of pressurized fluid in the space 52 in the ejector box 51 becomes comparable to that of pressurized fluid acting on the resin in the cavity 200.

In the case where the sealed mold 141 is employed to carry out an pressurized air injection molding process, it is desirable to inject the pressurized fluid into the space of the cavity 200 from the injection means 58 and at the same time to inject the fluid into the space 52 of the ejector box 51 from the injection means 56 to fill the space 52 of the ejector box 51 with the pressurized fluid. By doing so, the pressure of pressurized fluid in the ejector box can quickly be made comparable to that of pressurized fluid injected into the resin in the cavity 200 by means of the injection means 58.

Incidentally, the exhaust of the pressurized fluid injected into the space 52 and the pressurized fluid injected into the cavity 200 can be carried out simultaneously or separately by setting up a specific timing of exhaust for each compartment. Needless to say, in the case where the injection means 56 and 58 are used for exhausting the pressurized fluid, the pressurized fluid is not flowing in the pressure-resistant hoses connected to injection means 56 and 58, and hence the said pressure-resistant hoses should be opened to the atmosphere. Specifically, it is the state where, with respect to the pressure-resistant hose connected to the end of piping 17 in FIG. 1, the injection valve 14 is closed and the blowout valve 15 is opened.

The exhaust of the pressurized fluid injected into space 52 and cavity 200 can be carried out by using an exhaust means (not illustrated) provided exclusively for this purpose in the movable side mold, apart from using injection means 56 and 58.

(Indirect Pressurization from Movable Side)

In the case where the indirect pressurization is carried out in the movable side mold, the pressurized fluid is injected into the space 52 in the ejector box 51 from the injection means 56. The pressurized fluid injected into the space 52 enters into the cavity 200 through clearances 35 in the nested element, clearances along the ejector pins 27, and the like, and pressurizes by fluidic pressure the surface of the resin in the cavity 200 in the direction from movable side toward stationary side.

At locations requiring pressurization particularly, pressurization pins presented in FIGS. 4-17 are provided as needed. The apical end of these pressure pins is configured so as to contact the surface of the resin in the cavity. Moreover, the rear end section (base end section) of these pressure pins is configured so as to fit into the ejector box 51. By these means, if the pressurized fluid is injected into the space 52 of ejector box 51, the fluid can perform the fluid pressurization the necessary locations in the cavity 200. Incidentally, the number of pressurization pin can be plural. Furthermore, in the case where the indirect pressurization is performed in the movable side mold 202, since the pressurized fluid is not injected from the injection means 58, it is not needed to provide the injection means 58 in the movable side mold 202.

Because the sealed mold 141 with an ejector box 51 is hermetically enclosed, the air in the cavity which causes, while the cavity is being filled with a resin, short-mold, discoloration or burn of molded articles relocates into the space 52 through clearances 35 of the nested element, clearances along the ejector pins 27 and the like. Thanks to this, the sealed mold is able to inhibit the occurrences of short-mold, discoloration and burn.

(Fluid Pressurization from Stationary Side)

In the case where the direct pressurization is performed from the stationary side mold 201, the injection means 57 presented in FIG. 2 and FIG. 3 is used. In the case where the indirect pressurization is performed from the stationary side mold 201, the injection means 61 presented in FIG. 2 and FIG. 3 is used. If the pressurized fluid is injected from at least either one of the injection means of 57 and 61, the fluid pressurizes by fluidic pressure the resin in the cavity 200 in the direction from stationary side mold 201 toward movable side mold. Detailed descriptions are omitted since the injection means 57 and 61 have the constituents similar to those explained for the injection means 58, i.e., connection port 48, passageway for pressurized fluid 49 and pressurization pin 50.

The injection means 61 injects the pressurized fluid into the interstice between upper seal plate 45 and lower seal plate 44. As a consequence, the pressurized fluid enters into the stationary side cavity 30 and pressurizes by fluidic pressure the resin in the cavity 200 in the direction from the stationary side mold 201 toward the movable side mold 202.

Incidentally, as aforementioned, for the direct pressurization of the movable side mold 202, the ejector box 51 can be provided with the rear end section of pressurization pin. Similarly, for the direct pressurization of the stationary side mold 201, the stationary side mold 201 may be provided with a pressurization pin in such a manner as that the rear end section of the pressurization pin may be located between the lower seal plate 44 and the upper seal plate 44.

(Direct Pressurization from Stationary Side)

If the injection means 57 is employed to inject the pressurized fluid into the cavity 200 to pressurize directly the resin in the cavity 200, the pressurized fluid injected into the cavity 200 tends to escape through clearances 33 on the nested element 32, similarly as in the case of fluid pressurization in the movable side mold 202. In order to solve this problem, the bottom (face opposite to the side of cavity 200) of nested element 32 on the stationary side is received by the lower seal plate 44, and a seal 46 is provided between seal plate 44 and seal plate 45. By this disposition, the leakage of pressurized fluid through clearances 33 of the nested element 32 can be prevented. Although not illustrated, it is desirable, as needed, to provide a seal on the bottom (face opposite to the side of cavity 200) of nested element 34 on the movable side. Moreover, it is desirable to provide a seal 39 also between the stationary side mounting plate 22 and the stationary side mold plate 78.

The injection means 61 is an injection means of pressurized fluid used for injecting the pressurized fluid between the lower seal plate 44 and the upper seal plate 45. The pressurized fluid injected by using the injection means 61 flows through the clearances 33 of the nested element 32 and attains to the stationary side parting and pressurizes by fluidic pressure the resin in the cavity 200 in the direction from the stationary side mold 201 toward the movable side mold 202.

At locations requiring pressurization particularly, pressurization pins presented in FIGS. 4-17 are provided as needed similarly as in the aforementioned case of the movable side. The fluid pressurization can be performed simply by injecting the pressurized fluid into the interstice between the lower seal plate 44 and the upper seal plate 45.

(Pressurization Pin 50)

The pressurization pin 50 can be manufactured by machining additionally an ejector sleeve pin, a product of Misumi Co., Ltd., for example. In the following paragraphs, the pressurization pin 50 shall be described by referring to FIGS. 4-13.

Figure 6:
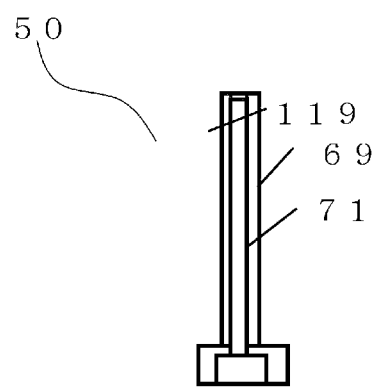
FIG. 6 is a schematic diagram of a pressurizer pin 50.

The pressure pin 50 comprises, as shown in FIG. 6, an outer tube 69 and an inner core inserted into the outer tube 69.

The outer tube 69 comprises, as shown in FIG. 4: a flanged part 70 formed at one end section (base end section) of the longitudinal direction; a depressed part 79 formed in the flanged part 70; and a perforated hole 77 leading from the depressed part 79 to the other end section (apical end section) of the longitudinal direction.

Figure 5:
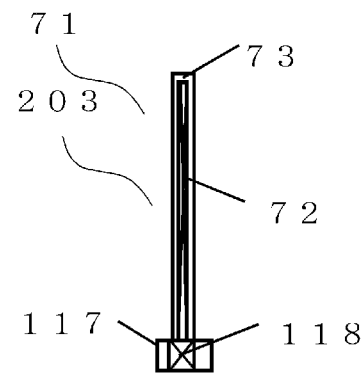
FIG. 5 is a schematic diagram of an inner core 71 of a pressurizer pin 50.

The inner core 71 comprises, as shown in FIG. 5: a flanged part 117 in a cylindrical shape formed at one end section (base end section) of the longitudinal direction; a core body 203 in a cylindrical shape connecting with the flanged part 117; a D-shaped surface (D-cut) 118 formed in the flanged part 117; and a D-shaped surface (D-cut) 72 formed in the core body 203 extending from the flanged part 117 to the apical end section 73. The D-shaped surfaces 72 and 118 are formed to conduct the pressurized fluid. Incidentally, the apical end section 73 of core body 71 retains a portion of about 5 mm in length where D-shaped surface 72 has not been formed.

A pressurization pin 50 is constituted by inserting the core body 203 of core 71 into the perforated hole 77 in an outer tube 69. The inner diameter of perforated hole 77 and the outer diameter of core body 203 are so configured as to have clearances of about 0.01 mm to 0.1 mm at the apical end section of pressurization pin 50 so that it may allow the passage of pressurized fluid but inhibit that of resin.

The pressurization pin 50, as shown in FIG. 6, is configured to have the apical end section 119 where the length of inner core 71 (the length of inner core 71 in the longitudinal direction) is made slightly shorter (by magnitude longer than 0.0 mm but shorter than 0.5 mm) than the length of the outer tube 69 (the length of outer tube 69 in the longitudinal direction). Thus, by shortening the inner core 71 as compare with the outer tube 69, the injection of pressurized fluid by the pressurization pin 50 into the clearance between the resin in the cavity and the cavity wall surface is facilitated.

In a pressurization pin 50, the length of inner core 71 can be made also equal to that of outer tube 69. Moreover, in a pressurization pin 50, the length of inner core 71 can be made also longer than that of outer tube 69. The length of the inner core 71 and that of outer tube 69 are respectively selected in an actual application depending on the resin type and the shape of molded article.

Figure 7:
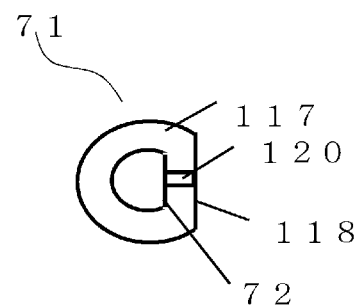
FIG. 7 is a schematic diagram of an inner core 71 as seen from above.

On the upper surface of the flanged part 117 of inner core 71, a groove 120 is formed between D-shaped surface 72 and D-shaped surface 118 for conducting the pressurized fluid, as shown in FIG. 7. The groove 120 is a U-shaped groove, for example. Incidentally, FIG. 7 is an illustration of the inner core 71 as viewed from above. In other words, FIG. 7 is an illustration of the inner core 71 shown in FIG. 5 when it is turned 90 degrees in the circumferential direction and viewed from the upper side of the page toward the lower side of it.

Figure 8:
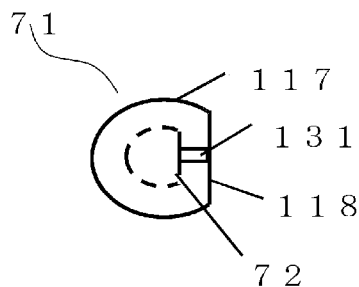
FIG. 8 is a schematic diagram of pressurizer pin 50 as seen from below.

On the lower surface of the flanged part 117 of inner core 71, a groove 131 is formed in the direction toward D-shaped surface 118 for conducting the pressurized fluid, as shown in FIG. 8. The groove 131 is a U-shaped groove, for example. Incidentally, FIG. 8 is an illustration of the inner core 71 as viewed from below. In other words, FIG. 8 is an illustration of the inner core 71 shown in FIG. 5 when it is turned 90 degrees in the circumferential direction and viewed from the lower side of the page toward the upper side of it.

Figure 9:
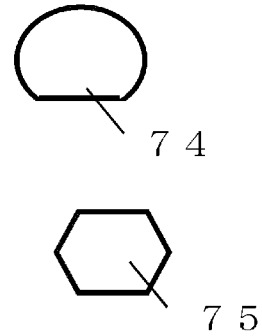
FIG. 9 is a schematic diagram of the apical end of an inner core 71.

The apical end section 73 of core body 203 of the inner core 71, as shown in FIG. 9 (top), can be machined so as to form a D-shaped surface (D-cut) (apical end section 74) so that a clearance of about 0.01 mm-0.1 mm may result when it is assembled into the outer tube 69. Moreover, the apical end section 73 can have a polygonal cross-section (apical end section 75) as shown in FIG. 9 (bottom). Incidentally FIG. 9 is an illustration of the apical end section of the core body 203 as viewed from above. In other words, FIG. 9 is an illustration of the apical end section 73 alone of core body 203 shown in FIG. 5 as viewed from the upper side of the page toward the lower side of it.

Figure 10:
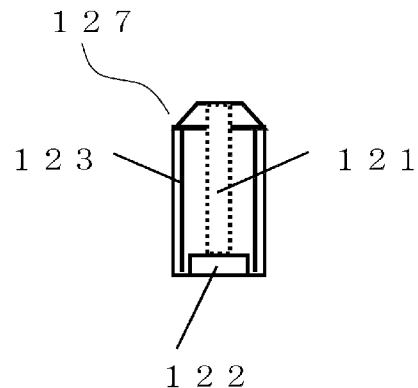
FIG. 10 is a schematic diagram of a set screw.

In order to fix the pressurization pin 50 on the stationary side mold 201 or the like, a set screw 127 shown in FIG. 10 is used. The set screw 127 comprises: threaded section 123 formed on the circumference part; a depressed part 122 with a polygonal cross-section formed on one end of the longitudinal direction; and a perforated hole 121 leading from the depressed part 122 to the other end of the longitudinal direction.

Figure 11:
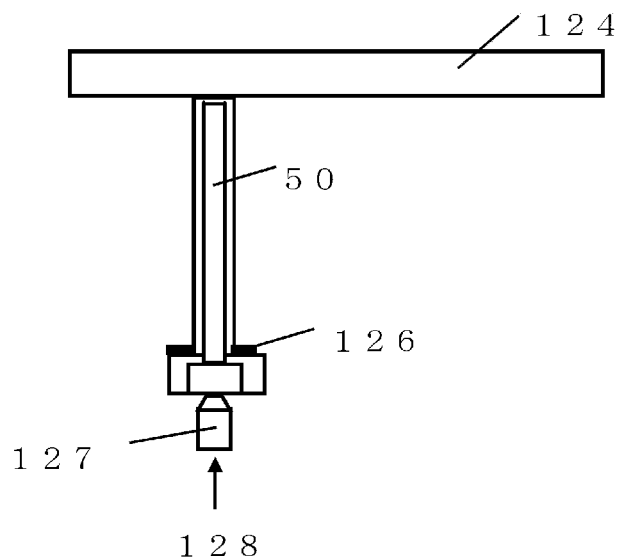
FIG. 11 is a schematic diagram representing the relative position between a pressurizer pin 50 and the cavity 200.
Figure 12:
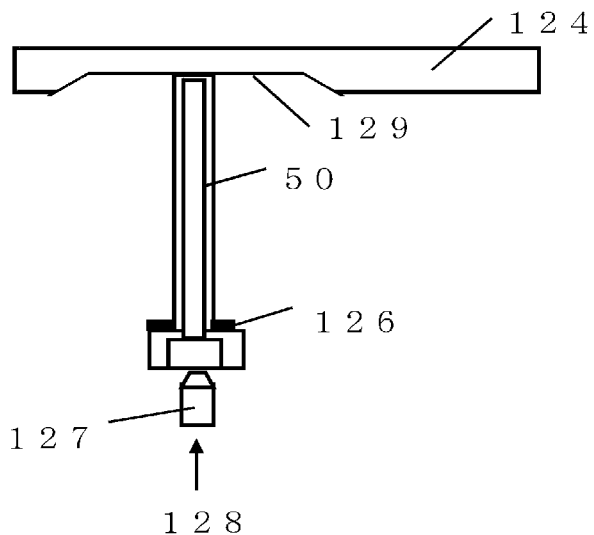
FIG. 12 is a schematic diagram representing the relative position between a pressurizer pin 50 and the cavity 200.
Figure 13:
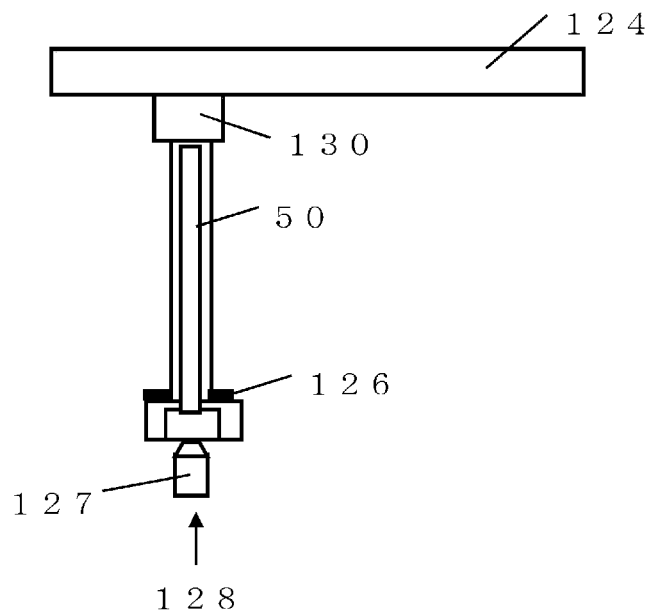
FIG. 13 is a schematic diagram representing the relative position between a pressurizer pin 50 and the cavity 200.

FIG. 11, FIG. 12, and FIG. 13 indicate the location of pressurization pin 50 in relation to the article 124 (molded article 124 in the cavity 200) molded by the cavity 200.

FIG. 11 illustrates the configuration in which the apical face of the apical end section of the outer tube 69 of the pressurization pin 50 is made to be flush (come in the same plane) with the surface of cavity 200, and the apical face of the apical end section of the inner core 71 is made to recede slightly from the apical face of the apical end section of the outer tube 69. The stationary side mold 201 or the movable side mold 202 that employs the same configuration facilitates the injection of the pressurized fluid into clearances between the resin in the cavity (molded article 124) and the cavity wall surface.

FIG. 12 illustrates the configuration in which the cavity wall face around the pressurization pin 50 has a protrusion 129 which is made to protrude toward the cavity. The stationary side mold 201 or the movable side mold 202 that employs the said configuration can facilitate the cooling and solidification of the portion of molded article 124 situated around such a protrusion, because, when the said configuration is considered in relation to the molded article, the portion of the latter situated around the protrusion 129 becomes thin in thickness. In other words, the stationary side mold 201 that employs the said configuration can facilitate the injection of the pressurized fluid into clearances between the resin in the cavity and the cavity wall surface, because the formation of skin (solidified) layer is facilitated in the portion with a thin thickness facing the injection port 50 of a pressurization pin.

Figure 36:
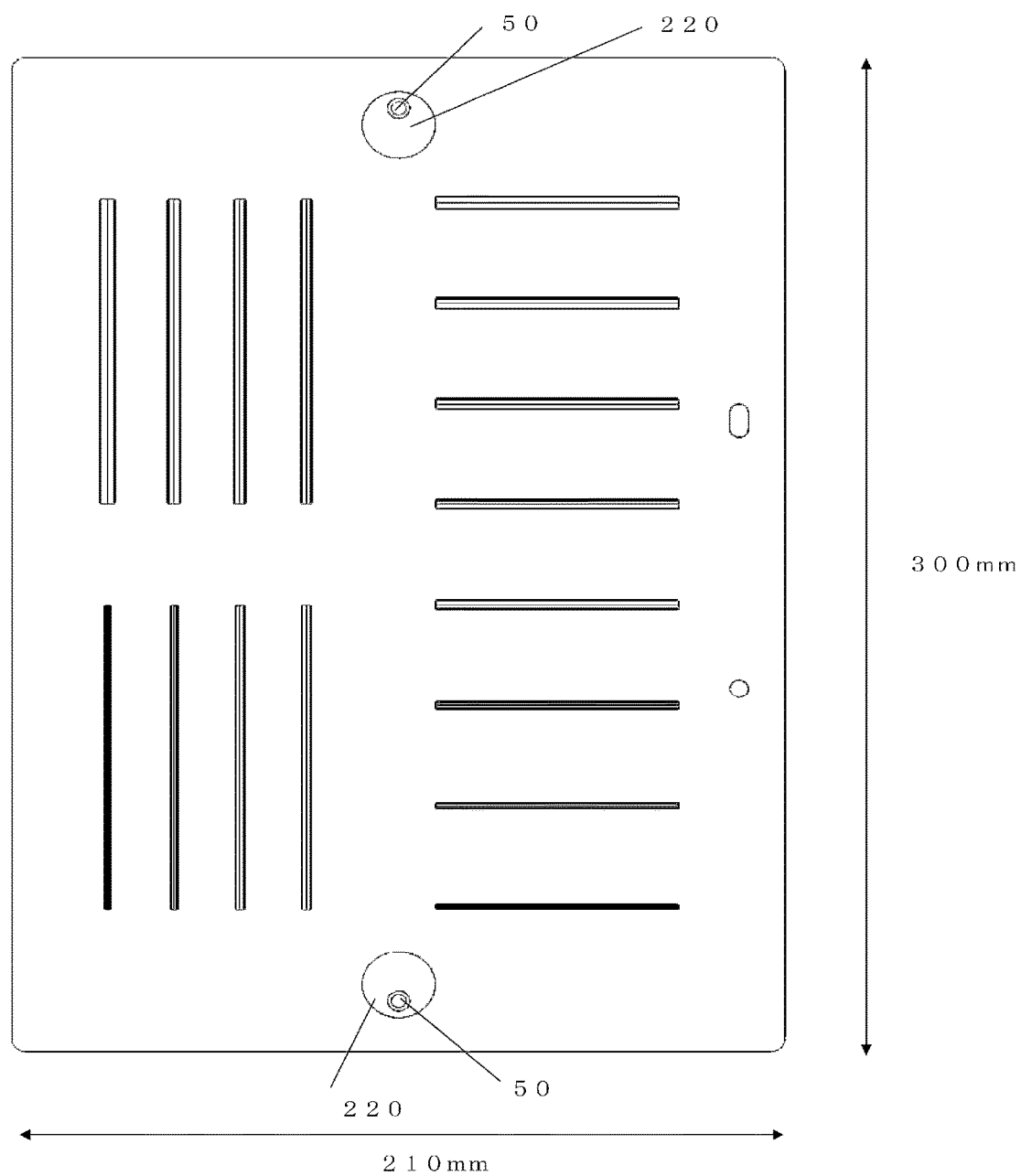
FIG. 36 is a schematic diagram of a molded article with which the extent of effect of pressurized air injection molding was determined by varying the rib thickness against the top bed thickness to identify the limit of effective rib thickness.

By embossing the area around pressurization pin 50 coarsely with a grained pattern of about φ20 mm, the pressurized fluid can be made to enter more easily into clearances. In practice, although not illustrated, the area around the pressurization pin 50 in FIG. 36 is embossed coarsely with a slightly eccentric grained pattern of about φ20 mm (220 of FIG. 36).

FIG. 13 illustrates a configuration in which a depressed part 130, slightly larger in diameter than the diameter of outer tube 69 of the pressurization pin 50, is formed in the cavity 200 for forming the molded article 124. The diameter of the depressed part 130 can be the same as that of the inner core 71 of the pressurization pin 50. Due to the depressed part 130, a bossed part is formed on the molded article 124.

As illustrated in FIG. 11, FIG. 12, and FIG. 13, the pressurization pin 50 is fixed by the set screw 127 so that the center axis of pressurization pin 50 and that of set screw may align approximately. Thus, through the perforated hole 121 formed in the center of set screw 127 and the pressurization pin 50, the pressurized fluid is injected into the clearances between the resin (molded article 124) in the cavity 200 and the surface constituting the cavity 200.

The pressurization pin 50 is provided with an O-ring 126 as a seal (sealing component) for preventing the leakage of pressurized fluid. As the O-ring 126 makes a line-to-surface contact, its sealing effect is insufficient. Hence, as a seal to be used on the pressurization pin 50, it is desirable to use a rubber sheet cut out in a torus-shape. When a rubber sheet is used, as the seal is made by a face-to-face contact, the sealing effect is superior to a seal with a line-to-surface contact. FIG. 11, FIG. 12, and FIG. 13 illustrate a configuration in which an O-ring 126 is provided on the upper surface of the flanged part 70. However, the seal can be provided also on lower surface or lateral surface of the flanged part 70 as long as the sealing effect is ensured. Furthermore, the seal can be provided also on several surfaces like both upper and lower surfaces of the flanged part 70. In the case where the seal is provided on several surfaces, there is an advantage that it can realize a high sealing effect.

In the case where only one pressurization pin is provided in the vicinity of the gate for injecting resin into the cavity, it is possible to realize a higher pressure of the pressurized fluid in the vicinity of the gate and to realize a lower pressure of it at the flow end of fluid (location removed from the gate). By exploiting this property, the locations and the number of pressurization pins 50 to be provided are selected depending on the shape of a molded article. It is also possible to provide multiple pressurization pins in the vicinity of gate and at the flow end, and inject the pressurized fluid at an optimum pressure and at an optimum timing for each of the pressurization pins.

(Other Configurations of Pressurization Pin)

In the following sections, other configurations of pressurization pin (configuration of pressurization pin 204) are described by referring to FIGS. 14-17.

Figure 14:
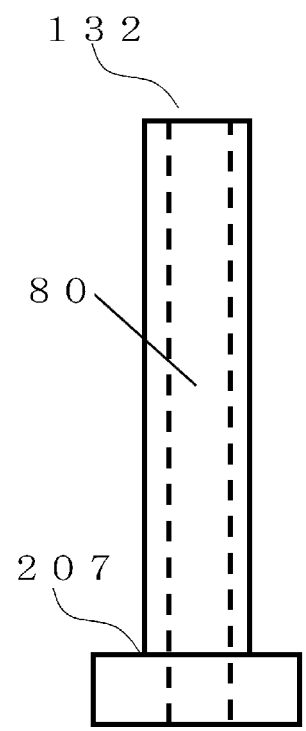
FIG. 14 is a schematic diagram of an outer tube 132 of pressurizer pin 204.
Figure 15:
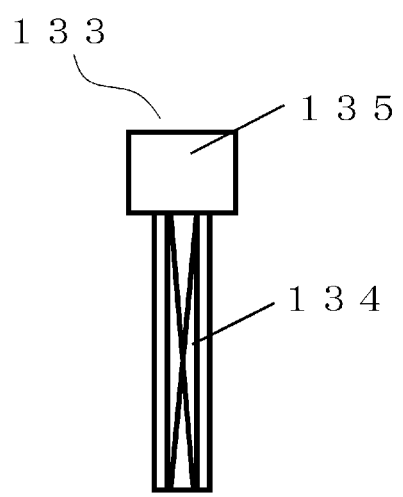
FIG. 15 is a schematic diagram of an inner core 133 of a pressurizer pin 204.
Figure 16:
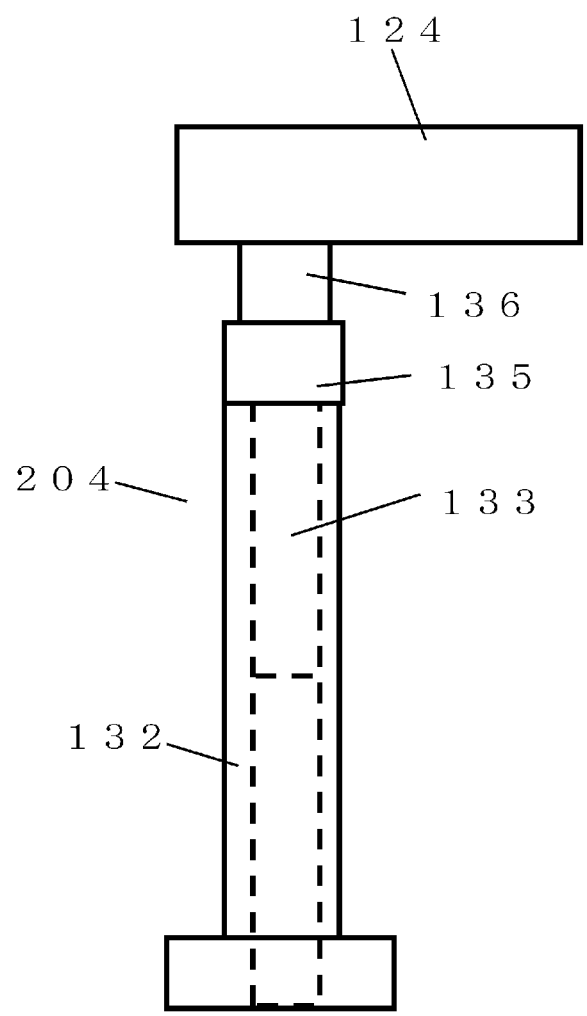
FIG. 16 is a schematic diagram of a pressurizer pin 204.

The pressurization pin 50 described in FIGS. 4-13 was the one in which the injection port was formed along the longitudinal direction. In contrast, the pressurization pin 204, as shown in FIGS. 14-16, is the one in which the injection port is formed along the direction intersecting the longitudinal direction of the pressurization pin. In other words, the pressurization pin 204 has a structure in which the pressurized fluid flows out from the lateral side of the pressurization pin 204.

As shown in FIG. 16, the pressurization pin 204 comprises an outer tube 132 and an inner core 133 that is inserted into the outer tube 132.

As shown in FIG. 14, the outer tube 132 comprises a flanged part 207 formed at one end (base end) of the longitudinal direction, and a perforated hole 80 leading from the flanged part 207 to the other end (apical end section) of the longitudinal direction.

As shown in FIG. 15, the inner core 133 comprises: a cylinder-shaped flanged part 135 formed at one end (base end) of the longitudinal direction; a cylinder-shaped core body connected with the flanged part 135; and a D-shaped surface (D-cut) 134 formed between the flanged part 135 and the other end (apical end section) of the said core body. The D-shaped surface 134 is formed for conducting the pressurized fluid. Moreover, the longitudinal length (height) of the flanged part 135 is about 1 mm to 5 mm.

FIG. 16 shows the position of a pressurization pin 50 with respect to the molded article 124 molded by the cavity 200 (molded article in the cavity 200). A depressed part 136 is formed in the cavity 200. In other words, by means of the depressed part 136, a boss is formed on the molded article 124. The diameter of the depressed part is configured so as to become smaller than that of the flanged part 135 of the inner core 133. Although not illustrated in FIG. 16, the flanged part 207 of the pressurization pin 204 is provided with a seal (sealing component) 126 for preventing the leakage of pressurized fluid.

The pressurized fluid pressurizes the resin in the cavity by fluidic pressure after the pressurized fluid has passed through the perorated hole 80 of outer tube 132 and the D-shaped surface 134 of inner core 133, then flowed out through the clearance at the part where the flanged part 135 of inner core 133 abuts the apical surface of outer tube 132, and then passed through the interstice between the surface constituting the depressed part 136 and the resin injected into the depressed part (boss part).

(Structure Wherein Nested Element Provides Function of Outer Tube 69)

The pressurization pin described by referring to FIGS. 4-17 is configured so as to have a dual structure wherein an inner core 71 is inserted into an outer tube 69.

The shapes 77 and 79 in FIG. 4 into which the inner core 71 is inserted were created by machining directly the nested element 32 and the nested element 34 (code 221 in FIG. 48A), and the inner core was inserted therein.

With this configuration, the height of inner core 71 can be made to be equal to, lower or higher than, that of molded article, and it is normally made to be lower. A seal 222 is provided for preventing the pressurized fluid at the bottom of inner core 71 from leaking to the outside.

Figure 48A:
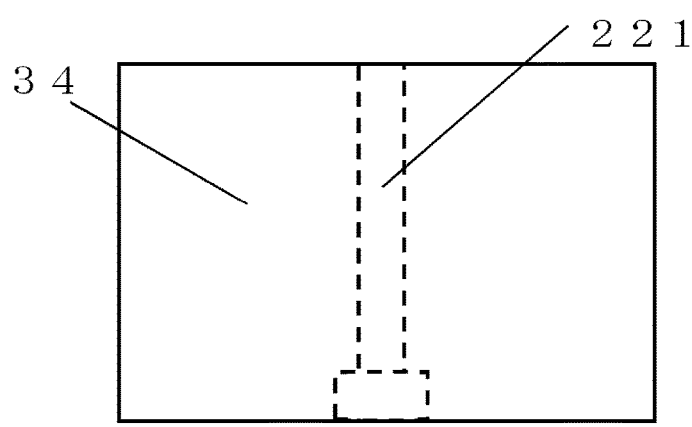
FIGS. 48A and 48B are schematic diagrams of a nested element machined directly with the form of outer tube 132.
Figure 48B:
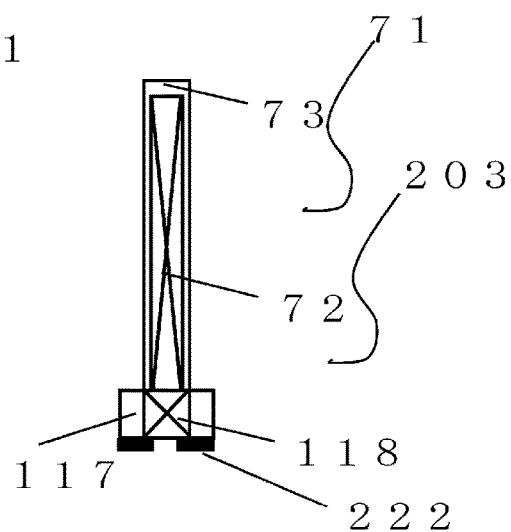

FIGS. 49A and 49B illustrate the case where the inner core 71 is mounted by using the configuration of FIGS. 48A and 48B.

The bottom diagram in FIG. 49 is a schematic diagram (plan view) of the plate 53 in the upper diagram as viewed from the upper side toward the lower side of page.

Figures 50A, 50B:
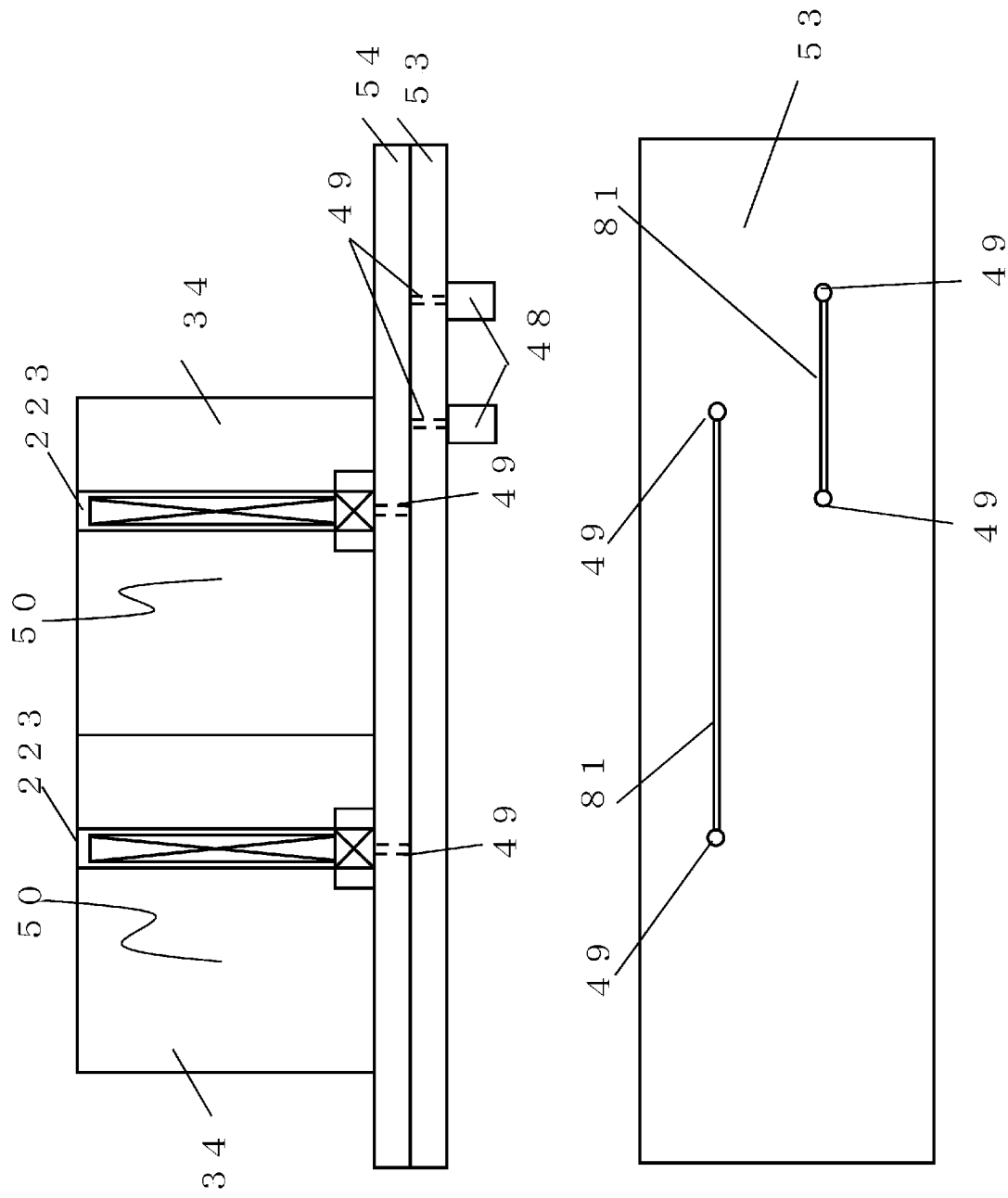
FIGS. 50A and 50B are schematic diagrams of a case where multiple circuits of pressurized fluid are provided on a single seal-plate in FIGS. 49A and 49B.

In the configuration depicted in FIG. 50, multiple sets of those elements in the lower diagram in FIG. 49, i.e., groove 81, passageway 49 and connecting port 48, were provided separately together with respectively a device for preparing pressurized fluid 1140 shown in FIG. 46, so that the conditions for fluid pressurization can be set up separately for each pressurization pin. Incidentally, as the groove 81 is provided separately, the exhaust circuit including valve 68 is provided also separately, as a matter of course.

Figure 51A:
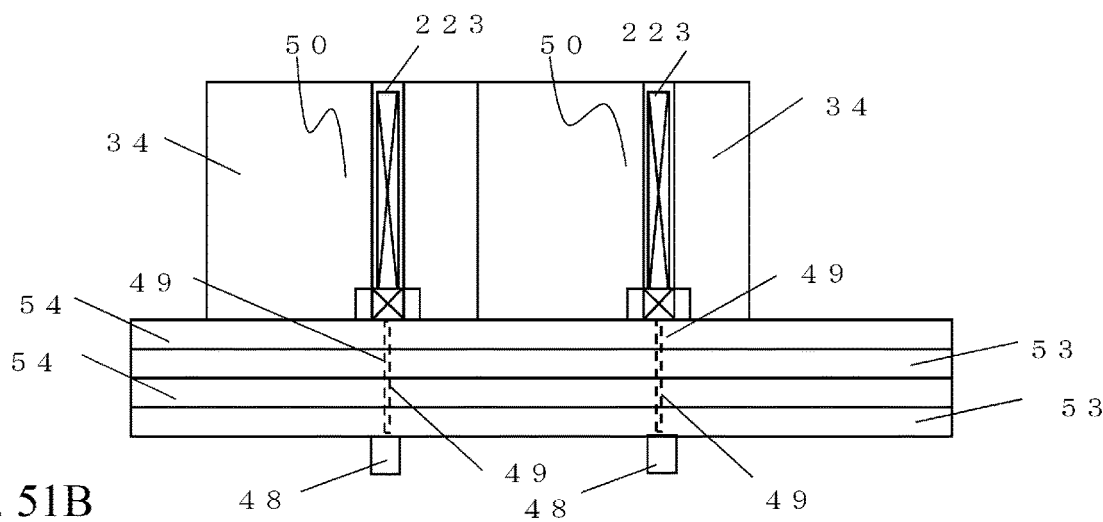
FIGS. 51A to 51C are schematic diagrams of a case where multiple seal-plates are used in FIGS. 49A and 49B, each seal-plate being provided with a circuit of pressurized fluid.
Figure 51B:
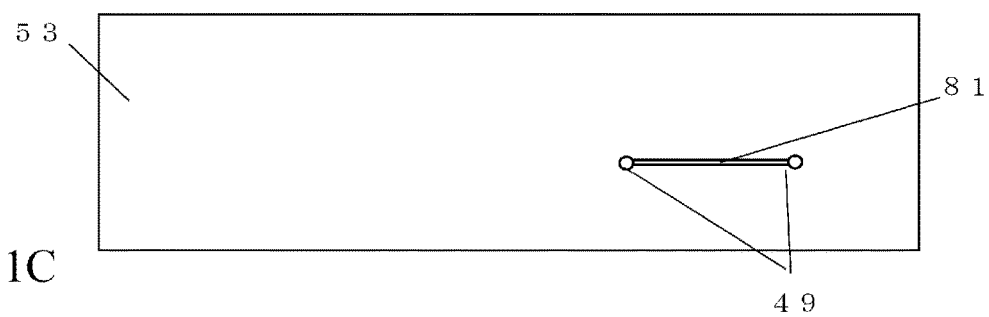
Figure 51C:
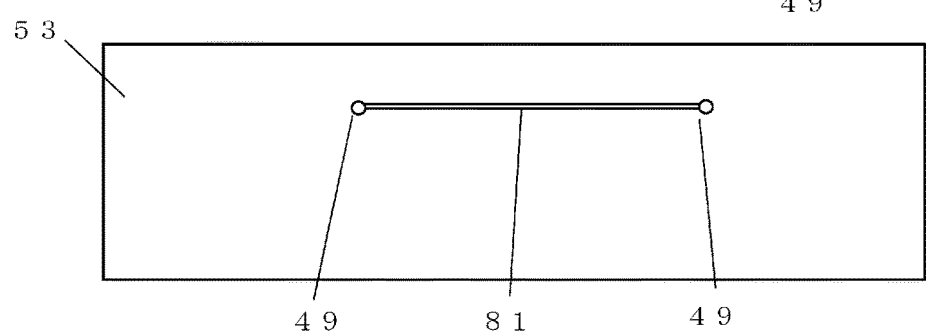

In the configuration depicted in FIGS. 51A to 51C, multiple sets of plate 53 and plate 54 depicted in FIG. 49A were used to constitute separately multiple sets of circuit for fluid pressurization so as to enable to set up the conditions for fluid pressurization separately for each pressurization pin by using respectively a device for preparing pressurized fluid 1140 shown in FIG. 46. In the similar manner as the description of the aforementioned FIGS. 50A and 50B, the exhaust circuit including valve 68 is provided also separately.

Figure 20:
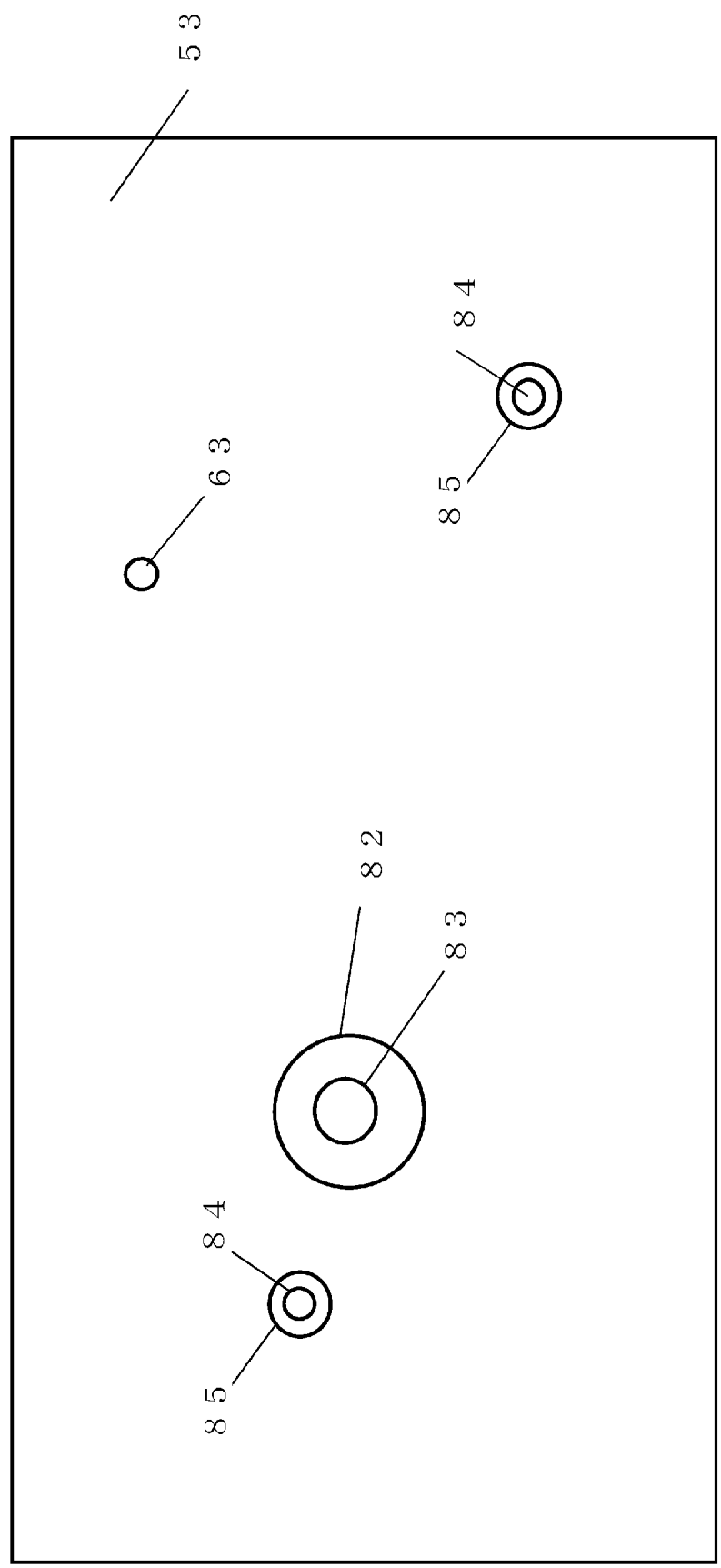
FIG. 20 is a schematic diagram representing the structure of plate 53 for fixing a seal-ring for sealing an ejector pin.

Incidentally, in the configurations depicted in FIG. 49A, FIG. 49B, FIG. 50A, FIG. 50B, and FIGS. 51A-51C, the seals 55, 91, 93, etc. indicated in FIG. 19, FIG. 20, etc. are used in the same manner but they are not illustrated therein.

Figure 17:
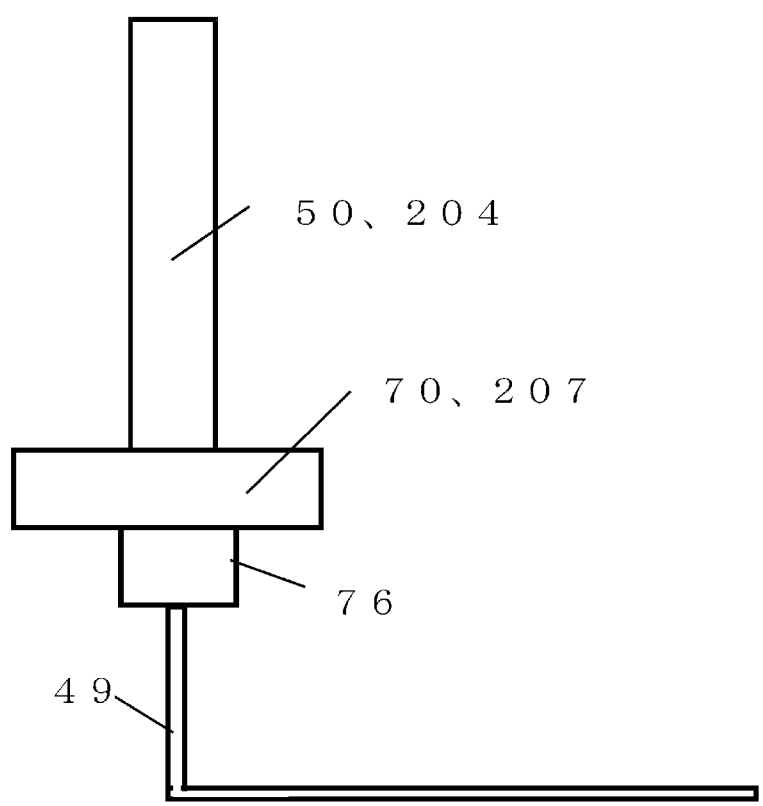
FIG. 17 is a schematic diagram representing the circuit of pressurized fluid of pressurizer pin toward the mold.

FIG. 17 illustrates the state wherein the pressurization pin 50 or 204 depicted in FIGS. 4-16 is provided on the stationary side mold 201 or the movable side mold 202. The pressurization pin 50 or 204 is connected to the circuit of pressurized fluid comprised of a stainless pipe 49 by using a high-pressure fitting 76 coupled to the flanged part 70 or 207. As high-pressure fitting 76, we can cite a high-pressure fitting supplied by Nippon Swagelok FST, Inc.

(Reason why Pressurized Fluid can be Injected into Clearances)

The pressure at which a resin is filled into the cavity is called "filling pressure" or "injection pressure" and is expressed by a value in MPa (mega-pascal), $kg/cm^2$ or by a percentage (%) value over the maximum injection pressure of the injection molding unit.

Moreover, the velocity at which a resin is filled into the cavity is called "filling speed" or "injection speed" and is expressed by a value in mm/sec (second) by using the displacement speed of the screw of injection molding unit, or by a percentage value (%) over the maximum injection pressure of injection molding unit.

Furthermore, the hourly volume or weight of resin filled into the cavity is called "filling rate" or "injection rate" and expressed in ml (milliliter)/sec, cc/sec, cm$^3$/sec, or g (gram)/sec.

The process of filling a molten resin into the cavity is described separately for the period during which the filling proceeds and for the time at which the filling is completed. Incidentally, for simplifying the description, the ABS, a thermoplastic resin, is adopted as the resin to be used.

In the injection process of injection molding unit, the maximum pressure acting on the molten ABS in the heating cylinder is about 200 MPa, a very high pressure. However, the pressure of the said molten ABS is reduced to around 30 MPa when the resin arrives at the inside of cavity due to pressure loss while it flows through the nozzle, the spool-runner of mold and the gate of the injection molding unit.

While the filling of cavity with resin is not yet completed, the pressure of such a resin in the process of filling, i.e., of around 30 MPa, is not so high. That is because there is still space left unfilled in the cavity. In other words, that is because the ABS in the cavity has not yet reached its flow end and is in a state of short-mold, and consequently it is not yet subjected to the force with which the cavity wall pushes back the resin when the cavity is eventually filled completely with resin (in this case the reactionary force developed by the wall).

Normally, as the surface temperature of cavity wall is lower than that of filled ABS, the surface of ABS is cooled and solidified at the same time when the cavity is filled with ABS, and a skin layer is formed on the ABS surface. In other words, because ABS is solidified from the molten state, a volume contraction takes place and a clearance is formed between the cavity wall surface and the ABS surface.

If the pressurized fluid is introduced into this clearance, the pressure of pressurized fluid acts on the cavity wall surface as well as on the ABS that is not yet cooled and solidified. Since the ABS surface is more easily compressed than the cavity wall surface, the former is pressurized and compressed due to the pressure of pressurized fluid. This phenomenon is called "wedge effect". Due to the wedge effect, the entire body of resin in the cavity reaching as far as parting on the movable side, parting on the stationary side, slide-core parting on the stationary side or slide-core parting on the movable side, etc. is pressurized. In the case where a gas rib is provided, the pressurized fluid expands in the gas-rib and the resin in the cavity is pressurized partially due to the wedge effect. Incidentally, in order to make the wedge effect work sufficiently, it is better to use a lower pressure for filling the cavity with ABS. In such a case, it is possible to lower the pressure of pressurized fluid.

In the case where the ABS of the same volume as that of the cavity is filled, the volume of ABS decreases as the solidification of ABS progresses. In the solid injection molding process, the resin pressure keeping is carried out to compensate for the volume decrease due to cooling and solidification, wherein the ABS in the cavity develops a high pressure only after the resin pressure keeping is carried out. When the resin pressure keeping stops, as the pressure acting on the ABS filled in the cavity disappears, the volume of ABS in the cavity decreases. In other words, there exists a relationship that the cavity volume is larger than the ABS volume, and the cavity volume never becomes smaller than the ABS volume.

In the case where the fluid pressurization is carried out while the resin pressure keeping at a high pressure is performed, even if the ABS pressure is higher than the pressure of pressurized fluid (pressure of pressurized fluid<ABS pressure), and when the pressure of pressurized fluid becomes higher than the ABS pressure (pressure of pressurized fluid>ABS pressure) as the ABS pressure decreases while the cooling and solidification of ABS proceeds, the pressurized fluid achieves fully the effect of fluid pressurization on ABS.

As a means to lower the ABS pressure after the cavity is filled with ABS, in addition to the operation of retraction or suck-back of the screw of injection molding unit, a dummy shape or a disposable shape (also called "disposable cavity") is provided at the cavity end. The molten resin is injected with a volume exceeding the cavity volume to fill a portion of the dummy shape to make a short mold and lower the ABS pressure in the cavity.

Incidentally, the dummy shape can be made to have a thick dimension. Furthermore, the dummy shape can also be configured so that a shutter is provided which will be opened after the cavity is filled with ABS with a full pack, and the ABS is pushed out into the dummy shape under the pressure of pressurized fluid to lower the pressure of the ABS in the cavity. As other means to make the wedge effect work, we can cite the cases where the cavity surface is embossed or coated.

In the case where the resin pressure keeping is employed, since the ABS pressure in the cavity increases, the pressure of the pressurized fluid to be injected into the cavity needs to be made higher. In such a case, the transcription performance of molded article is improved. However, because of residual internal strains, warpages and deformations are feared.

In a contrasting situation, in the case where the pressure of pressurized fluid is lowered by means of a short-mold, a molded article with a large profile area can be molded by an injection molding unit with a lower mold clamping force. The molded articles have few internal strains, warpages and deformations.

Although there is no limitation as to the thickness of a molded article to be manufactured by embodiment of the present invention, in the case of a thermoplastic resin, it is thicker than 1 mm and thinner than 5 mm, preferably in an approximate range between 1 mm and 4 mm.

(Partial Pressurization and Total Pressurization)

The fluid pressurization can be carried out on the totality of the molded article (for example the totality of the parting on the movable side) or on a portion of the molded article.

In the total pressurization, the pressurization pins are provided on the surface one wishes to pressurize (parting on the stationary side or parting on the movable side) to carry out the fluid pressurization. The number of pressurization pins is determined according to the surface area and the thickness of molded article.

In the partial pressurization, it is needed to encircle with a gas rib the area around a pressurization pin (the extent of area one wishes to pressurize including the pressurization pin) by providing a gas rib high enough (for example 1.5 mm) to prevent the pressurized fluid from leaking to the outside. The partial pressurization is an effective means to limit the area exposed to the action of pressurized fluid to the part where one wishes to reduce the occurrence of sink marks or to improve the transcription performance.

In order to carry out the partial or total pressurization, if the nested elements 32 and 34, and the ejector pin 27 are lacking in the stationary side mold 201 and the movable side mold 202, the fluid pressurization can be carried out by installing the pressurization pin 50 in the cavity and by using only the pressurization pin 50. However, in the case where the nested element 32 or the nested element 34, or the ejector pin 27 exists in the stationary side mold 201 or the movable side mold 202, if the pressurized fluid injected into the cavity leaks to the outside, the lower seal plate 53 under the nested element 34 on the movable side mold 202 and the upper seal plate 54 under the nested element on the movable side are used. The molded article 1 and the molded article 2 in the working example are molded articles manufactured by the total pressurization. The molded article 3 is an article manufactured by the partial pressurization.

(Venting of Air)

In the stationary side molds 201 and 205, because of the use of lower seal plate 44, upper seal plate 45 and seal 46, the air in the cavity 200 is deprived of the space for venting during the filling of cavity 200 with resin. Similarly, in the movable side molds 202 and 206, because of the use of lower seal plate 53, upper seal plate 54 and seal 55, the air in the cavity 200 is deprived of the space for venting during the filling of cavity 200 with resin. For this reason, the sealed mold 142 using the stationary side mold 201 and the movable side mold 202 can possibly cause the occurrences of short-mold, discoloration or burn.

In order to prevent the occurrences of short-mold, discoloration or burn, in the sealed molds 141 and 142, a suitable way is contrived for venting the air in the cavity to the outside of cavity during the filling with resin by providing a means to discharge a fluid (an example of discharge portion) for letting out a gas from the nested element 32 in the stationary side molds 201 and 205, and by providing also a space at the bottom of the upper seal plate 45 (face opposite to the side of cavity 200). In the sealed molds 141 and 142, a suitable way is contrived for venting the air in the cavity to the outside of cavity during the filling with resin by providing a means (an example of discharge part) to discharge a fluid for letting out a gas from the nested element 34 in the movable side molds 202 and 206, and by providing also a space at the bottom of the upper seal plate 54 (face opposite to the side of cavity 200).

Specifically, in the stationary side molds 201 and 205, a small space is provided between the upper seal plate 44, the lower seal plate 45, and the seal 46. In the movable side molds 202 and 206, a small space (for example, the spaces 102 in FIG. 19) is provided between the upper seal plate 54, the lower seal plate 53, and the seal 55.

FIG. 18 illustrates the structure of lower seal plate 53, upper seal plate 54 and seal 55 in FIG. 3. The lower seal plate 53 and the upper seal plate 54 differ from the lower seal plate 44 and the upper seal plate 45 in that, since the stationary side molds 201 and 205 have an ejector pin 27, the former two elements have a hole 83 (FIG. 19) into which the ejector pin 27 is inserted (in which it slides) and a depressed part 82 accommodating a seal ring 89 (an example of ring-shaped elastic member).

However, in the stationary side mold 201 or 205, in the case where a push-out pin, kicker pin or knock-out pin is used, because the ejector pin 27 is to be used, it is needed to form the depressed part 82 to accommodate the seal ring 89, in the lower seal plate 44 and the upper seal plate 45.

The means to discharge a fluid corresponds to the valve 67 indicated in FIG. 2 and FIG. 3. The valve 67 is opened while the cavity 200 is being filled with a resin to discharge out of the sealed mold 141 the air displaced by filling with resin through the clearance 33 in the nested element 32 and through the groove provided between the lower seal plate 44 and the upper seal plate 45.

Incidentally, while FIG. 18 illustrates lower seal plate 53, upper seal plate 54 and seal 55 on the movable side mold 206, since they differ from lower seal plate 44, upper seal plate 45 and seal 46 on the stationary side molds 201 and 205 only in the aforementioned structure and are composed of almost the same elements, the description has been given by using FIG. 18.

As a means to discharge the fluid, instead of the valve 67, it is possible to install a tank (not illustrated) with a volume several times as large as that of the cavity 200 at the point where the valve 67 is located. The air in the cavity 200 displaced by the filling of cavity with resin is transferred to the tank, and consequently the adiabatic compression can be prevented. For this reason, short-mold, discoloration and burn of the molded article can be prevented. However, the tank, as explained in regard to the ejector box 51, needs to be filled with a pressurized fluid of the same pressure as that of the pressurized fluid.

In the stationary side molds 201 and 205, in the case where there is an ejector pin or a kicker pin that is fixed and pushed out, it is needed to provide a configuration similar to that in the ejector box 51. The stationary side molds 201 and 205 that have the same configuration as that of ejector box 51 can control the occurrences of short-mold, discoloration and burn, because the air in the cavity 200 is pushed out by the filling of cavity 200 with resin. In this case, as the sealing action is effected by the ejector box 51, the lower seal plate 44, the upper seal plate 45, and the seal 46 can be dispensed with.

(Pressurization from Slide Core)

The slide core provided in the stationary side mold 201 or the movable side mold 202 has almost the same configuration as that of the aforementioned stationary side mold 201. In other words, the slide core has, under the slide (bottom of nested element of slide), the same configuration as explained for the stationary side, comprising lower seal plate 44, and upper seal plate 45 and seal 46. Moreover, on the slide core, in order to prevent the leakage of pressurized fluid from the matching surface between the core and the mold, a seal (seal 41 on the stationary side slide, seal 42 on the movable side slide) is provided likewise.

The injection mechanism for pressurized fluid (direct pressurization, indirect pressurization) and the gas exhaust mechanism have the configuration similar to that presented for the aforementioned stationary side. Moreover, in the case where the occurrences of short-mold, discoloration and burn of molded articles are feared, it is possible to provide a valve 67 or a tank installed on the stationary side mold 201, etc.

Form of Embodiment (Mold Structure of Sealed Mold 142)

The sealed mold 141 employing the ejector box 51 needs a large volume of pressurized fluid, because the space 52 of the movable side mold has to be filled with the pressurized fluid.

The following sections describe, by referring to FIG. 3 and FIGS. 18-20, the mold structure of the sealed mold 142 as a means to solve the above-mentioned problem. FIG. 18 is a schematic diagram of the mounting structure of the nested element 34 in the movable side mold 206 (an example of second mold) of the sealed mold 142 in FIG. 3. FIG. 19 is a schematic diagram (plan view) of the upper seal plate 54 as viewed from the lower side of page toward the upper side of it in FIG. 18. FIG. 20 is a schematic diagram (plan view) of the lower seal plate 53 as viewed from the upper side of page toward the lower side of it in FIG. 18.

Incidentally, in the sealed mold 142 shown in FIG. 3, regarding the components that are same as those of the sealed mold 141 shown in FIG. 2 are tagged with the same codes and the detailed descriptions are omitted. In order to make the descriptions more comprehensible, the sealed mold 142 is described mainly in respect to the parts in which it differs from the sealed mold 141.

The sealed mold 142 (an example of mold device), as shown in FIG. 3, differs from the sealed mold 141 and is not provided with the ejector box 51. Moreover, each of ejector pins 27 (an example of shaft body) in the sealed mold 142 is sealed by a seal ring 89 (an example of ring-shaped elastic member, an example of the first ring-shaped elastic member).

Here, the seal ring 89, as shown in FIG. 18, is annular in shape (doughnut-shaped) and is an elastic body composed of a rubber material in which a concave groove 208 having an opening 209 along the circumferential direction is formed. The concave groove 208 formed in the seal ring 89 is provided on one face perpendicular to the center axis of seal ring 89. Consequently, the seal ring 89 presents specificity in orientation.

In the seal ring 89, if the pressure of pressurized fluid is applied to the concave groove 208, the opening 209 of concave groove 208 is enlarged as a result of elastic deformation due to the pressure of pressurized fluid, and hence the sealing effect is enhanced.

In the sealed mold 142, as shown in FIG. 3, in order to prevent the pressurized fluid injected into the cavity 200 from leaking to the outside through clearances 33 of the nested element 32, lower seal plate 44, upper seal plate 45 and seal 46 are provided on the bottom (the face opposite to the side of cavity 200) of the nested element 32.

Furthermore, on each of ejector pins 27 in the sealed mold 142, as shown in FIG. 3 and FIG. 18, a seal ring 89 is provided in order to prevent the pressurized fluid injected into the cavity 200 (an example of molding space) from leaking to the outside through clearances along the ejector pin 27.

Furthermore, in the sealed mold 142, in order to prevent the pressurized fluid injected into the cavity 200 from leaking to the outside through clearances 35 in the nested element 34, lower seal plate 53, upper seal plate 54 and seal 55 are provided on the bottom (the face opposite to the side of cavity 200) of the nested element 34.

On one surface of the lower seal plate 53, as shown in FIG. 18 and FIG. 19, a depressed part 82 to accommodate the seal ring 89 is provided. Approximately at the center of the depressed part 82 on the lower seal plate 53, a perforated hole 83 is formed into which the ejector pin 27 is inserted.

The ejector pin 27 is sealed (hermetically fixed) by accommodating the seal ring 89 in the depressed part 82 on the lower seal plate 53 as well as by placing the seal 55 on one face of the lower seal plate 53, covering the one face of the lower seal plate 53 with the upper seal plate 54, and then by inserting the ejector pin 27 into the bore of seal ring 89.

The diameter of ejector pin 27 is larger than the inner diameter of seal ring 89 and smaller than the diameter of perforated hole 83. For this reason, the ejector pin 27 is sealed by the seal ring 89 accommodated in the depressed part 82 and at the same time is supported in a state where it can slide in axial direction of the ejector pin 27.

FIG. 18 illustrates a case where the ejector pin 27 is provided with a piece of seal ring 89. The ejector pin 27 can be provided also with several seal rings 89 to enhance the sealing effect. In the case where the stationary side mold 205 (an example of the first mold) is provided with a structure to push out the molded article or a kicker pin, the seal ring 89 can be used.

In the sealed mold 142, each one of ejector pins 27 is sealed by a seal ring 89, and the nested element 34 is sealed by lower seal plate 53, upper seal plate 54 and seal 55. For this reason, in the sealed mold 142, when the cavity 200 is filled with a resin by using an injection molding unit, there remains no space for escape for the air in the cavity 200 unless there is a means for drawing off the fluid, and as a result it is likely that the air is compressed. Consequently, the occurrences of short-mold, deformation or burn of the molded article could be anticipated.

In cases where this problem occurs, as a means to solve it, one can cite the solution by providing the sealed mold 142 with a means to discharge the fluid. The means to discharge the fluid is able to let out the air in the cavity 200 that is displaced by a resin while the cavity 200 is being filled with the resin.

Specifically, the means to discharge the fluid has: a passageway 63 formed in the movable side mold 206; a pressure-resistant hose 64 connected to the passageway 63; and a valve 68 (an example of discharge portion) connected to the pressure-resistant hose 64.

The passageway 63 is connected with: a clearance between one face of lower seal plate 53 and the other face of upper seal plate 54; the clearance 35 in the nested element 34; and the groove 81 provided on upper seal plate 54 (see FIG. 19).

In other words, the valve 68 is kept open while the cavity 200 is being filled with a resin to let out to the outside of sealed mold 142 the air displaced by the filling of resin, through clearance 35 of nested element 34, groove 81, passageway 63, and pressure-resistant hose 64. Incidentally, although detailed descriptions are omitted, the valves 62 and 67 are also a means (an example of discharge portion) to discharge the fluid and have the same function as that of valve 68.

The valves 62, 67 and 68 as a means to discharge the fluid are kept open while the cavity 200 is being filled with a resin. The means to discharge the fluid is closed after the cavity 200 is filled with a molten resin. After the means to discharge the fluid is closed, the pressurized fluid is injected into the sealed mold 142 from the device 140 for preparing pressurized fluid shown in FIG. 1.

The injection of pressurized fluid into the sealed mold 142 from the device 140 for preparing pressurized fluid is carried out, for example, from the injection means 58, 115 (see FIG. 18), etc.

The injection means 58 is an injection means used for injecting the pressurized fluid into the cavity 200 (direct pressurization). The injection means 58 comprises, as shown in FIG. 3 and FIG. 18: connecting port 48 to be connected with the pressure-resistant hose 64 connected to the device 140 for preparing pressurized fluid; passageway 49 (perforated hole formed in the lower seal plate 53) leading to the connecting port 48; and pressurization pin 50 (an example of injection portion).

The clearance between the perforated hole 77 (see FIG. 4) and the core body 203 in the pressurization pin 50 is connected to the passageway 49. That is, the pressurized fluid prepared by the device 140 for preparing pressurized fluid pressurizes the resin in the cavity 200 through the intermediary of pressure-resistant hose 64, connecting port 48, passageway 49 and pressurization pin 50.

The injection means 115 is an injection means used for injecting the pressurized fluid into the cavity 200 (indirect pressurization). The injection means 115 comprises, as shown in FIG. 18: connecting port 48 to be connected with the pressure-resistant hose 64 connected to the device 140 for preparing pressurized fluid; passageway 49 (perforated hole formed in the lower seal plate 53) leading to the connecting port 48; and pressurization pin 212 (see FIG. 18).

The passageway 49 is connected with the clearance between nested element 34 and upper seal plate 54, and the clearance 35. That is, the pressurized fluid prepared by the device 140 for preparing pressurized fluid is injected into the cavity 200 through the intermediary of pressure-resistant hose 64, connecting port 48, passageway 49 and pressurization pin 212, nested element 34, and clearance 35. If the pressurization pin 212 is compared with the pressurization pin 50, the former differs from the latter in longitudinal length but the constituents are almost the same.

Incidentally, the code (arrowhead) 47 shown in FIG. 18 indicates the flow direction of pressurized fluid. The code (arrowhead) 65 indicates the direction of exhaust of the air in the cavity 200. The code (arrowhead) 66 indicates the air in the cavity 200 that has been discharged into the outside (atmosphere).

On one face of the lower seal plate 53, as shown in FIG. 18 and FIG. 19, a depressed part 85 is formed into which the flanged part 70 (see FIG. 5) of pressurization pin 50 is inserted. Approximately at the center of the depressed part 85 a perforated hole 49 is formed. The seal 126 (see FIGS. 11-13) is provided between the depressed part 85 and the flanged part 70 that is inserted into the depressed part 85.

On the bottom face of depressed part 213 in the upper seal plate 54, as shown in FIG. 19, the groove 81 is formed which is used for supplying the pressurized fluid to the cavity 200 and for drawing off the air in the cavity 200. The groove 81 is connected with the perforated hole 49 and the passageway 63 through the intermediary of: clearances between the perforated holes formed in the upper seal plate 54 for pressurization pins and the pressurization pins 50 and 212; and clearances between the perforated hole formed in the upper seal plate 54 for an ejector pin and the ejector pin 27.

The passageway 63 is connected with one end of the pressure-resistant hose 64 for letting out the air in the cavity 200. The other end of the pressure-resistant hose 64 is connected with the valve 68. The valve 68 is kept open while the cavity 200 is being filled with a resin and closed after the cavity 200 has been filled with the resin. As the valve 68 is kept open while the cavity 200 is being filled with a resin, the air displaced by the resin is expelled from the valve 68 into the atmosphere, through the intermediary of clearance 35 of nested element 33, groove 81, clearances along the ejector pins, passageway 63, etc. The valve 68 corresponds, specifically, to a solenoid valve, a valve with a pneumatic actuator driven by the power of air, etc.

In the upper seal plate 54, as shown in FIG. 19, a small space 102 is formed with a view to providing a cushioning effect so that the fluid pressure in the groove 81 may not rise too rapidly. The small space 102 needs not necessarily be provided.

The valve 15 of the device 140 for preparing pressurized fluid shown in FIG. 1 can be used as a means (first discharge portion) to discharge the fluid instead of valve 62, valve 67 and valve 68. The use of the valve 15 as a means to discharge the fluid is effective for the case of injection means 61 or injection means 115 that carries out the fluid pressurization in lower seal plate 44, upper seal plate 45, lower seal plate 53, and upper seal plate 54 through the intermediary of clearances in nested elements 32, 34, and ejector pin 27. The operation of valve 15 is the same as that of valve 62, valve 67, and valve 68, where it is kept open while the cavity 200 is being filled with a molten resin, and closed after the cavity has been filled with the resin and before the pressurization of the resin by fluidic pressure starts. Incidentally, the valve 62 and the like can be provided in multiple numbers with a view to accelerating the discharge of fluid, if the cavity volume is large.

(Seals for Nested Element)

Then, the seals for the nested element 34 are described by referring to FIGS. 18-20.

The seal plate 54 is a rectangular plate having a rectangular depressed part 213 in the center of one face of it. One end of the nested element 34 in the stationary side mold 206 is fitted into the depressed part 213. In other words, the portion in the nested element 34 which lies away from the cavity 200 is surrounded by the upper seal plate 54.

On the upper face of the peripheral part of the upper seal plate 54, a seal 93 is provided in a manner following the peripheral part. As the peripheral part of the upper seal plate 54 is tightly fixed to the movable side mold plate 87 (see FIG. 3) that constitutes the movable side mold 206, the seal 93 is held between the movable side mold plate 87 and the upper seal plate 54. In other words, the movable side mold plate 87 and the upper seal plate 54 are sealed by the seal 93. For this reason, there is no likelihood that the pressurized fluid acting on the resin in the cavity 200 leaks along the surface of contact between the movable side mold plate 87 and the upper seal plate 54.

The seal 55 is provided between the lower seal plate 53 and the upper seal plate 54. For this reason, there is no likelihood that the pressurized fluid acting on the resin in the cavity 200 leaks along the surface of contact between the lower seal plate 53 and the upper seal plate 54.

On one face of the lower seal plate 53, as shown in FIG. 20, a depressed part 82 is formed in a manner surrounding the perforated hole 83, wherein the seal ring 89 is to be inserted into the depressed part 82. Furthermore, on one face of the lower seal plate 53, a depressed part 85 is formed in a manner surrounding the perforated hole 84, wherein the flanged part 70 of the pressurization pin 50 or the flanged part of the pressurization pin 212 is to be inserted into the depressed part 85.

As the seal ring 89 is inserted into the depressed part 82, the pressurized fluid does not leak out of the perforated hole 83. Furthermore, as the depressed part 85 is sealed by using the seal 126 when inserting the flanged part of an injection pin (see FIGS. 11-13), the pressurized fluid does not leak out of the perforated hole 84.

The stationary side mold 205, the stationary side slide core 36, and the movable side slide core 37, when they use an ejector pin 27 or a kicker pin, they are sealed by using a seal ring 89 similarly as in the case of the ejector pin 27 in the movable side mold 206. The stationary side mold 205, the stationary side slide core 36, and the movable side slide core 37, when they do not use the ejector pin 27, needless to say, they do not have to use the seal ring 89.

(Depressurization of Inside of Cavity)

The sealed mold 142 can have a means to depressurize the inside of the cavity 200 after the stationary side mold 205 and the movable side mold 206 have been closed, and before the cavity is filled with a molten resin. The depressurization means is, for example, a vacuum pump or an apparatus (aspirator) to create a depressurized state by using a fluid causing the Venturi effect or the like.

Figure 21:
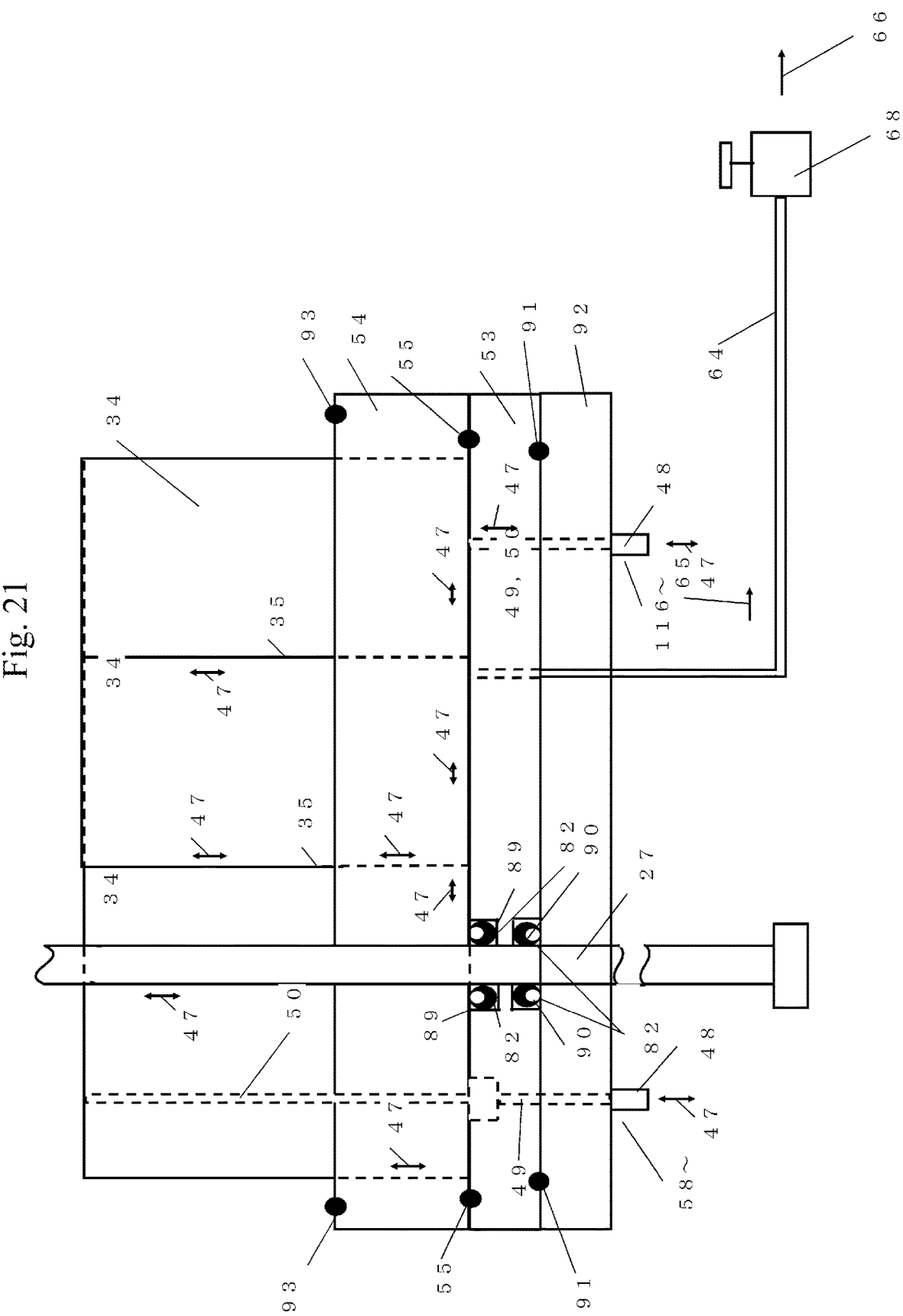
FIG. 21 is a schematic diagram presenting the means for sealing an ejector pin by using a seal-ring when the mold cavity content is aspirated by vacuum.
Figure 22:
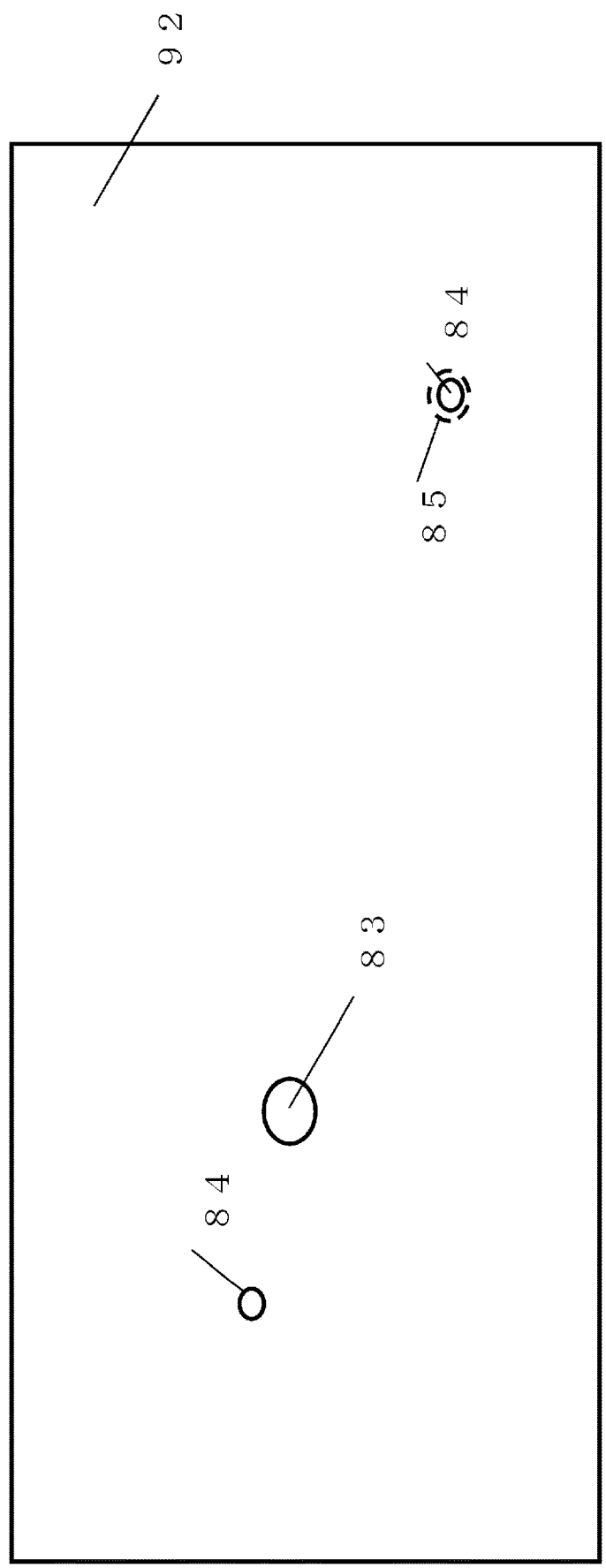
FIG. 22 is a schematic diagram representing the structure of plate 92 to fix the sealing means of an ejector pin by using a seal-ring when the mold cavity content is aspirated by vacuum.

In the sealed mold 142, when the inside of the cavity 200 is depressurized by aspirating by vacuum the air in it by using a depressurization means (an example of discharge portion), a seal ring 90 is added to the lower seal plate 53 as shown in FIG. 21. If it is described in more details, in the lower seal plate 53, a depressed part for inserting a seal ring 90 is formed on the other face of it. In the depressed part, a seal ring 90 is inserted with its opening 209 oriented toward the side opposite to the side of the cavity 200. Then, on the other face of the lower seal plate 53, a seal 91 is placed along the peripheral part of the lower seal plate 53 and then the seal plate 92 is brought to touch and fix the seal 91.

When a depressurization means is used in the sealed mold 142, the configuration of the lower seal plate 53 should not be that shown in FIG. 18 but it should be made to have the configuration shown in FIG. 21. The reason for that is described below.

As the seal ring presents specificity in orientation, in the case where the lower seal plate 53 has the configuration shown in FIG. 18, when the air in the cavity 200 is depressurized by the depressurization means, air will enter into the cavity 200. In other words, since the opening 209 of the depressed part 208 is oriented toward the cavity 200 as shown in FIG. 18, the air pressure acts from the side opposite to the side of the opening 209 of the depressed part 208 of the seal ring 89. For this reason, in the case where the air in the cavity is depressurized by the depressurization means, the sealing effect of the seal ring 89 is not realized.

In order to make the seal ring realize its sealing effect even when the air in the cavity 200 is depressurized by a depressurization means, it is needed to add a seal ring 90 in which the opening 209 is oriented toward the side opposite to the side of cavity 200, as shown in FIG. 21. By this addition, the seal ring 90 on the lower side of page realizes enough sealing effect, since the opening 209 opens when the air in the cavity 200 is depressurized.

Incidentally, between the lower seal plate 53 and plate 92, the seal 91 is provided along the peripheral part of the lower seal plate 53. The seal 91 can be dispensed with.

Moreover, the air in the cavity 200 is aspirated by vacuum by connecting a depressurization means to at least one of valve 62, valve 67 and valve 68. The valve used for aspiration by vacuum shall be closed before the pressurization by the pressurized fluid starts. Incidentally, as a valve 62, etc., it is necessary to use one compatible with the usage for aspiration by vacuum.

As the mounting structure of nested element 34 on the movable side in the mold 206 shown in FIG. 21 closely resembles the mounting structure shown in FIG. 18, main differences only have been described. The configuration of the seal plate 54 in FIG. 21 can be the same as that of the seal plate 54 in FIG. 18. Furthermore, in the case where an ejector pin 27 or a kicker pin is used in the stationary side mold 205, the same mounting structure as that shown in FIG. 21 is used as a mounting structure of the nested element 32.

(Injection of Inert Gas into Cavity)

As a means to control the short-mold of resin and the discoloration and burn of molded article, in addition to the aforementioned depressurization means, the means is available by which an inert gas like, for example, nitrogen gas is injected into the cavity 200. The inert gas is injected into the cavity 200 before the cavity 200 is filled with a molten resin from at least one of valve 62, valve 67 and valve 68 in the sealed mold 142, so as to replace the air in the cavity 200 with the inert gas.

(Seal Ring)

Figure 27:
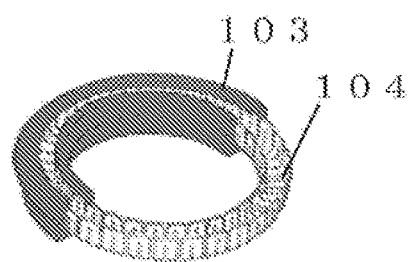
FIG. 27 is a schematic diagram representing the structure of a seal-ring 89 (Omniseal, Variseal).
Figure 28:
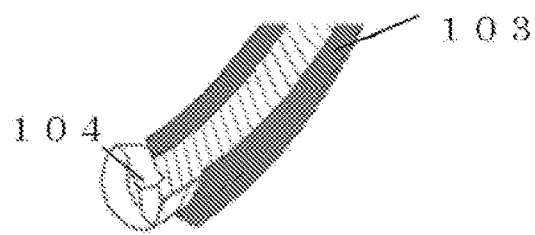
FIG. 28 is a schematic diagram representing the cross section of a seal-ring 89 (Omniseal, Variseal).

As seal ring 89 and seal ring 90, we can cite, for example: OmniSeal (tradename) supplied by Saint-Gobain (USA), Taf Trading Co. Ltd., Seal Tech Inc., Japan Seal Industries Co. Ltd, Nishiyama Corporation, etc; Turcon (tradename), Variseal (tradename) supplied by Trelleborg Sealing Solutions Japan KK. Here, Turcon is a sign representing the material that is normally PTFE (polytetrafluoroethylene) but there are other products employing, besides PTFE, PE (polyethylene), and hence sometimes they may simply be called Variseal. As an example of seal ring, the configuration of seal ring is shown in FIG. 27 and FIG. 28. A seal ring is a packing of spring-loaded Teflon (tradename) comprising a seal part made of resin 103 and a metal spring part 104.

Figure 33:
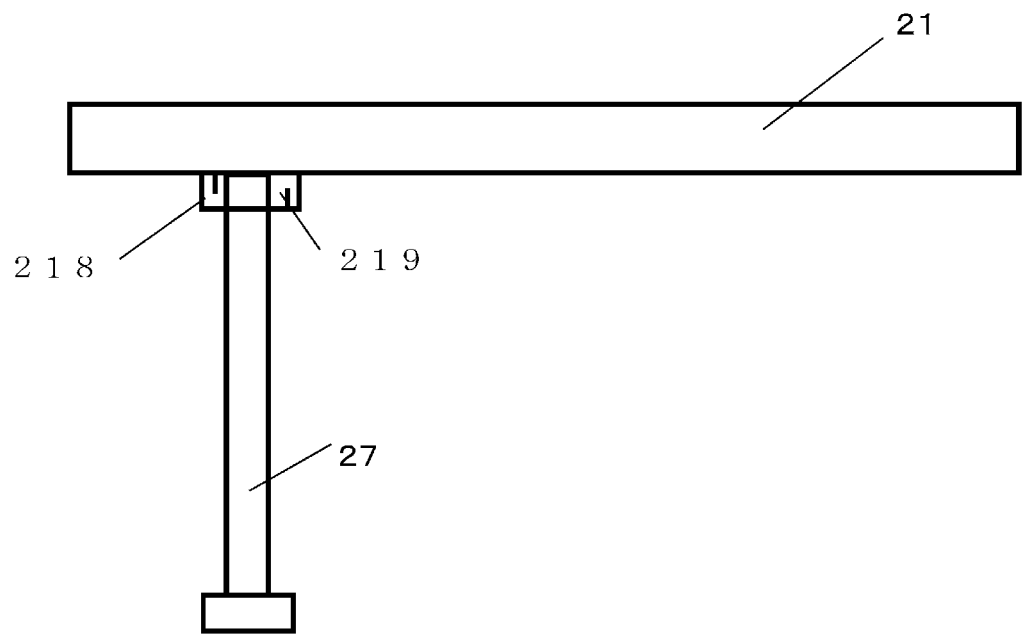
FIG. 33 is a schematic diagram representing a means of sealing an ejector pin by erecting a gas rib 218 around it.
Figure 34:
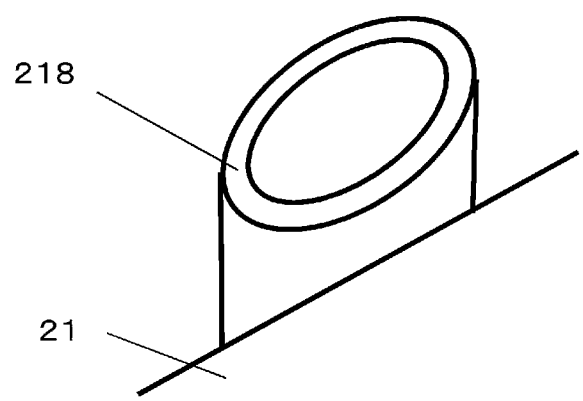
FIG. 34 is an oblique perspective view representing the end of the ejector pin in the schematic diagram of FIG. 33 representing a means of sealing an ejector pin by erecting a gas rib 218 around it.

As a means to seal an ejector pin, a solution is available in which a gas rib 218 is provided around the ejector pin in a manner surrounding the ejector pin as shown in FIG. 33 and FIG. 34, and the gas rib 218 carries out the same function as that of the gas rib to be described later. However, if the gas rib is provided so as to fit closely the ejector pin, since the shrinkage of resin makes the separation from mold difficult, the gas rib is arranged to have a small clearance as shown in FIG. 33 and FIG. 34.

With a means in which a rib is provided around the ejector pin, in a mold lacking a nested structure, for example, in a mold resembling a flat plate, it is not necessary to provide a seal ring. But in a mold having a nested structure, as the pressurized fluid leaks through the clearances of nested element, it is needed to employ the plate 53 and the plate 54 shown in FIG. 19 and FIG. 20 to prevent the leakage of pressurized fluid from the nested element, and in this case, because the leakage of pressurized fluid from the ejector pin occurs, it is required to seal the ejector pin by using a seal ring.

Alternatively, if a structure is adopted in which a gas rib is provided around the ejector pin and in addition the nested element is also encircled by a gas rib to configure a structure to prevent the entry of pressurized fluid into the clearances of nested element, the plate 53 and the plate 54 are not required.

In the case where the pressurized fluid is introduced into the clearances between the resin filled in the cavity 200 and the cavity surface of the stationary side mold 205 or the movable side mold 206, a seal ring 89 is used of which the opening 209 is oriented toward the cavity 200, in order to prevent the pressurized fluid from leaking out through the clearances between the perforated hole into which the ejector pin 27 is inserted and the ejector pin 27.

Moreover, in the case where the cavity 200 is filled with a molten resin after the air in the cavity 200 has been aspirated by vacuum, the seal ring 90 (an example of the second ring-shaped elastic member) is used, in order to prevent the air from entering into the cavity 200 from the outside while the air in the cavity 200 is aspirated by vacuum.

The seal ring 89 and the seal ring 90 require sliding properties. For this reason, as materials used for the sealing part 103, one can cite: Teflon (tradename)-based resins represented by PTFE (polytetrafluoroethylene) and PFA; silicone-based resins; high-density polyethylene, etc. The spring part 104 is made of spring steel or a stainless steel but it can also be a commercially available O-ring which uses a resin or a NBR (acrylonitrile-butadiene rubber).

It is not always necessary to use the spring part, but if the seal is spring-loaded, the adhesion to ejector pin is improved and it can reduces the leakage of pressurized fluid from the ejector pin when a resin in the cavity is pressurized.

The "shaft body extruding" in the present invention is a collective term for a particular type of components used in injection molding including ejector pin 27 in the movable side mold 206, ejector pin 27 or kicker pin, knockout pin in the stationary side mold 205.

The pressurization pin 50 shown in FIGS. 4-10 is accommodated in the sealed mold 142. To the bottom of the flanged part 70 of the pressurization pin 50, the pressurized fluid prepared by the device 140 for preparing pressurized fluid is fed. The pressurized fluid pressurizes the resin filled in the cavity 200. The structure and installation of the pressurization pin 50 is shown in FIGS. 4-22.

(Means for Venting Gas in Parting 26)

The parting 26 of the sealed mold 142 can be provided with a means for venting gas. The means for venting gas is described by referring to FIG. 23.

FIG. 23 is a schematic diagram representing the configuration of the means for venting gas provided in the parting 26 of the stationary mold 205. Incidentally, the venting gas is also called air venting, air vent, gas vent, vent, etc.

When the cavity 200 in the sealed mold 142 is filled with a molten resin, the air in the cavity 200 is compressed unless it is drawn off. The air compressed in the cavity 200 causes short-mold, and discoloration and burn on the resin surface.

In order to prevent the occurrences of aforementioned short-mold, etc., a means for venting gas is employed. As shown in FIG. 23, the gas vent 94 as an example of means for venting gas is provided on the parting 26 in a manner surrounding the cavity 30 of the stationary side mold 205.

The gas vent 94 is configured with dimensions that allow the air in the cavity 200 to pass but make it hard for a resin in it to pass, when the filling of cavity 200 with a resin is started. The dimensions of gas vent 94 are set, for example in the case where the resin is ABS, 5 mm or more but 10 mm or less in width, around 5 mm in length and 0.01 mm or more but 0.2 mm or more in depth. When it is less than 0.01 mm, it functions as a gas vent but the effect is low. When it is more than 0.2 mm, the occurrence of burrs is feared.

The air in the cavity 200 is discharged out to the outside of mold 142 from port 98 fixed to hole 63 after passing through gas vent 94, grooves 95 and 96 provided for discharging gas on the parting 26 of the stationary side mold 205, and hole 97 and hole 63. Incidentally, the groove 95 is configured, for example, so as to be 1 mm deep and 5 to 20 mm wide. The groove 95 can also be embossed coarsely.

As shown in FIG. 3, one end of the pressure-resistant hose 64 is connected to the port 98 and its other end is connected to the valve 62. For this reason, the air discharged from the port 98 is discharged actually from the valve 62 by passing though the pressure-resistant hose 64.

In order to prevent the pressurized fluid from leaking out of the parting 26 while the resin in the cavity 200 is being pressurized by the pressurized fluid, a seal (sealing component) 40 is provided in the parting 26. The seal 40 is embedded in a dovetail groove formed on the parting 26 in the mold plate 78 of the stationary side mold 205. For this reason, the seal 40 does not come off from the parting 26 even when the movable mold 206 is made to touch or separate from the stationary side mold 205.

The above descriptions have presented the configuration in which a means for venting gas is provided in the parting 26 of the stationary side mold 205, but the solution is not limited to this. The aforementioned means for venting gas can also be the one that has been provided in the parting 26 of the movable side mold 206 or in the parting of the slide core on either the stationary side or the movable side.

(Means for Venting Gas in Nested Element)

Figure 24:
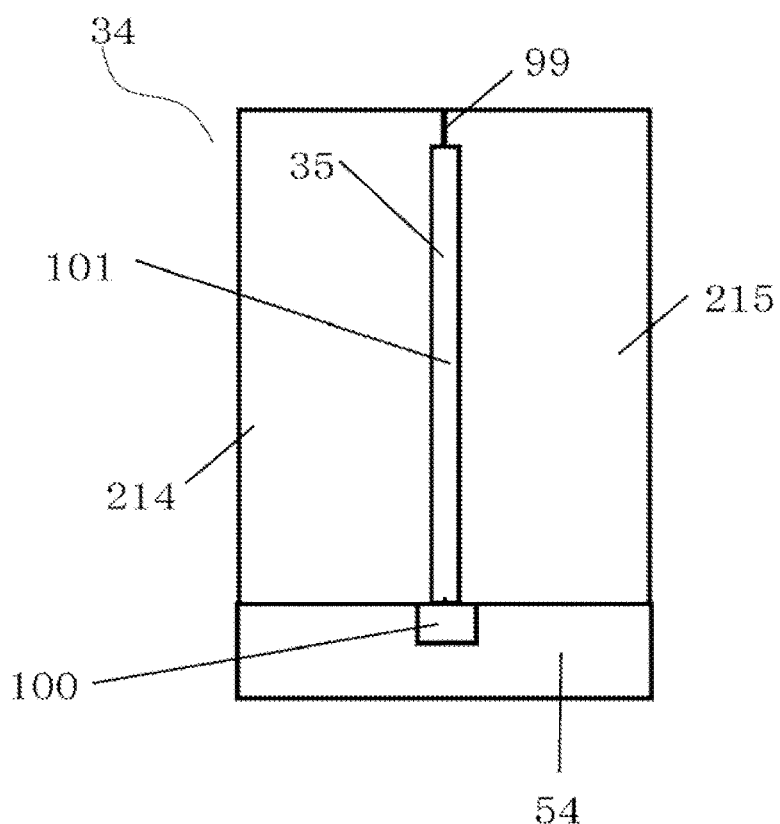
FIG. 24 is a schematic diagram representing gas venting and the like in the matching surface of a nested element.
Figure 25:
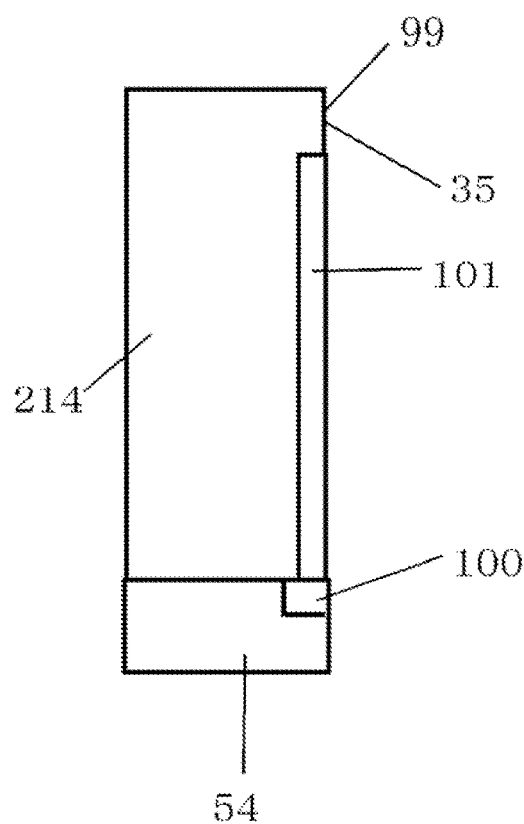
FIG. 25 is a schematic diagram of the lateral side of a nested element representing the form of gas venting and the like in the matching surface of the nested element.
Figure 26:
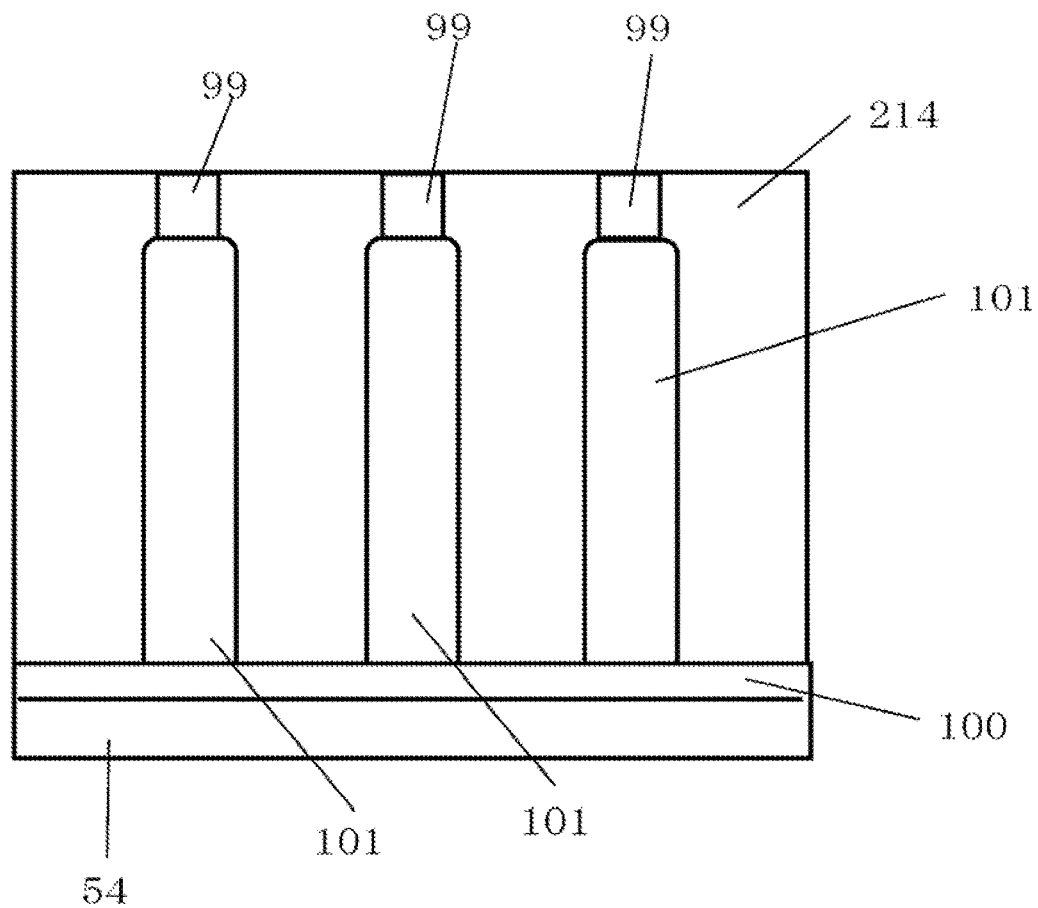
FIG. 26 is a schematic diagram of the front face of a nested element representing the form of gas venting and the like in the matching surface of the nested element.

A means for venting gas is provide in the nested element for preventing the occurrences of short-mold or discoloration and burn of the molded article. FIGS. 24-26 are referred to for describing a nested element 34 having a means for venting gas to draw off gas from the clearance 35.

FIG. 24 is a schematic diagram of the nested element 34. FIG. 25 is a schematic diagram of the view of nested element 214 and upper seal plate 54 shown in FIG. 24, when they are cut along the matching plane between nested element 214 and nested element 215. In other words, FIG. 25 is a view of simple vertical division in the middle of FIG. 24. FIG. 26 is a schematic diagram of nested element 34 and upper seal plate 54 divided as illustrated in FIG. 25, when they are looked at from the left of the page of FIG. 25 toward the right of it.

The nested element 34, as shown FIG. 3 and FIG. 24, is mounted on the upper seal plate 54 of the movable side mold 206. The nested element 34, as shown in FIG. 24, is formed by matching the nested element 214 and the nested element 215. In the nested element 34, a gas vent 99 as a means for venting gas is formed. The gas vent 99 is connected to a groove 101 formed in the nested element 34. The groove 101 is connected to the hole 63 as an exhaust passageway.

The shape of gas vent 99 can be modified according to the size of nested element 34 and is configured so as to allow the air in the cavity 200 to pass but make it difficult for the resin in it to pass. For example, the gas vent 99 used for ABS resins is configured to be 5 mm or more but 10 mm or less in width, around 5 mm in length, and 0.01 mm or more but 0.2 mm or less in depth.

The means for venting gas in the nested element 34 shown in FIGS. 24-26 can serve also as a passageway of exhaust air when the air in the cavity 200 is aspirated by vacuum.

Furthermore, when a resin in the cavity 200 is pressurized by fluidic pressure by using injection means 61 and injection means 115 shown in FIG. 2 and FIG. 3, the pressurized fluid is injected into the cavity 200 by passing through the matching part between nested element 214 and nested element 215 in the nested element 34, the groove 101 provided in the clearance 35 of nested element 34, and the gas vent 99.

(Structure of Ejector Pin)

If the application is limited to the case of sealed mold 141 having the ejector box 51 shown in FIG. 2, the ejector pin 27 can be used as a gas vent 99. In this case, if needed, a D-shaped surface is created on a part of the main body or the flanged part 117 of the inner core 71 of ejector pin 27 (see FIG. 5) to make an air exhaust circuit. However, in the sealed mold 142 shown in FIG. 3, as the ejector pin is sealed by a seal ring 89, the aforementioned D-shaped surface or the like is not created.

(Molded Article)

The effect of fluid pressurization can further be enhanced by reducing the cooling speed of the surface of resin filled in the cavity 200. The cooling speed of the resin surface can be reduced by forming coarse pear skin embossments on the cavity surface. If embossments are formed on the cavity surface, an air layer is formed at the bottom of embossment (summit of embossment in the molded article). As this air layer serves as a heat insulation layer, the cooling and solidification is slowed down in the case of thermoplastic resin and the like.

In order to enhance the pressurization effect of the fluid pressurization, as a means to lower the viscosity of molten resin or to slow down the cooling speed of resin surface, we can adopt various solutions including: raising the mold surface temperature; raising the temperature of molten resin; forming cutter marks on or embossing the cavity surface that molds surfaces of molded article other than decorative surfaces (surfaces exposed to human eyes); or plating the cavity surface with a ceramic coating material including:

DLC (diamond-like coating), TiN (titanium nitride), CrN (chromium nitride), WC (tungsten carbide), etc.

As a means to lower the viscosity of molten resin, in addition to setting of resin temperature at a relatively higher level, the measures enabling to enhance the fluidity of molten resin include: blending of a low molecular resin with the same molecular structure; and adding to (injecting into) the molten resin in the heating cylinder a gas or a liquid like liquefied carbon dioxide, butane, pentane, a low boiling point alcohol represented by methanol, ethanol and propanol, and an ether represented by diethyl ether, methyl propyl ether and butyl propyl ether.

The aforementioned injection of carbon dioxide, ether or alcohol is carried out at the stage of plasticization or during the metering process.

By raising the mold surface temperature, the cooling and solidification of molten resin filled into the cavity can be slowed down. The means to raise the mold surface temperature includes: method using a temperature regulator; method using the superheated steam; method by irradiating the mold surface with halogen lamp; method by irradiating it with a high-frequency wave, etc. The effect will be higher, if the mold surface temperature is higher than the glass transition point (Tg) of the resin at the stage of filling the cavity with resin.

Figure 29:
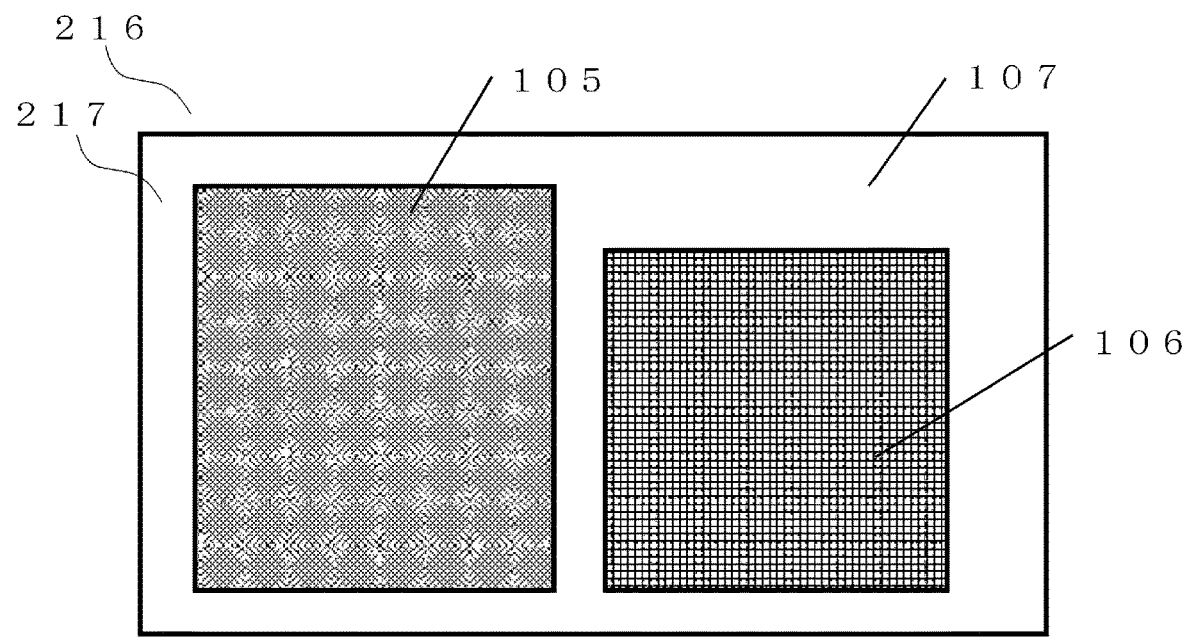
FIG. 29 is a schematic diagram representing that the pressurized fluid acts easily on an embossed portion.

FIG. 29 is a schematic diagram to present an example of molded article 216 manufactured by the sealed mold 142. More specifically, FIG. 29 shows the surface 217 of the molded article 216 pressurized by fluidic pressure. The surface 217 can be molded, for example, if the cavity surface of movable side mold 206 is embossed and coated with a ceramic material, and the pressurized fluid is injected into the clearance between the resin and the cavity surface of the stationary side mold 205.

The embossed part 105 in the surface 217 is a part which was transcribed from the part embossed on the cavity surface of the movable side mold 206. The part 106 in the surface 217 is a part which was transcribed from the part coated with a ceramic film on the cavity surface of the movable side mold 206. Incidentally, the glossy part 107 of the surface 217 is a glossy surface transcribed from the cavity surface that was neither embossed nor coated with a ceramic film. As the glossy part 107 presents a high adhesiveness between the cavity and the thermoplastic resin, it is effective for reducing the leakage of pressurized fluid to the outside.

(Nozzle for Injection Molding Unit)

Although the present invention can be embodied also with an open nozzle, as there is a risk of intrusion of high pressure fluid into the heating cylinder, a ball-check nozzle or the shut-off nozzle which is operated by hydraulic, pneumatic or electrical action is used.

The optimum plate thickness of molded article for embodiment of the present invention is 4 mm or less. In certain molded articles, there is a likelihood that a blow molding results, due to the entry of pressurized fluid into the resin in the cavity 200 during the process of introducing the pressurized fluid into clearances between the resin injected into cavity 200 and the stationary side parting or the movable side parting. In such a case, the problem can be solved by delaying the timing of injection of pressurized fluid into the cavity 200. It is because the breakage of skin layer of molded article by pressurized fluid becomes less easy if it is injected after the cooling and solidification of the resin surface has advanced and a thick skin layer is formed.

(Products of Application)

The present invention is preferably be applied in manufacturing the molded articles requiring good transcription performance including office automation equipment, home electrical appliances, vehicle components, building materials, game equipment, miscellaneous goods and the like. As a molded article, one can cite a chassis, a case, an interior part, etc. The present invention can be applied also to the molding of an optical mirror used in office automation equipment like printer, digital copier etc., or molding of a headlamp reflector for vehicles, etc.

(GCP)

The sealed mold 142 can also be used as one that is used for the gas-counter-pressure (GCP) process as a means for obtaining the surface smoothness in expansion molding, if the operation of control valves is organized appropriately, for example, by opening the valves 62, 67, 68, etc. to blow out the pressurized air in the cavity, in conjunction with the filling of resin.

FIGS. 1-60 are schematic diagrams used for describing the contents of the present invention. The parts that should essentially be represented by broken lines are indicated by solid lines to make it easy to describe them and to make drawings more comprehensible.

(Resin to be Used)

The types of resin that can be used in the present invention are listed in the database on properties in the Handbook of commercial trade of plastic molding materials (Ver. 1999, Ver. 2012) published by The Chemical Daily Co., Ltd.

The present invention can be applied to any type of thermoplastic resin as long as it is used for molding.

As thermoplastic resins with which the invention can be embodied, we can cite, for examples: polystyrene-based resin produced by polymerizing styrene-based monomers, for example, polystyrene (PS), high impact (impact-resistant) polystyrene (HIPS); styrene-derived resin which is a copolymer of nitrile-based monomer/styrene-based monomer, e.g., copolymer of acrylonitrile-styrene (AS); resin comprising nitrile-based monomer/styrene-based monomer/butadiene-based rubber, e.g., acrylonitrile butadiene styrene copolymer (ABS); styrene-based rubbers including AES having converted butadiene-based rubber into olefin-based rubber, ASA (AAS) having converted butadiene-based rubber into acryl-based rubber; polyolefin-based resins represented by polyethylene (PE), polypropylene (PP); polyphenylene ether (PPE), polyphenylene ether with denatured styrene (m-PPE); engineering plastics including, polycarbonate (PC), polyamide (PA), polysulfone (PSF), polyetherimide (PEI), polymethyl methacrylate (PMMA); polyester resins including polyethylene terephthalate (PET), polybutylene terephthalate (PBT); vinyl-based resins of polyvinyl chloride (PVC); and polyoxymethylene (POM).

Two or more types of thermoplastic resins can also be mixed to concoct a polymer alloy or a polymer blend. Similarly, two or more types of thermoplastic elastomers also can be mixed to concoct a polymer alloy or a polymer blend. Moreover, two or more types of thermoplastic resins and thermoplastic elastomers can also be mixed to concoct a polymer alloy or a polymer blend. A polymer alloy or a polymer blend is concocted, for example, through the kneading by the screw in an extruder, etc.

As resins applicable to the present invention, thermosetting resins are also available. Thermosetting resins include, for example: urea resin, melamine, phenol, polyester (unsaturated polyester) and epoxy, etc.

As elastomers, there are two types of them, i.e., the thermosetting type of elastomers (TSE) including urethane-rubber-based elastomer, fluorine-contained rubber-based elastomer, and silicon-rubber-based elastomer, etc., and the thermoplastic type of elastomers (TPE) including styrene-based elastomer, olefin-based elastomer, polyvinyl chloride-based elastomer, urethane-based elastomer and amide-based elastomer, etc.

As rubbers we can cite: natural rubber; diene rubbers including SBR, IR, BR, CR and NBR; and non-diene rubbers including silicon rubber, butyl rubber, EPM, EPDM, urethane rubber, acrylic rubber, fluorine-contained rubber, polysulfide rubber, epichlorohydrin rubber, chlorosulfonated polyethylene rubber, bril rubber, etc. These rubbers form crosslinking when they are heated after filling the mold cavity.

For the resins to which the present invention is applied, as long as the concerned product does not adversely affect the function of the system, the compounding chemicals described in the "Handbook of compounding chemicals for rubbers and plastics" published by Rubber Digest Co., Ltd. in March 1989 [newest edition], December 2003 [2nd revised edition] can be used.

Additives to be used include, for example: colorant, dye, reinforcing agent (glass fiber, carbon fiber, carbon nanotube), bulking agent (carbon black, silica, titanium oxide, talc), heat-resisting agent, anti-aging agent, oxidation-degradation inhibitor, antiozonant, antiweathering (light resistant) agent (ultraviolet absorber, light stabilizer), plasticizer, auxiliary foaming agent, foam-nucleating agent, lubricant, friction reducer, internal mold release agent, mold release agent, antifog additive, crystal nucleating agent, flame retardant, auxiliary flame retardant, flow modifier, antistatic agent, compatibilizing agent, etc.

It is also possible to obtain the molded article with a higher transcription performance by combining the present invention with other means for raising the mold temperature to improve the transcription performance, including for example, Heat and Cool, BSM (bright surface mold), etc. which improve the transcription performance by raising the mold temperature by means of superheated steam.

It is also possible to embody the invention in the expansion molding in combination with other techniques including MuCell, AMOTEC, UCC, etc.

The means of compression in the present invention can be utilized also as a means of enlargement (expansion) of the cavity in the expansion molding represented by "Core-Back", "Recess (Recession)", etc.

The present invention is able to improve further the transcription performance in the molding transcription process in which a film is incorporated in the mold and transcribed by the injection pressure, if the invention is applied in combination with the process represented, for example, by the In-mold Molding Transcription system supplied by Navitas Inmolding Solutions Co., Ltd.

The present invention can be applied also in combination with a blow molding process.

Working Example 1

Next, the present invention is described based on working examples.

The resins used in the working example 1 are as follows: STYLAC 121 (trade name) of Asahi Kasei Corp. as an ABS resin for injection molding; STYLON 492 (trade name) of Asahi Kasei Corp. as an HIPS resin; XYLON 100Z (trade name) of Asahi Kasei Corp. as an m-PPE resin; MULTILON T3714 (trade name) of Teijin Chemicals Ltd. as a PC/ABS resin; IUPILON S2000 (trade name) of Mitsubishi Engineering-Plastics Corp. as a PC resin; SUMITOMO NOBLEN H501 (trade name) of Sumitomo Chemical Co., Ltd. as a PP resin. Regarding POM, DURACON M90 (trade name) of Polyplastics Co., Ltd. was used. Regarding PA66 (nylon 66), Leona 1200S of Asahi Kasei Corp. was used.

As test pieces used for verifying the action and the effect of pressurized fluid, molded article 1 and molded article 2 were obtained by totally pressurizing by fluid the resin in the movable side mold 206, and the sink marks generated on the decorative surface of product surface of the stationary side were examined.

Figure 30:
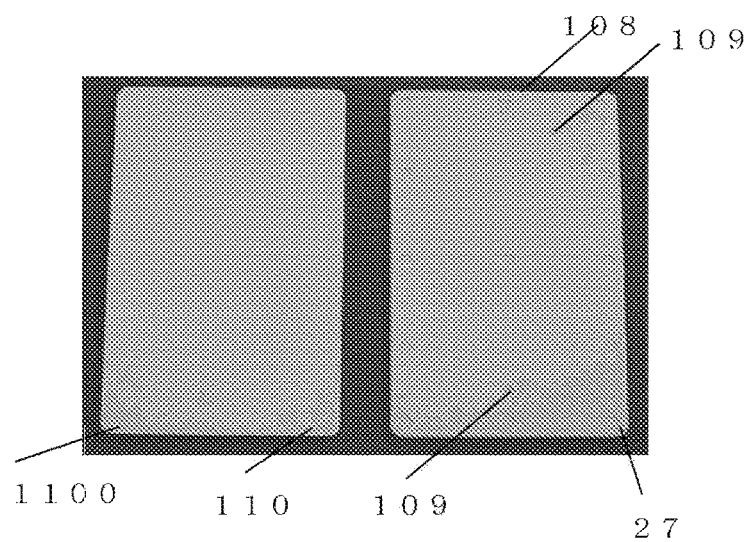
FIG. 30 is a test piece used in an embodiment wherein the entire part on the movable side is pressurized by fluidic pressure.

The molded article 1 (test piece in FIG. 30) is a flat plate in which the presence of sink marks at the flow end of resin was compared with the case without pressurization by fluid.

Figure 31:
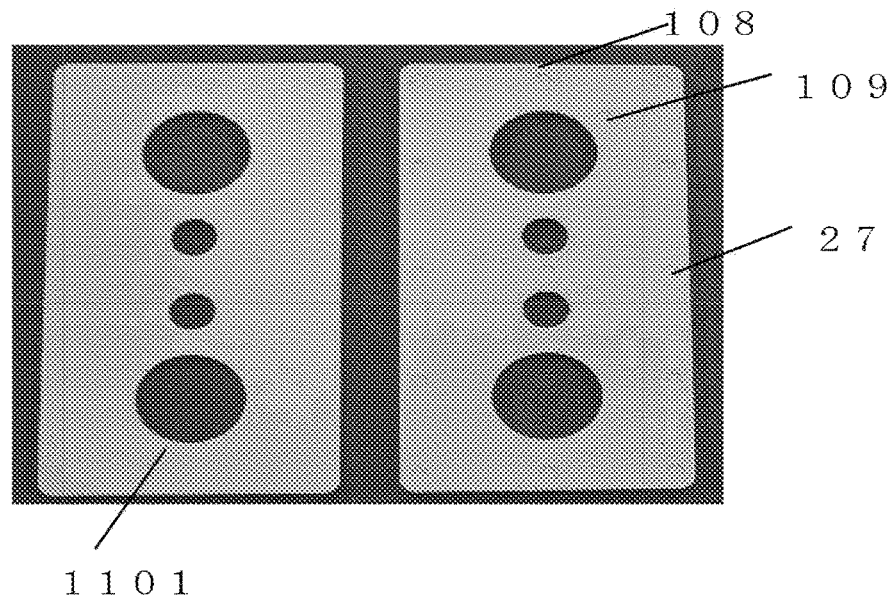
FIG. 31 is a test piece used in an embodiment wherein the entire part on the movable side is pressurized by fluidic pressure.

The molded article 2 (test piece in FIG. 31) is a flat plate in which the presence of sink marks around the circle in the center was compared with the case without pressurization by fluid.

The molded article 3 (test piece in FIG. 32) is a flat plate in which the presence of sink marks caused by the ribs on the stationary side resulting from the partial pressurization was examined by comparison with the case without pressurization by fluid.

Incidentally, in this working example, in order to clarify the effect of fluid pressurization, the molding process was carried out with the same metering value for molded article 1, molded article 2 and molded article 3 (by equalizing the test piece (molded article) weight), to examine the occurrences of sink marks in comparison with the case without fluid pressurization.

In this working example, the resin pressure keeping is not used.

The action and the effect of pressurized fluid were examined by adopting as a factor of evaluation: the presence of occurrences of sink marks at the flow end corner 1100 in molded article 1; that of sink marks around the circular opening 1101 in molded article 2; and that of sink marks caused by the rib at the opposite side 1102 of the rib.

For the pressurized fluid, nitrogen gas and air as a gas, water as a liquid were used.

Pressure, pressurization time, retention time, liquid temperature in the case of liquid, etc. of the pressurized fluid were indicated in Table 1, Table 2, Table 3 and Table 4 for working examples.

As clearly shown in these working examples, the action and the effect of the use of pressurized fluid were confirmed for improving the transcription performance and for reducing the occurrences of sink marks.

The mold devices used in working examples are sealed mold 141 shown in FIG. 2 and the sealed mold 142 shown in FIG. 3.

In the sealed mold 141 shown in FIG. 2, valve 62 and valve 67 were kept open while filling the cavity with a resin.

In the sealed mold 142 with the structure shown in FIG. 3 also, valve 62, valve 67 and valve 68 were similarly kept open to let out the air in the mold expelled while filling it with a resin.

In respective molds 141 and 142, these valves were closed before pressurizing by fluid to prevent the pressurized fluid from escaping to the outside.

In the sealed mold 141 having an ejector box 51, as it is difficult to use as a pressurized fluid a liquid like water, only nitrogen gas or air was used. The fluid pressurization was carried out by introducing the pressurized fluid from injection means 56 and injection means 58. In the sealed mold 142 in FIG. 3, the fluid pressurization was carried out by using injection means 58 and injection means 115 and using nitrogen gas, air or water as a pressurized fluid.

When nitrogen gas or air was used as a gas, the operation was carried out without any problem. However, when water was used as a liquid, while it was possible to carry out the fluid pressurization, the water as a pressurized fluid entered into clearances in the nested element, clearances in the ejector pin, and clearances between plate 53 and plate 54.

As an injection molding machine, a unit of injection machine having a clamping capacity of 70 ton manufactured by Meiki Co., LTD. was employed. Respective conditions in the molding processes for molded article 1, molded article 2 and molded article 3 were as follows: in the circuit from spool runner to gate, filling pressure was set at 35% of the maximum injection pressure, and filling speed was set at 35% of the maximum injection speed; and for the circuit after the resin passed the gate, filling pressure was set at 65% of the maximum injection pressure, and filling speed was set at 65% of the maximum injection speed. The conditions of time, pressure, etc. for the fluid pressurization were indicated in Table 1.

In the working example 1, the fluid pressurization was carried out by using the ejector pins shown in FIGS. 4-6 in the manner described in FIGS. 11-13, and by using the ejector pins shown in FIG. 14 and FIG. 15 in the manner described in FIG. 16, and it was demonstrated that with each of the fluids used, the fluid pressurization was possible.

Working Example 2

In the preceding working example 1, in a process of fluid pressurization with the sealed mold 142 in FIG. 3 by using ethanol, instead of water, from the injection means 58, ethanol was injected into the mold and vaporized due to the resin temperature, and as a result of this, it was confirmed that it was possible to shorten the cooling time of molded article.

In the working example 2, the ejector pins shown in FIGS. 4-6 were used and installed in the mold as shown in FIG. 13.

Working Example 3

In the working example 1, in a process of fluid pressurization with the sealed mold 142 in FIG. 3 by using glycerin heated to a temperature of 180° C., instead of water, from the injection means 58, the cooling and solidification was retarded but it was confirmed that the transcription performance improved.

In working example 2 and working example 3, the measures were taken in which the tank 10 in FIG. 1 is filled beforehand with a liquid like water to about a half of its capacity and pressurized by nitrogen gas to extract the liquid from the bottom and to carry out the pressurization.

Working Example 4

While in the working example 3 the liquid temperature was raised to improve the transcription performance, in the working example 4 the improvement of transcription performance was achieved by raising the temperature of molten resin to delay the cooling and solidification.

When nitrogen gas was used as a pressurized fluid and the pressurization was carried out by setting the melting temperature of ABS resin in the working example 1 at 285° C. and with the conditions of the working example 1, an improvement in transcription conforming to the mold was confirmed in comparison with the case of working example 1.

Working Example 5

Figure 37:
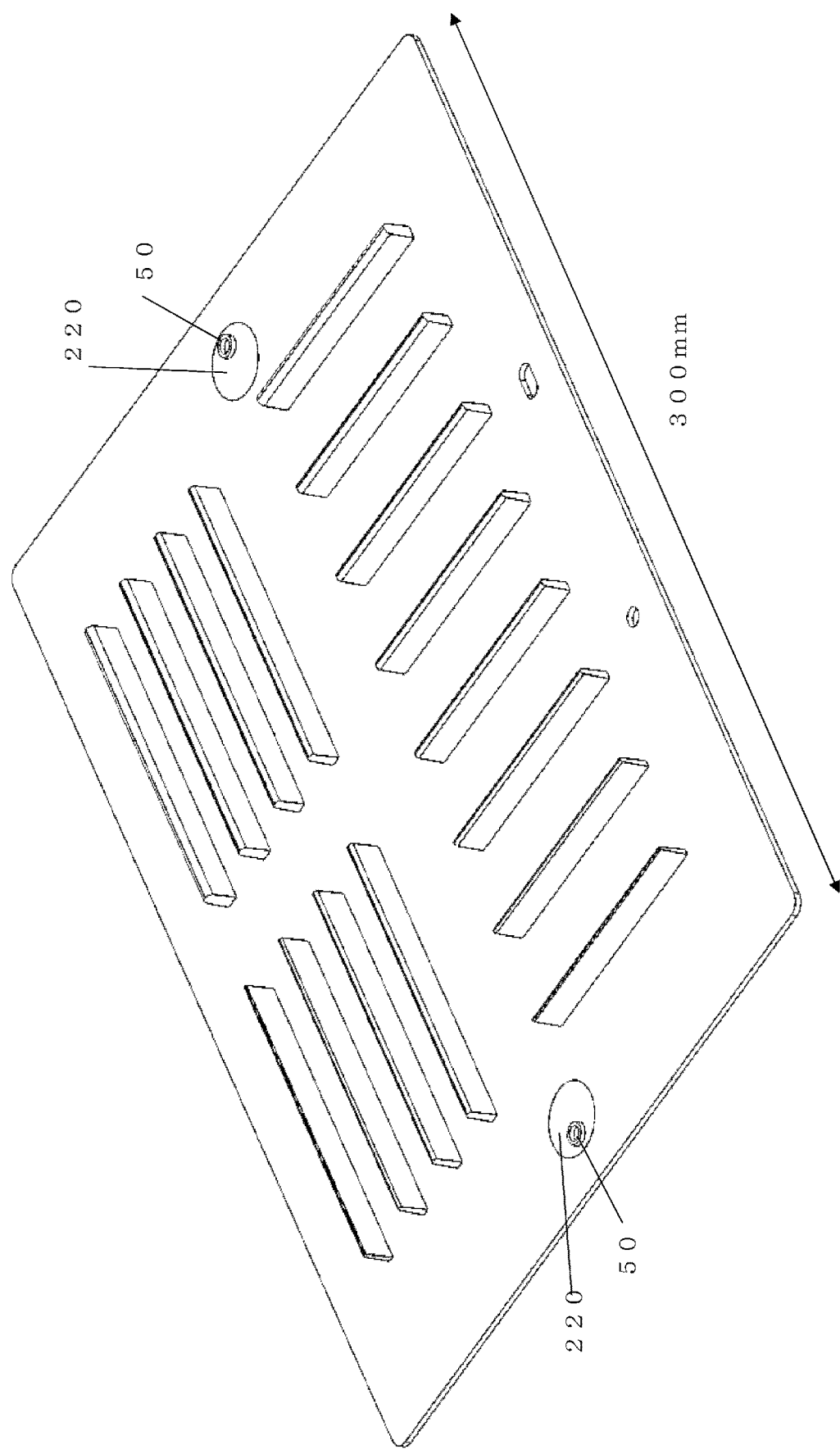
FIG. 37 is an oblique perspective view of the movable side of FIG. 36.
Figure 38:
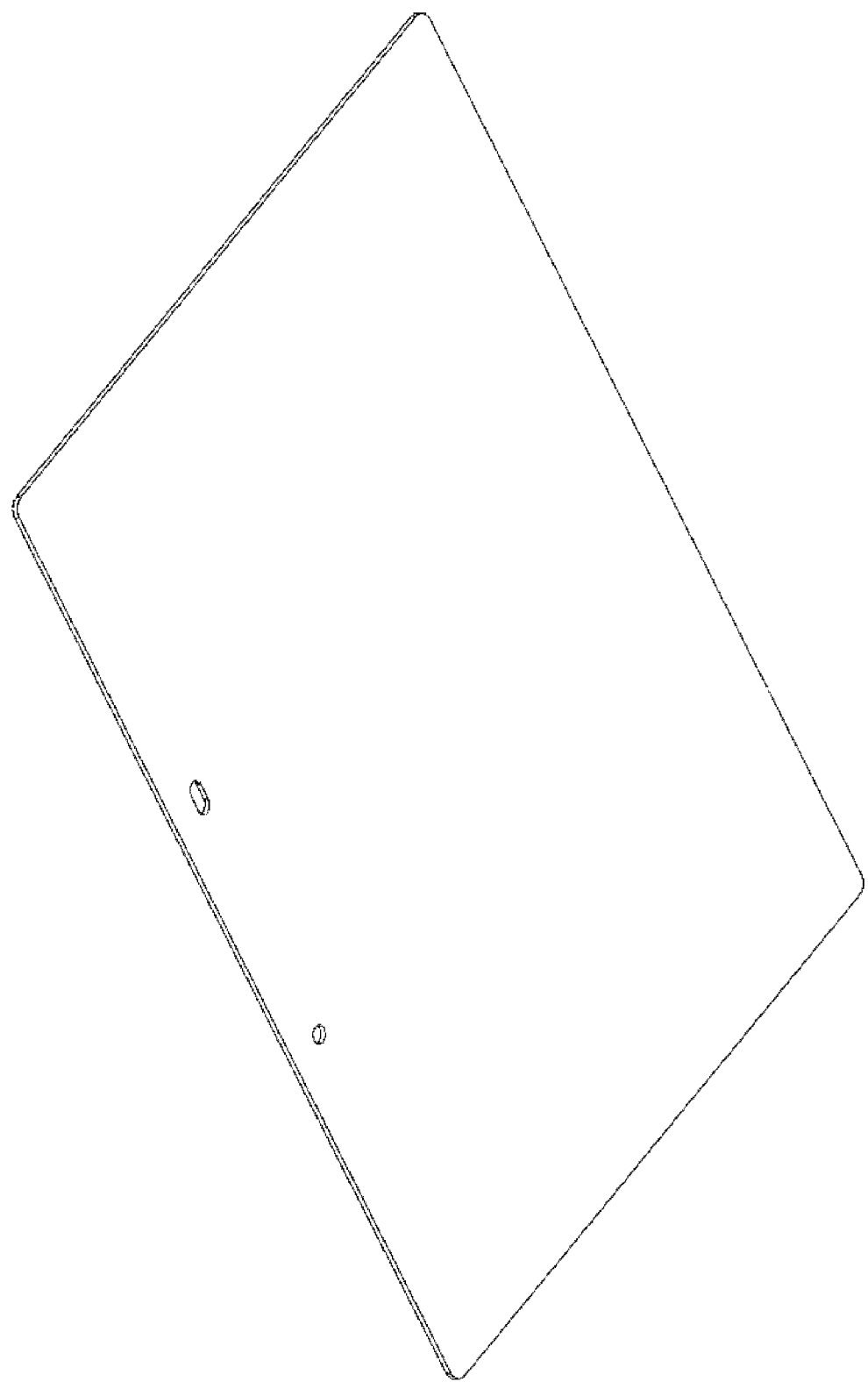
FIG. 38 is an oblique perspective view of the stationary side of FIG. 36.

In the working example 1, the mold was changed to the one for the molded article 4 [(test piece shown in FIGS. 36-38), thickness of 2.5 mm, size of A4]. The fluid pressurization by pressurized nitrogen gas was carried out while injecting the resin, with the conditions as follows: pressure of pressurization by fluid, 10 MPa, 20 MPa, 30 MPa; pressurization duration, 20 seconds; retention time, 5 seconds.

The resins used were all the resins used in the working example 1, and even with a rib of 4 mm on a base thickness of 2.5 mm, no sink mark was observed, and the molded article with a clean appearance on the stationary side was obtained.

The injection molding machine used was a unit manufactured by Toshiba Machine Co., Ltd. with 350 ton rating.

The pressurization pins were provided at two points as shown in FIG. 36 etc. The respective cases where a single pin was or two pins were provided were carried out, and it was confirmed that when two pins were used, the transcription performance was improved in comparison with the case of a single pin. In the working example 5, the direct pressurization was adopted.

Working Example 6

Figure 39:
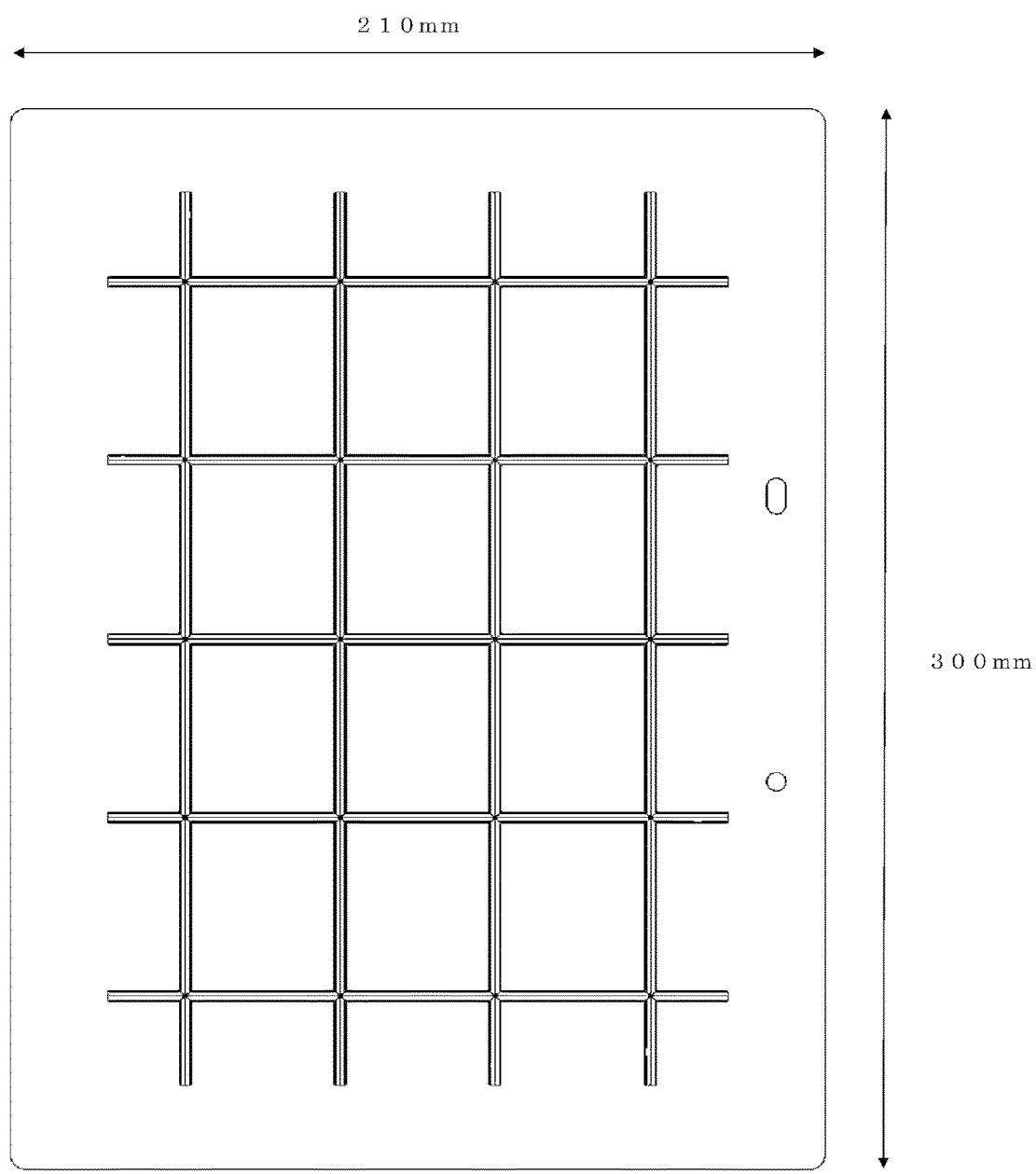
FIG. 39 is a schematic diagram of a molded article with which the action and the effect of pressurized fluid was verified by injecting the fluid through ejector pins.
Figure 40:
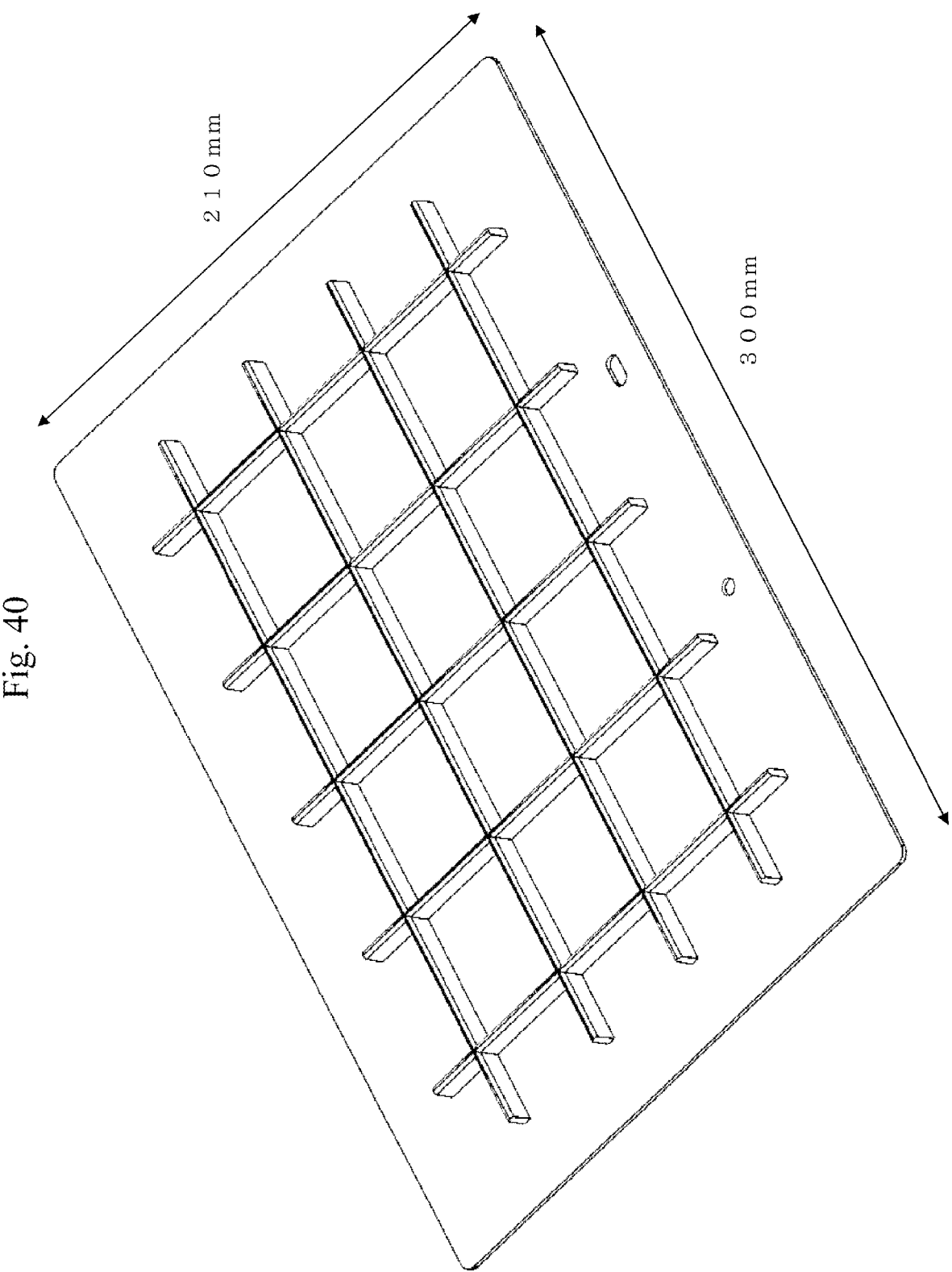
FIG. 40 is an oblique perspective view of the movable side of FIG. 39.
Figure 41:
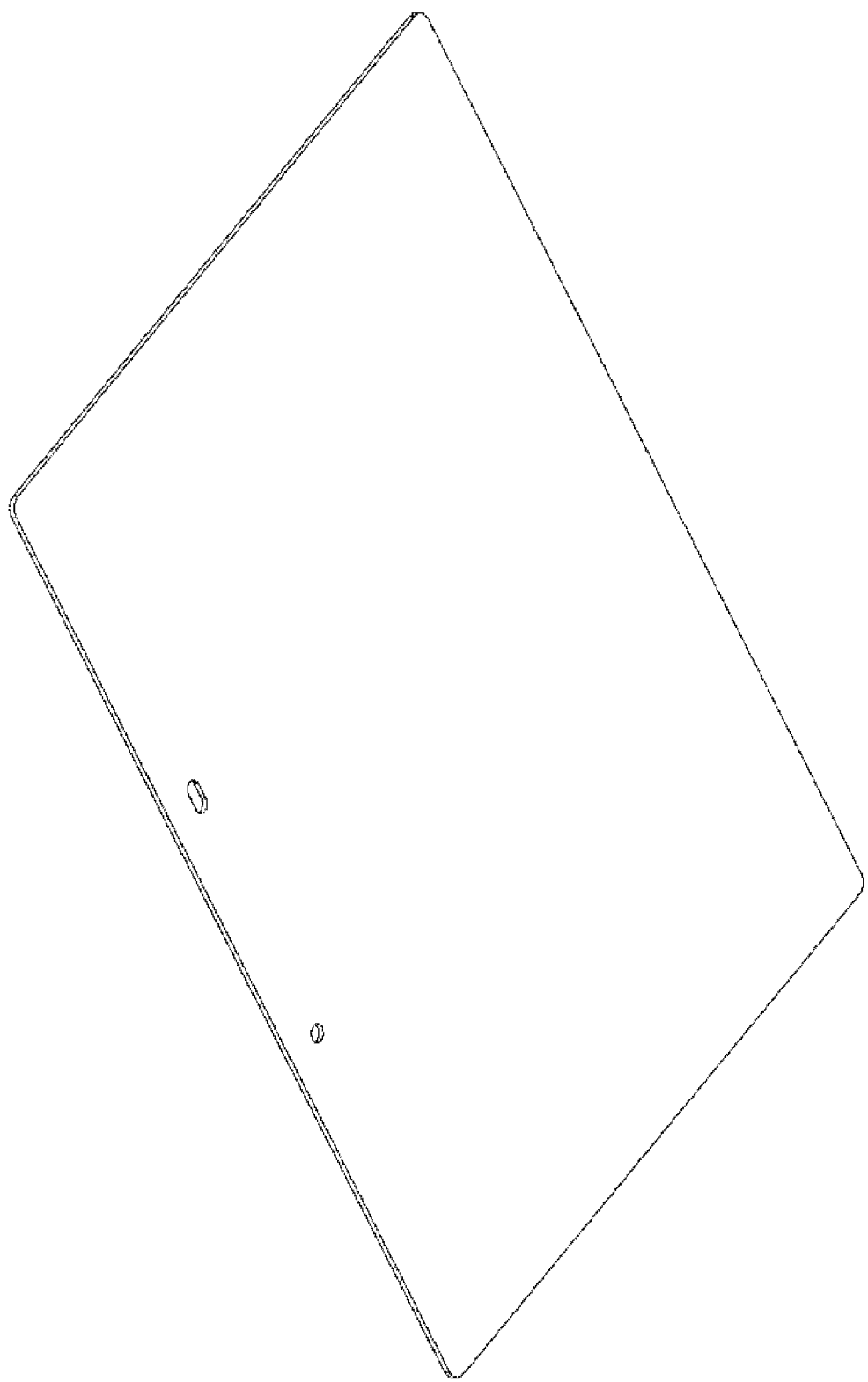
FIG. 41 is an oblique perspective view of the stationary side of FIG. 39.
Figure 42:
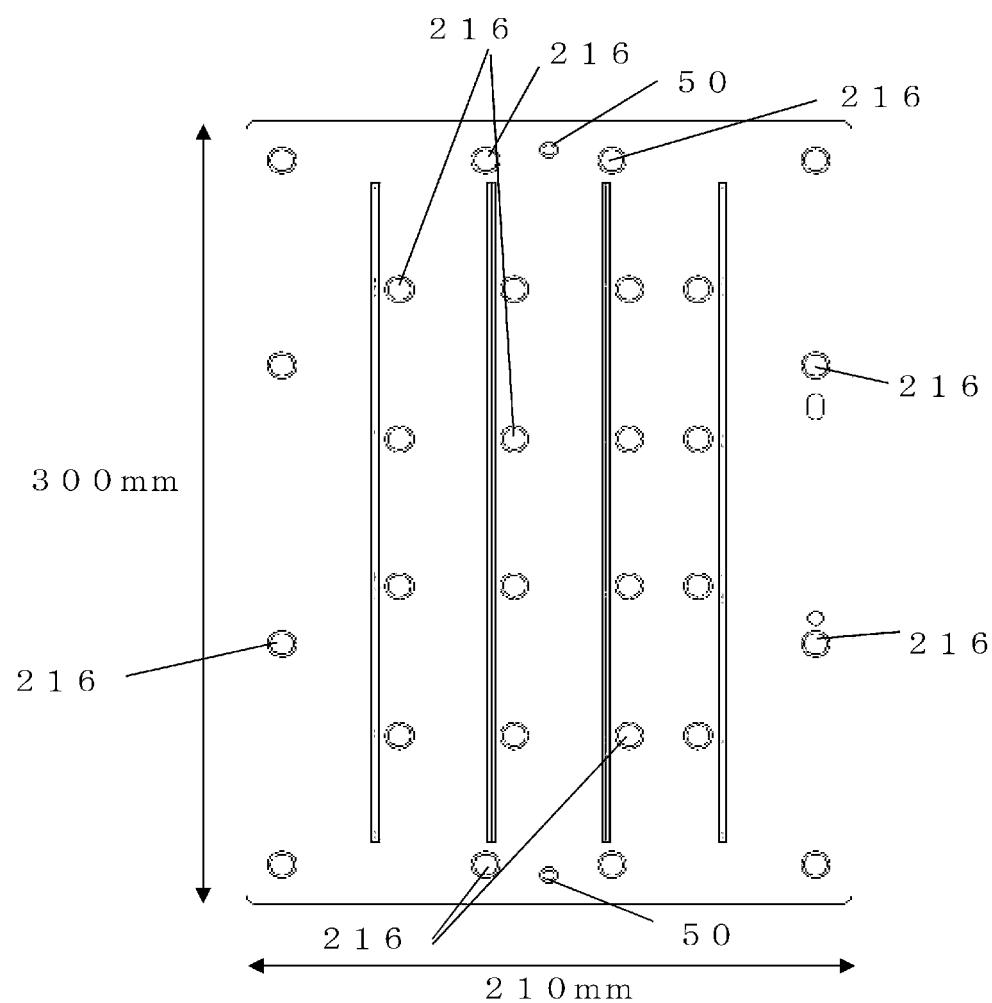
FIG. 42 is a schematic diagram of a molded article in which the gas leakage from ejector pins was prevented by providing gas rib 218 around ejector pins.
Figure 43:
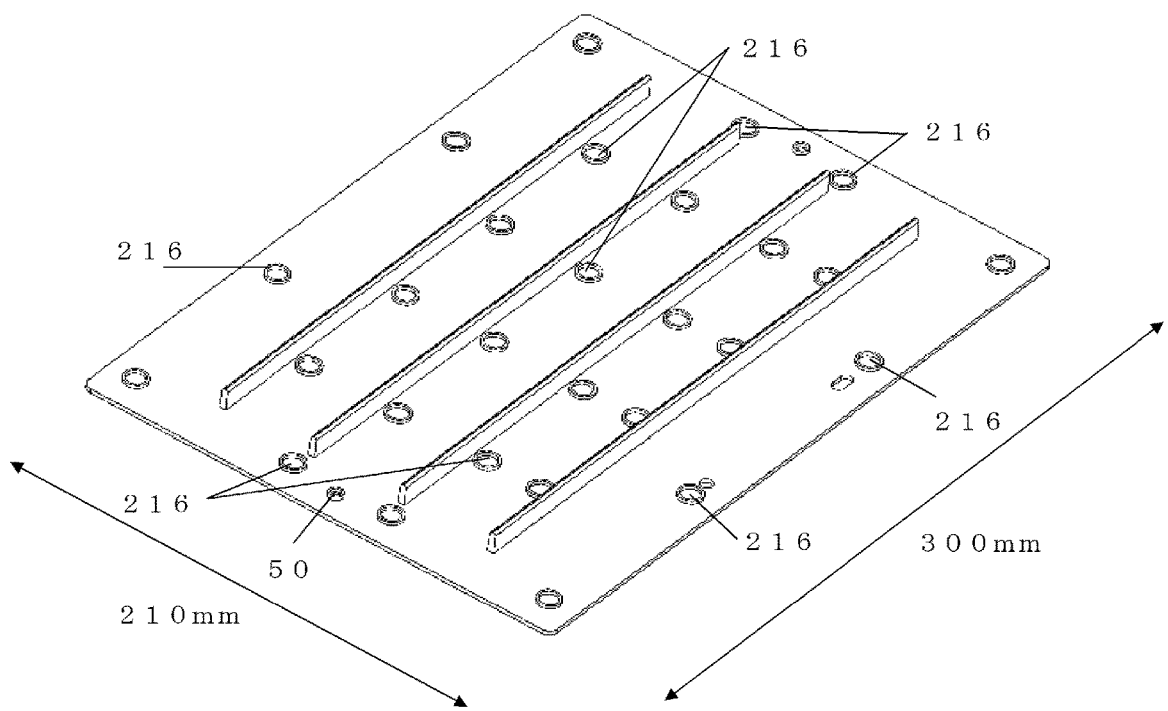
FIG. 43 is an oblique perspective view of the movable side of FIG. 42.
Figure 44:
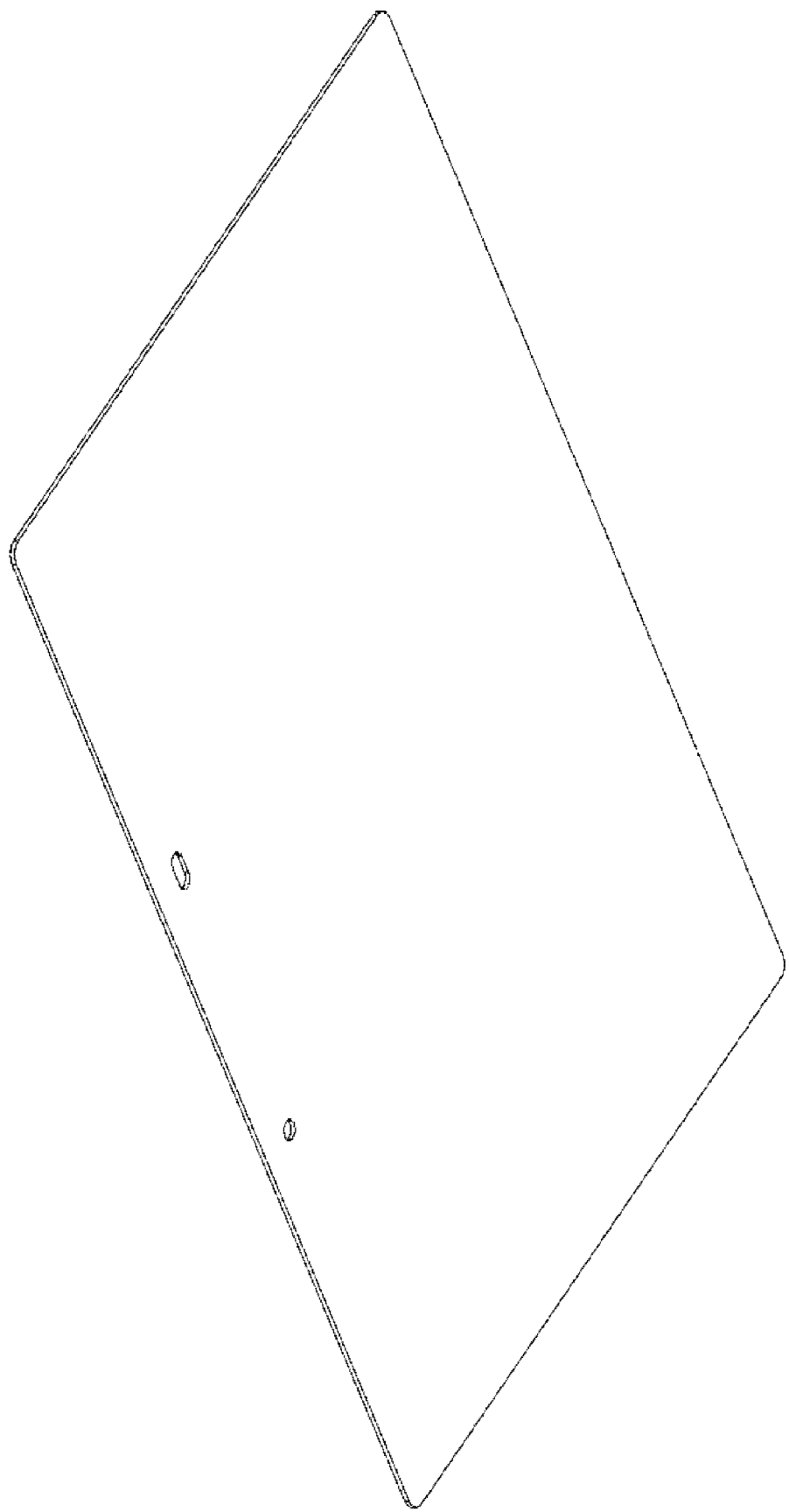
FIG. 44 is an oblique perspective view of the stationary side of FIG. 42.
Figure 45:
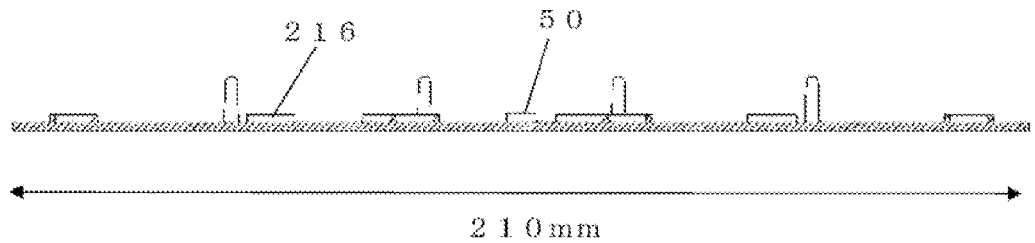
FIG. 45 is a cross-sectional diagram of FIG. 42.

In the working example 5, the mold was changed to the one for the molded article 5 [(test piece shown in FIGS. 39-41), thickness of 2.5 mm, size of A4], and the fluid pressurization was carried out by introducing the pressurized fluid through the connecting port 48 on the right of illustration shown in FIG. 18, and the clearances of nested element and the clearances of ejector pin.

In the like case where there are many ribs and an article is surrounded by ribs, as it is needed to provide a pressurization pin to each of shapes surrounded by ribs, the system is not economical. The working example 6 has adopted the indirect pressurization in which the fluid pressurization was carried out through the clearances of ejector pins. Although not illustrated, more than one ejector pins are arranged in the area surrounded by ribs.

The fluid pressurization was carried out by using nitrogen gas at a pressure of 30 MPa for 20 seconds simultaneously with filling the cavity with a resin.

The resins used were all the resins used in the working example 1, and with a base thickness of 2.5 mm, no sink mark due to ribs was observed, and the molded article with a clean appearance on the stationary side was obtained.

Working Example 7

In the working example 5, the mold was changed to the one for the molded article 6 [(test piece shown in FIGS. 42-45), thickness of 2.5 mm, size of A4], and the gas rib 218 was provided around the ejector pin to prevent the gas leakage from the ejector pin. The fluid pressurization was carried out by using nitrogen gas at a pressure of 30 MPa for 20 seconds simultaneously with filling the cavity with a resin.

The resins used were all the resins used in the working example 1, and with a base thickness of 2.5 mm, no sink mark due to ribs was observed, and the molded article with a clean appearance on the stationary side was obtained. In the working example 7, the direct pressurization was adopted.

Working Example 8

With the mold of the working example 6 and by the methods shown in FIGS. 52-55 (means of fluid pressurization from the pin 227), the fluid pressurization was carried out by using nitrogen gas at a pressure of 30 MPa for 20 seconds simultaneously with the completion of resin injection, followed by a subsequent retention time for 10 seconds and then the final discharge of pressurized fluid into the atmosphere.

The obtained molded article presented a clean appearance without any recognizable sink mark. The resins used in the process are indicated in Table 5 summarizing the results of the working example 8. The mold surface temperature, although not indicated in Table 5, was set at 60° C. for both stationary and movable sides.

In order to supply the pressurized fluid to the pin 227, the means illustrated in FIG. 60 was used.

Working Example 9

With the mold of the working example 6 and by the means shown in FIGS. 58A-58C, the fluid pressurization was carried out by using nitrogen gas as a pressurized fluid, through the pins 227 separately by the means shown in FIGS. 58A-58C, with a pressure set at 30 MPa, 20 MPa and 10 MPa, with each pressure through a separate circuit. No sink mark on a flat surface of stationary side of the molded article was recognized at the point where the pressure was high and 30 MPa, but at the point where the pressure was low and 10 MPa, sink marks caused by the presence of ribs were observed.

Working Example 10

When the fluid pressurization was carried out by using the means shown in FIGS. 59A-59E and by following the preceding working example 9 with a pressure set at 30 MPa, 20 MPa and 10 MPa, the results showed the same state of sink marks on a flat surface of stationary side of the molded article as that observed in the working example 9.

The evaluation methods presented in Tables 1-5 are described. Visual verification was made about the presence of sink marks on the flat plate on the stationary side. Evaluation criteria are as follows: in comparison with the injection molded solid article, "⊙" stands for a level where no sink mark at all is recognizable; "0" stands for a level where a few sink marks are recognized but permissible for a practical purpose; "A" stands for a level where sink marks are recognizable but in comparison with a molded article without fluid pressurization, an improvement has been made with respect to the presence of sink marks; "x" stands for a level where there is little difference in comparison with the injection molded solid article with respect to the presence of sink marks.

Incidentally, regarding the injection molded solid article with which a comparison was made in the working examples 1-8, each of the examined resins was processed with the same molding conditions, without using any resin pressure keeping at all, by lowering the metering volume as low as the limit where a short-mold starts to occur, and consequently big sink marks occur on the flat plate on the stationary side. The weight of a molded article by fluid pressurization and that of an injection molded solid article were equalized.

TABLE 1

| | Resin | | | |
|---|---|---|---|---|
| | ABS | HIPS | PC/ABS | PC |
| Product name | STYLAC 121 | STYLON 492 | MULTILON T3714 | IUPILON S2000 |
| Temperature of molten resin | 240° C. | 240° C. | 265° C. | 290° C. |
| Type of pressurized fluid | Nitrogen gas | | | |
| Pressurization pressure | 25 MPa | 25 MPa | 25 MPa | 25 MPa |
| Pressurization time | 15 sec. | 15 sec. | 15 sec. | 15 sec. |
| Retention time | 5 sec. | 5 sec. | 5 sec. | 5 sec. |
| Molded article 1 | | | | |
| Evaluation | ⊙ | ⊙ | ⊙ | ⊙ |
| Molded article 2 | | | | |
| Evaluation | ⊙ | ⊙ | ⊙ | ⊙ |
| Molded article 3 | | | | |
| Evaluation | ⊙ | ⊙ | ⊙ | ⊙ |

| | Resin | | | |
|---|---|---|---|---|
| | Denatured PPE | PP | POM | PA66 |
| Product name | XYLON 100Z | SUMITOMO NOBLEN H501 | DURACON M90S | Leona 1200S |
| Temperature of molten resin | 240° C. | 200° C. | 200° C. | 240° C. |
| Type of pressurized fluid | Nitrogen gas | | | |
| Pressurization pressure | 25 MPa | 25 MPa | 25 MPa | 25 MPa |
| Pressurization time | 15 sec. | 15 sec. | 15 sec. | 15 sec. |
| Retention time | 5 sec. | 5 sec. | 5 sec. | 5 sec. |
| Molded article 1 | | | | |
| Evaluation | ⊙ | ○ | ○ | ○ |
| Molded article 2 | | | | |
| Evaluation | ⊙ | ○ | ○ | ○ |
| Molded article 3 | | | | |
| Evaluation | ⊙ | ⊙ | ⊙ | ⊙ |

TABLE 2

| | Resin | | | |
|---|---|---|---|---|
| | ABS | HIPS | PC/ABS | PC |
| Product name | STYLAC 121 | STYLON 492 | MULTILON T3714 | IUPILON S2000 |
| Temperature of molten resin | 240° C. | 240° C. | 265° C. | 290° C. |
| Type of pressurized fluid | Air | | | |
| Pressurization pressure | 25 MPa | 25 MPa | 25 MPa | 25 MPa |
| Pressurization time | 15 sec. | 15 sec. | 15 sec. | 15 sec. |
| Retention time | 5 sec. | 5 sec. | 5 sec. | 5 sec. |
| Test piece 001 | | | | |
| Evaluation | ⊙ | ⊙ | ⊙ | ⊙ |
| Test piece 002 | | | | |
| Evaluation | ⊙ | ⊙ | ⊙ | ⊙ |

TABLE 2-continued

| | Test piece 003 | | | |
|---|---|---|---|---|
| Evaluation | ◎ | ◎ | ◎ | ◎ |

| | Resin | | | |
|---|---|---|---|---|
| | Denatured PPE | PP | POM | PA66 |
| Product name | XYLON 100Z | SUMITOMO NOBLEN H501 | DURACON M90S | Leona 1200S |
| Temperature of molten resin | 240° C. | 200° C. | 200° C. | 240° C. |
| Type of pressurized fluid | Air | | | |
| Pressurization pressure | 25 MPa | 25 MPa | 25 MPa | 25 MPa |
| Pressurization time | 15 sec. | 15 sec. | 15 sec. | 15 sec. |
| Retention time | 5 sec. | 5 sec. | 5 sec. | 5 sec. |
| | Test piece 001 | | | |
| Evaluation | ◎ | ○ | ○ | ○ |
| | Test piece 002 | | | |
| Evaluation | ◎ | ○ | ○ | ○ |
| | Test piece 003 | | | |
| Evaluation | ◎ | ◎ | ◎ | ◎ |

TABLE 3

| | Resin | | | |
|---|---|---|---|---|
| | ABS | HIPS | PC/ABS | PC |
| Product name | STYLAC 121 | STYLON 492 | MULTILON T3714 | IUPILON S2000 |
| Type of pressurized fluid | Water, with liquid temperature at 65° C. | | | |
| Pressurization pressure | 25 MPa | 25 MPa | 25 MPa | 25 MPa |
| Pressurization time | 15 sec. | 15 sec. | 15 sec. | 15 sec. |
| Retention time | 5 sec. | 5 sec. | 5 sec. | 5 sec. |
| | Test piece 001 | | | |
| Evaluation | ○ | ○ | ○ | ○ |
| | Test piece 002 | | | |
| Evaluation | ○ | ○ | ○ | ○ |
| | Test piece 003 | | | |
| Evaluation | ○ | ○ | ○ | ○ |

| | Resin | | | |
|---|---|---|---|---|
| | Denatured PPE | PP | POM | PA66 |
| Product name | XYLON 100Z | SUMITOMO NOBLEN H501 | DURACON M90S | Leona 1200S |
| Type of pressurized fluid | Water, with liquid temperature at 65° C. | | | |
| Pressurization pressure | 25 MPa | 25 MPa | 25 MPa | 25 MPa |
| Pressurization time | 15 sec. | 15 sec. | 15 sec. | 15 sec. |
| Retention time | 5 sec. | 5 sec. | 5 sec. | 5 sec. |
| | Test piece 001 | | | |
| Evaluation | ○ | ○ | ○ | ○ |
| | Test piece 002 | | | |
| Evaluation | ○ | ○ | ○ | ○ |
| | Test piece 003 | | | |
| Evaluation | ○ | ○ | ○ | ○ |

TABLE 4

| | Resin | | | |
|---|---|---|---|---|
| | ABS | HIPS | PC/ABS | PC |
| Product name | STYLAC 121 | STYLON 492 | MULTILON T3714 | IUPILON S2000 |
| Temperature of molten resin | 240° C. | 240° C. | 265° C. | 290° C. |
| Type of pressurized fluid | Nitrogen gas | | | |
| Pressurization pressure | 10 MPa | 10 MPa | 10 MPa | 10 MPa |
| Pressurization time | 20 sec. | 20 sec. | 20 sec. | 20 sec. |
| Retention time | 5 sec. | 5 sec. | 5 sec. | 5 sec. |
| | Molded article 4 (Working example 5) | | | |
| Evaluation | Δ | Δ | Δ | Δ |
| | Molded article 5 (Working example 6) | | | |
| Evaluation | Δ | Δ | Δ | Δ |
| | Molded article 6 (Working example 7) | | | |
| Evaluation | Δ | Δ | Δ | Δ |
| Pressurization pressure | 20 MPa | 20 MPa | 20 MPa | 20 MPa |
| Pressurization time | 20 sec. | 20 sec. | 20 sec. | 20 sec. |
| Retention time | 5 sec. | 5 sec. | 5 sec. | 5 sec. |
| | Molded article 4 (Working example 5) | | | |
| Evaluation | ○ | ○ | ○ | ○ |
| | Molded article 5 (Working example 6) | | | |
| Evaluation | ○ | ○ | ○ | ○ |
| | Molded article 6 (Working example 7) | | | |
| Evaluation | ○ | ○ | ○ | ○ |
| Pressurization pressure | 30 MPa | 30 MPa | 30 MPa | 30 MPa |
| Pressurization time | 20 sec. | 20 sec. | 20 sec. | 20 sec. |
| Retention time | 5 sec. | 5 sec. | 5 sec. | 5 sec. |
| | Molded article 4 (Working example 5) | | | |
| Evaluation | ◎ | ◎ | ◎ | ◎ |
| | Molded article 5 (Working example 6) | | | |
| Evaluation | ◎ | ◎ | ◎ | ◎ |
| | Molded article 6 (Working example 7) | | | |
| Evaluation | ◎ | ◎ | ◎ | ◎ |

| | Resin | | | |
|---|---|---|---|---|
| | Denatured PPE | PP | POM | PA66 |
| Product name | XYLON 100Z | SUMITOMO NOBLEN H501 | DURACON M90S | Leona 1200S |
| Temperature of molten resin | 240° C. | 200° C. | 200° C. | 240° C. |
| Type of pressurized fluid | Nitrogen gas | | | |

TABLE 4-continued

| Pressurization pressure | 10 MPa | 10 MPa | 10 MPa | 10 MPa |
|---|---|---|---|---|
| Pressurization time | 20 sec. | 20 sec. | 20 sec. | 20 sec. |
| Retention time | 5 sec. | 5 sec. | 5 sec. | 5 sec. |
| Molded article 4 (Working example 5) | | | | |
| Evaluation | Δ | Δ | Δ | Δ |
| Molded article 5 (Working example 6) | | | | |
| Evaluation | Δ | Δ | Δ | Δ |
| Molded article 6 (Working example 7) | | | | |
| Evaluation | Δ | Δ | Δ | Δ |
| Pressurization pressure | 20 MPa | 20 MPa | 20 MPa | 20 MPa |
| Pressurization time | 20 sec. | 20 sec. | 20 sec. | 20 sec. |
| Retention time | 5 sec. | 5 sec. | 5 sec. | 5 sec. |
| Molded article 4 (Working example 5) | | | | |
| Evaluation | ○ | ○ | ○ | ○ |
| Molded article 5 (Working example 6) | | | | |
| Evaluation | ○ | ○ | ○ | ○ |
| Molded article 6 (Working example 7) | | | | |
| Evaluation | ○ | ○ | ○ | ○ |
| Pressurization pressure | 30 MPa | 30 MPa | 30 MPa | 30 MPa |
| Pressurization time | 20 sec. | 20 sec. | 20 sec. | 20 sec. |
| Retention time | 5 sec. | 5 sec. | 5 sec. | 5 sec. |
| Molded article 4 (Working example 5) | | | | |
| Evaluation | ◎ | ◎ | ◎ | ◎ |
| Molded article 5 (Working example 6) | | | | |
| Evaluation | ◎ | ◎ | ◎ | ◎ |
| Molded article 6 (Working example 7) | | | | |
| Evaluation | ◎ | ◎ | ◎ | ◎ |

TABLE 5

| | Resin | | | |
|---|---|---|---|---|
| | ABS | HIPS | PC/ABS | PC |
| Product name | STYLAC 121 | STYLON 492 | MULTILON T3714 | IUPILON S2000 |
| Temperature of molten resin | 240° C. | 240° C. | 265° C. | 290° C. |
| Type of pressurized fluid | Nitrogen gas | | | |
| Pressurization pressure | 30 MPa | 30 MPa | 30 MPa | 30 MPa |
| Pressurization time | 20 sec. | 20 sec. | 20 sec. | 20 sec. |
| Retention time | 5 sec. | 5 sec. | 5 sec. | 5 sec. |
| Molded article 5 (Working example 8) | | | | |
| Evaluation | ◎ | ◎ | ◎ | ◎ |

| | Resin | | | |
|---|---|---|---|---|
| | Denatured PPE | PP | POM | PA66 |
| Product name | XYLON 100Z | SUMITOMO NOBLEN H501 | DURACON M90S | Leona 1200S |
| Temperature of molten resin | 240° C. | 200° C. | 200° C. | 240° C. |
| Type of pressurized fluid | Nitrogen gas | | | |
| Pressurization pressure | 30 MPa | 30 MPa | 30 MPa | 30 MPa |
| Pressurization time | 20 sec. | 20 sec. | 20 sec. | 20 sec. |
| Retention time | 5 sec. | 5 sec. | 5 sec. | 5 sec. |
| Molded article 5 (Working example 8) | | | | |
| Evaluation | ◎ | ◎ | ◎ | ◎ |

The above described working examples and embodiments have been exemplified only for the purpose of presentation, and hence the present invention is not restricted to them and they are susceptible to modifications or additions, as long as these changes in no way contradict the technical spirits of the present invention that can be construed by the parties concerned from the scope of patent claims, detailed description of the invention and illustrated drawings.

INDUSTRIAL APPLICABILITY

The present invention can be applied to manufacturing of injection molded articles by using resins.

DESCRIPTION OF REFERENCE NUMERALS

1: Nitrogen gas cylinder (Nitrogen gas bottle filled at a pressure of 15 MPa), 2: Manometer (Pressure gauge indicating the pressure in the nitrogen gas cylinder 1), 3: Valve (Manual valve to be closed when the nitrogen gas cylinder is replaced), 4: Regulator (Regulator to control the pressure in the nitrogen gas cylinder), 5: Manometer (Pressure gauge to verify the pressure set by the regulator 4), 6: Check valve, 7: Manometer (Pressure gauge to verify the pressure of the intermediate stage of gas booster during compression), 8: Gas booster (Gas booster to compress nitrogen gas), 9: Manometer (Pressure gauge to verify the pressure in the receiver tank 10), 10: Receiver tank (Receiver tank to store under pressure the compressed high-pressure nitrogen gas), 11: Valve (Manual valve (drain valve) to evacuate the high-pressure nitrogen gas in the receiver tank 10), 12: Regulator (Regulator to set the pressure of pressurized fluid when the resin in the cavity is pressurized. The manometer to verify the set pressure is not illustrated.), 13: Manometer (Pressure gauge to verify the pressure of pressurized fluid), 14: Automatic on-off valve (Automatic on-off valve to introduce the pressurized fluid into the cavity), 15: Automatic on-off valve (Automatic on-off valve to discharge the pressurized fluid into the atmosphere), 16: Flow direction of the pressurized fluid, 17: Piping, 18: Flow direction of exhaust (blowout) of the pressurized fluid, 19: Flow direction of exhaust gas when the pressurized fluid in tank 10 is drained, 20: Indicates the state of presence in the atmosphere, 21: Cavity, 22: Mounting plate on the stationary side, 23: Mounting plate on the movable side, 24: Spool bush, 25: Spool of molded article, 26: Parting of the mold, 27: Ejector pin, 28: Upper ejector plate, 29: Lower ejector plate, 30: Mold cavity on the stationary side, 31: Mold cavity on the movable side, 32: Nested element on the stationary side, 33: Clearance at the matching part of the stationary side nested element, 34: Nested element on the movable side, 35: Clearance at the matching part of the movable side nested element, 36: Slide core provided on the stationary side, 37: Slide core provided on the movable side, 38: Seal (Seal installed for preventing the pressurized fluid from leaking out from the spool bush), 39: Seal (Seal between the mounting plate and the mold plate on both the stationary and the movable sides), 40: Seal (Seal installed on the parting), 41: Seal (Seal on the parting surface of the slide core provided on the stationary side), 42: Seal (Seal on the parting surface of the slide core provided on the movable side), 43: Seal (Seal provided in the ejector plate), 44: Plate (Lower seal plate under the stationary side nested element), 45: Plate (Upper seal plate under the stationary side nested element), 46: Seal (Seal provided between the seal plates under the stationary side nested element), 47: Flow direction of pressurized fluid (However, regarding the stationary side part, as it is similar to that for the movable side, etc., it is not illustrated.), 48: Connecting port (Connecting port between the mold and the device for pressurized fluid in FIG. 1 or FIG. 46), 49: Passageway for pressurized fluid, 50: Pressurization pin, 51: Broken lines (Broken lines 51 indicating that the ejector mechanism is enclosed in a closed space and hermetically sealed (Ejector box structure), 52: Space (Space created by the ejector box 52), 53: Plate (Lower seal plate under the movable side nested element), 54: Plate (Upper seal plate under the movable side nested element), 55: Seal (Seal provided between the seal plates 53 and 54 under the movable side nested element), 56: Injection means (Injection means 56 for injecting pressurized fluid into the ejector box 51 comprises the connecting port 48 and the passageway 49 for pressurized fluid.), 57: Injection means (Injection means 57 for making the pressurized fluid act directly on the resin in the cavity to pressurize directly the resin in the cavity from the stationary side comprises connecting port 48, passageway 49 for pressurized fluid, and pressurization pin 50.), 58: Injection means (Injection means 58 for making the pressurized fluid act directly on the resin in the cavity to pressurize directly the resin in the cavity from the movable side comprises connecting port 48, passageway 49 for pressurized fluid, and pressurization pin 50.), 59: Injection means (Injection means 59 for making the pressurized fluid act directly on the resin in the cavity from the stationary side slide core to pressurize the resin comprises connecting port 48, passageway 49 for pressurized fluid, and pressurization pin 50.), 60: Injection means (Injection means 60 for making the pressurized fluid act directly on the resin in the cavity from the movable side slide core to pressurize the resin comprises connecting port 48, passageway 49 for pressurized fluid, and pressurization pin 50.), 61: Injection means (Injection means 61 for introducing the pressurized fluid into the cavity through the clearances 33 in the stationary side nested element to pressurize the resin from the stationary side comprises connecting port 48, passageway 49 for pressurized fluid, and pressurization pin 50.), 62: Valve (Automatic on-off valve to solve the problem of occurrences of short-mold, discoloration and burn by letting out the air in the cavity from the parting when the cavity has been filled with resin), 63: Passageway (Passageway in the mold for drawing off the air in the cavity from the gas vents, etc. provided in parting, nested element, etc.,), 64: Hose (Pressure-resistant hose connected to valve 62, valve 67, valve 68, etc. provided for drawing off the air in the cavity), 65: Flow direction of the air drawn off out of the cavity, 66: Air in the cavity that has been discharged into the atmosphere, 67: Valve (Automatic on-off valve having the same function as that of automatic on-off valve 62 connected to plate 44 and plate 45 on the stationary side), 68: Valve (automatic on-off valve having the same function as that of automatic on-off valve 62 connected to plate 44 and plate 45 on the stationary side), 69: Outer tube, 70: Flanged part, 71: Inner core, 72: D-shaped surface (Machined to make a D-shaped cross section (D-cut) serving as a passageway for pressurized fluid), 73: Apical end of inner core 71, 74: D-shaped surface, 75: Hexagonal shape, 76: Fitting, 77: Part into which the inner core 71 is inserted, 78: Stationary side mold plate, 79: Part into which the flanged part of inner core 71 is accommodated (Because an O-ring makes line-to-surface contact, its sealing effect is low. The inventor used a rubber sheet cut in a circle to improve the sealing effect by creating surface-to-surface contact, 80: Hole, 81: Groove (Passageway for the air drawn off from the cavity and for the pressurized fluid), 82: Groove (Groove for accommodating a seal ring 89), 83: Hole (Hole into which the ejector pin is inserted), 84: Hole (Hole into which the pressurization pin 50 is inserted), 85: Hole (Hole accommodating the flanged part of pressurization pin 50, 86: Hole (It shows the details of the hole of passageway 63 for letting out the air in FIG. 3), 87: Movable side mold plate, 89: Seal ring (Seal ring provided for sealing the ejector pin), 90: Seal ring (Seal ring provided for preventing the air from entering through interstices around ejector pins when the aspiration by vacuum is carried out.), 91: Seal (To prevent the entry of air through the clearances between plate 53 and plate 92 when aspiration by vacuum is carried out.), 92: Plate (Plate for pressing the seal ring 90), 93: Seal (Seal provided between mold plate 87 and plate 54 on the movable side, for preventing the escape of pressurized fluid through this clearance. A seal with a similar function is provided also between mold plate 78 and plate 54 on the stationary side, although not illustrated.), 94: Gas vent, 95: Groove, 96: Groove, 97: Hole (Hole of exhaust gas circuit 63), 98: Connection port (Connection port of valve 62 in FIG. 2), 99: Gas vent of the nested element, 100: Passageway (Passageway for drawing off the air in the cavity, passageway for pressurized fluid), 101: Groove (Connected to air exhaust passageway 63 through a groove leading to gas vent 99. The passageway for pressurized fluid when the pressurized fluid is introduced between plate 53 and plate 54, to pressurize the resin in the cavity, 102: Space (Small space created for the purpose of providing a cushioning effect, but it is not always needed to create it, 103: Resin part, 104: Spring, 105: Embossment, 106: Ceramic coating, 107: Glossy surface, 108: Gate (Made as a side gate), 109: Apex of pressurization fluid pin, 110: Pressurization part of the movable side, 111: Pressurization part of the stationary side, 112: Pressurization part of the movable side slide core, 113: Pressurization part of the stationary side slide core, 115: Injection means, 116: Injection means (The resin in the cavity is pressurized by fluidic pressure by injecting the pressurized fluid through passageways of grooves 81 formed between plate 53 and plate 54, and through the clearances in the nested element and the clearances around ejector pins.), 117: Flanged part of inner core 71, 118: D-shaped surface of flanged part 117 (It has been machined so as to have D-shaped cross section for the passageway of pressurized fluid), 119: Apical end section, 120: U-shaped groove (U-shaped groove is engraved and serves as a passageway for pressurized fluid), 121: Hole, 122: Socket for Allen wrench, 123: Threaded part, 124: Molded article, 126: O-ring (seal), 127: set screw, 128: Pressurized fluid, 129: Part of a thin thickness, 130: Boss, 131: U-shaped groove (U-shaped groove is engraved and serves as a passageway for pressurized fluid), 132: Outer tube, 133: Inner core, 134: D-shaped surface, 135: Flanged part, 136: Boss on the molded article, 140: Device for preparing the pressurized fluid, 141: Sealed mold, 142: Sealed mold, 200: Cavity, molding space, 201: Stationary side mold, 202: Movable side mold, 203: Core body, 204: Pressurization pin (Direct pressurization), 205: First mold, 206: Second mold, 207: Flanged part, 208: Depressed part, 209: Opening, 210: Molded article, 211: Rib (It is a rib provided for stopping the pressurized fluid), 212: Pressurization pin (Indirect pressurization), 213: Depressed part, 214: Nested element, 215: Nested element, 216: Molded article, 217: Surface, 218: Gas rib around the ejector pin, 219: Clearance between ejector pin and rib, 220: Embossing with coarse grains of φ20, 221: Schematic diagram describing that the nested element 34 was machined so as to have a shape enabling to accommodate the core body 203, 222: Seal, 223: Part for blowout of pressurized fluid, 224: Outer tube, 225: Inner core, 226: Core body part, 227: Ejector pin having a passageway for pressurized fluid formed by machining an ejector sleeve, 228: Seal, 229: Seal, 230: Seal, 231: Stepped hole to accommodate the ejector pin, 232: Stepped hole to accommodate the ejector pin, 233: Stepped hole to accommodate the ejector pin, 234: Stepped hole to accommodate the ejector pin, 235: Stepped hole to accommodate the ejector pin, 236: Groove, 237: Groove, 238: Groove, 239: Groove, 240: Groove, 241: Convex shape, 242: Concave shape, 243: Seal, 1100: Location of occurrence of sink marks, 1101: Location of occurrence of sink marks, 1102: Location of occurrence of sink marks, 1140: Device for preparing the pressurized fluid

The invention claimed is:

1. A mold device having a nested structure used for a molding method where a pressurized fluid is injected into a clearance between a resin injected into a cavity and a cavity wall surface, the mold device comprising:
   a shaft body that is provided on at least one of a first mold and a second mold, the first mold and the second mold forming a molding space, the shaft body ejecting a molded article that is molded from the resin injected into the molding space;
   a ring-shaped elastic member for supporting and sealing the shaft body, an opening of a groove formed in the ring-shaped elastic member along a circumferential direction of the ring-shaped elastic member being oriented toward the molding space, a load being applied on the ring-shaped elastic member to improve adhesion to the shaft body; and
   an injection portion that is provided on at least one of the first mold and the second mold for injecting the pressurized fluid into the molding space, wherein
   the cavity wall surface subjected to fluid pressurization is embossed so that the pressurized fluid is injected into the clearance between the resin and an embossed portion of the cavity wall surface.

2. The mold device according to claim 1, further comprising:
   a discharge portion for discharging the pressurized fluid in the molding space.

3. The mold device according to claim 2, wherein
   the ring-shaped elastic member for supporting the shaft body further has a second groove, an opening of the second groove being oriented opposite to the molding space.

4. The mold device according to claim 1, further comprising:
   a second ring-shaped elastic member, a second opening of a second groove formed along a circumferential direction of the second ring-shaped elastic member being oriented away from the molding space.

5. The mold device according to claim 1, wherein
   the surface of the cavity wall surface subjected to fluid pressurization is embossed at an area around the injection portion.

6. An injection molding system, comprising:
   the mold device according to claim 1; and
   an injection device for injecting the resin into the mold device.

7. A method for manufacturing molded article, comprising:
   a first step of injecting the resin into the molding space of the mold device according to claim 1;
   a second step of injecting the pressurized fluid between the resin injected into the molding space and the first mold forming the molding space or between the resin injected into the molding space and the second mold forming the molding space from the injection portion; and
   a third step of opening the first mold and the second mold and extruding the molded article by the shaft body, the molded article being formed from the resin injected into the molding space.

8. A method for manufacturing molded article, comprising:
   a first step of injecting the resin into the molding space of the mold device according to claim 1 while discharging the air in the molding space;
   a second step of injecting the pressurized fluid between the resin injected into the molding space and the first mold forming the molding space or between the resin injected into the molding space and the second mold forming the molding space from the injection portion; and
   a third step of opening the first mold and the second mold and extruding the molded article by the shaft body, the molded article being formed from the resin injected into the molding space.

* * * * *